United States Patent
Liu et al.

(10) Patent No.: US 10,213,746 B2
(45) Date of Patent: Feb. 26, 2019

(54) SELECTIVE INTERFACIAL MITIGATION OF GRAPHENE DEFECTS

(71) Applicant: Lockheed Martin Corporation, Bethesda, MD (US)

(72) Inventors: Han Liu, Timonium, MD (US); Sarah M. Simon, Baltimore, MD (US); Steven Lloyd Sinsabaugh, Abingdon, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 81 days.

(21) Appl. No.: 15/099,410

(22) Filed: Apr. 14, 2016

(65) Prior Publication Data
US 2017/0296976 A1    Oct. 19, 2017

(51) Int. Cl.
| | | |
|---|---|---|
| *B01D 65/10* | (2006.01) | |
| *B01D 71/02* | (2006.01) | |
| *B01D 67/00* | (2006.01) | |
| *B01D 69/12* | (2006.01) | |

(52) U.S. Cl.
CPC ....... *B01D 65/108* (2013.01); *B01D 67/0023* (2013.01); *B01D 69/125* (2013.01); *B01D 71/021* (2013.01); *B01D 2323/21* (2013.01); *B01D 2323/28* (2013.01)

(58) Field of Classification Search
None
See application file for complete search history.

(56) References Cited

U.S. PATENT DOCUMENTS

| | | |
|---|---|---|
| 2,187,417 A | 1/1940 | Doble |
| 3,024,153 A | 3/1962 | Kennedy |
| 3,303,085 A | 2/1967 | Price et al. |
| 3,501,831 A | 3/1970 | Gordon |
| 3,593,854 A | 7/1971 | Swank |
| 3,692,059 A * | 9/1972 | Ice, Jr. .................. F16L 55/10 122/364 |
| 3,701,433 A | 10/1972 | Krakauer et al. |
| 3,802,972 A | 4/1974 | Fleischer et al. |
| 4,073,732 A | 2/1978 | Lauer et al. |
| 4,159,954 A | 7/1979 | Gangemi |
| 4,162,220 A | 7/1979 | Servas |
| 4,277,344 A | 7/1981 | Cadotte |
| 4,303,530 A | 12/1981 | Shah et al. |
| 4,743,371 A | 5/1988 | Servas et al. |
| 4,855,058 A | 8/1989 | Holland et al. |
| 4,880,440 A | 11/1989 | Perrin |
| 4,889,626 A | 12/1989 | Browne |

(Continued)

FOREIGN PATENT DOCUMENTS

| | | |
|---|---|---|
| CA | 2037988 | 9/1992 |
| CA | 2411935 | 12/2002 |

(Continued)

OTHER PUBLICATIONS

CN Office Action in Chinese Application No. 201580006829.5 dated Aug. 1, 2017. (English translation) (8 pages).

(Continued)

*Primary Examiner* — Chester T Barry
(74) *Attorney, Agent, or Firm* — Foley & Lardner LLP

(57) ABSTRACT

A method for the repair of defects in a graphene or other two-dimensional material through interfacial polymerization.

47 Claims, 13 Drawing Sheets

(56) References Cited

U.S. PATENT DOCUMENTS

| | | |
|---|---|---|
| 4,891,134 A | 1/1990 | Vcelka |
| 4,925,560 A | 5/1990 | Sorrick |
| 4,935,207 A | 6/1990 | Stanbro et al. |
| 4,976,858 A | 12/1990 | Kadoya |
| 5,052,444 A | 10/1991 | Messerly et al. |
| 5,080,770 A | 1/1992 | Culkin |
| 5,082,476 A | 1/1992 | Kahlbaugh et al. |
| 5,156,628 A | 10/1992 | Kranz |
| 5,182,111 A | 1/1993 | Aebischer et al. |
| 5,185,086 A | 2/1993 | Kaali et al. |
| 5,201,767 A | 4/1993 | Caldarise et al. |
| 5,244,981 A | 9/1993 | Seidner et al. |
| 5,314,492 A | 5/1994 | Hamilton et al. |
| 5,314,960 A | 5/1994 | Spinelli et al. |
| 5,314,961 A | 5/1994 | Anton et al. |
| 5,331,067 A | 7/1994 | Seidner et al. |
| 5,344,454 A | 9/1994 | Clarke et al. |
| 5,371,147 A | 12/1994 | Spinelli et al. |
| 5,425,858 A | 6/1995 | Farmer |
| 5,480,449 A | 1/1996 | Hamilton et al. |
| 5,514,181 A | 5/1996 | Light et al. |
| 5,516,522 A | 5/1996 | Peyman et al. |
| 5,549,697 A | 8/1996 | Caldarise |
| 5,562,944 A | 10/1996 | Kafrawy |
| 5,565,210 A | 10/1996 | Rosenthal et al. |
| 5,580,530 A | 12/1996 | Kowatsch et al. |
| 5,595,621 A | 1/1997 | Light et al. |
| 5,636,437 A | 6/1997 | Kaschmitter et al. |
| 5,639,275 A | 6/1997 | Baetge et al. |
| 5,641,323 A | 6/1997 | Caldarise |
| 5,658,334 A | 8/1997 | Caldarise et al. |
| 5,662,158 A | 9/1997 | Caldarise |
| 5,665,118 A | 9/1997 | Lasalle et al. |
| 5,671,897 A | 9/1997 | Ogg et al. |
| 5,679,232 A | 10/1997 | Fedor et al. |
| 5,679,249 A | 10/1997 | Fendya et al. |
| 5,687,788 A | 11/1997 | Caldarise et al. |
| 5,700,477 A | 12/1997 | Rosenthal et al. |
| 5,713,410 A | 2/1998 | Lasalle et al. |
| 5,716,412 A | 2/1998 | Decarlo et al. |
| 5,716,414 A | 2/1998 | Caldarise |
| 5,725,586 A | 3/1998 | Sommerich |
| 5,731,360 A | 3/1998 | Pekala et al. |
| 5,733,503 A | 3/1998 | Kowatsch et al. |
| 5,746,272 A | 5/1998 | Mastrorio et al. |
| 5,782,286 A | 7/1998 | Sommerich |
| 5,782,289 A | 7/1998 | Mastrorio et al. |
| 5,788,916 A | 8/1998 | Caldarise |
| 5,800,828 A | 9/1998 | Dionne et al. |
| 5,808,312 A | 9/1998 | Fukuda |
| 5,868,727 A | 2/1999 | Barr et al. |
| 5,897,592 A | 4/1999 | Caldarise et al. |
| 5,902,762 A | 5/1999 | Mercuri et al. |
| 5,906,234 A | 5/1999 | Mastrorio et al. |
| 5,910,172 A | 6/1999 | Penenberg |
| 5,910,173 A | 6/1999 | Decarlo et al. |
| 5,913,998 A | 6/1999 | Butler et al. |
| 5,922,304 A | 7/1999 | Unger |
| 5,925,247 A | 7/1999 | Huebbel |
| 5,932,185 A | 8/1999 | Pekala et al. |
| 5,935,084 A | 8/1999 | Southworth |
| 5,935,172 A | 8/1999 | Ochoa et al. |
| 5,954,937 A | 9/1999 | Farmer |
| 5,974,973 A | 11/1999 | Tittgemeyer |
| 5,976,555 A | 11/1999 | Liu et al. |
| 5,980,718 A | 11/1999 | Van Konynenburg et al. |
| 6,008,431 A | 12/1999 | Caldarise et al. |
| 6,013,080 A | 1/2000 | Khalili |
| 6,022,509 A | 2/2000 | Matthews et al. |
| 6,052,608 A | 4/2000 | Young et al. |
| 6,080,393 A | 6/2000 | Liu et al. |
| 6,093,209 A | 7/2000 | Sanders |
| 6,139,585 A | 10/2000 | Li |
| 6,152,882 A | 11/2000 | Prutchi |
| 6,156,323 A | 12/2000 | Verdicchio et al. |
| 6,193,956 B1 | 2/2001 | Liu et al. |
| 6,209,621 B1 | 4/2001 | Treacy |
| 6,213,124 B1 | 4/2001 | Butterworth |
| 6,228,123 B1 | 5/2001 | Dezzani |
| 6,264,699 B1 | 7/2001 | Noiles et al. |
| 6,292,704 B1 | 9/2001 | Malonek et al. |
| 6,309,532 B1 | 10/2001 | Tran et al. |
| 6,346,187 B1 | 2/2002 | Tran et al. |
| 6,375,014 B1 | 4/2002 | Garcera et al. |
| 6,426,214 B1 | 7/2002 | Butler et al. |
| 6,454,095 B1 | 9/2002 | Brisebois et al. |
| 6,455,115 B1 | 9/2002 | Demeyer |
| 6,461,622 B2 | 10/2002 | Liu et al. |
| 6,462,935 B1 | 10/2002 | Shiue et al. |
| 6,521,865 B1 | 2/2003 | Jones et al. |
| 6,532,386 B2 | 3/2003 | Sun et al. |
| 6,544,316 B2 | 4/2003 | Baker et al. |
| 6,580,598 B2 | 6/2003 | Shiue et al. |
| 6,654,229 B2 | 11/2003 | Yanagisawa et al. |
| 6,659,298 B2 | 12/2003 | Wong |
| 6,660,150 B2 | 12/2003 | Conlan et al. |
| 6,661,643 B2 | 12/2003 | Shiue et al. |
| 6,686,437 B2 | 2/2004 | Buchman et al. |
| 6,692,627 B1 | 2/2004 | Russell et al. |
| 6,695,880 B1 | 2/2004 | Roffman et al. |
| 6,699,684 B2 | 3/2004 | Ho et al. |
| 6,719,740 B2 | 4/2004 | Burnett et al. |
| 6,905,612 B2 | 6/2005 | Dorian et al. |
| 6,924,190 B2 | 8/2005 | Dennison |
| 7,014,829 B2 | 3/2006 | Yanagisawa et al. |
| 7,071,406 B2 | 7/2006 | Smalley et al. |
| 7,092,753 B2 | 8/2006 | Darvish et al. |
| 7,138,042 B2 | 11/2006 | Tran et al. |
| 7,171,263 B2 | 1/2007 | Darvish et al. |
| 7,175,783 B2 | 2/2007 | Curran |
| 7,179,419 B2 | 2/2007 | Lin et al. |
| 7,190,997 B1 | 3/2007 | Darvish et al. |
| 7,267,753 B2 | 9/2007 | Anex et al. |
| 7,306,768 B2 | 12/2007 | Chiga |
| 7,357,255 B2 | 4/2008 | Ginsberg et al. |
| 7,374,677 B2 | 5/2008 | McLaughlin et al. |
| 7,381,707 B2 | 6/2008 | Lin et al. |
| 7,382,601 B2 | 6/2008 | Yoshimitsu |
| 7,434,692 B2 | 10/2008 | Ginsberg et al. |
| 7,452,547 B2 | 11/2008 | Lambino et al. |
| 7,459,121 B2 | 12/2008 | Liang et al. |
| 7,460,907 B1 | 12/2008 | Darvish et al. |
| 7,476,222 B2 | 1/2009 | Sun et al. |
| 7,477,939 B2 | 1/2009 | Sun et al. |
| 7,477,940 B2 | 1/2009 | Sun et al. |
| 7,477,941 B2 | 1/2009 | Sun et al. |
| 7,479,133 B2 | 1/2009 | Sun et al. |
| 7,505,250 B2 | 3/2009 | Cho et al. |
| 7,531,094 B2 | 5/2009 | McLaughlin et al. |
| 7,600,567 B2 | 10/2009 | Christopher et al. |
| 7,631,764 B2 | 12/2009 | Ginsberg et al. |
| 7,650,805 B2 | 1/2010 | Nauseda et al. |
| 7,674,477 B1 | 3/2010 | Schmid et al. |
| 7,706,128 B2 | 4/2010 | Bourcier |
| 7,761,809 B2 | 7/2010 | Bukovec et al. |
| 7,786,086 B2 | 8/2010 | Reches et al. |
| 7,866,475 B2 | 1/2011 | Doskoczynski et al. |
| 7,875,293 B2 | 1/2011 | Shults et al. |
| 7,935,331 B2 | 5/2011 | Lin |
| 7,935,416 B2 | 5/2011 | Yang et al. |
| 7,943,167 B2 | 5/2011 | Kulkarni et al. |
| 7,960,708 B2 | 6/2011 | Wolfe et al. |
| 7,998,246 B2 | 8/2011 | Liu et al. |
| 8,109,893 B2 | 2/2012 | Lande |
| 8,147,599 B2 | 4/2012 | McAlister |
| 8,262,943 B2 | 9/2012 | Meng et al. |
| 8,278,106 B2 | 10/2012 | Martinson et al. |
| 8,308,702 B2 | 11/2012 | Batchvarova et al. |
| 8,316,865 B2 | 11/2012 | Ochs et al. |
| 8,329,476 B2 | 12/2012 | Pitkanen et al. |
| 8,354,296 B2 | 1/2013 | Dimitrakopoulos et al. |
| 8,361,321 B2 | 1/2013 | Stetson et al. |
| 8,449,504 B2 | 5/2013 | Carter et al. |
| 8,471,562 B2 | 6/2013 | Knizhnik |

(56) References Cited

U.S. PATENT DOCUMENTS

| | | |
|---|---|---|
| 8,475,689 B2 | 7/2013 | Sun et al. |
| 8,506,807 B2 | 8/2013 | Lee et al. |
| 8,512,669 B2 | 8/2013 | Hauck |
| 8,513,324 B2 | 8/2013 | Scales et al. |
| 8,535,726 B2 | 9/2013 | Dai et al. |
| 8,592,291 B2 | 11/2013 | Shi et al. |
| 8,617,411 B2 | 12/2013 | Singh |
| 8,666,471 B2 | 3/2014 | Rogers et al. |
| 8,686,249 B1 | 4/2014 | Whitaker et al. |
| 8,697,230 B2 | 4/2014 | Ago et al. |
| 8,698,481 B2 | 4/2014 | Lieber et al. |
| 8,715,329 B2 | 5/2014 | Robinson et al. |
| 8,721,074 B2 | 5/2014 | Pugh et al. |
| 8,734,421 B2 | 5/2014 | Sun et al. |
| 8,744,567 B2 | 6/2014 | Fassih et al. |
| 8,751,015 B2 | 6/2014 | Frewin et al. |
| 8,753,468 B2 | 6/2014 | Caldwell et al. |
| 8,759,153 B2 | 6/2014 | Elian et al. |
| 8,808,257 B2 | 8/2014 | Pugh et al. |
| 8,828,211 B2 | 9/2014 | Garaj et al. |
| 8,840,552 B2 | 9/2014 | Brauker et al. |
| 8,857,983 B2 | 10/2014 | Pugh et al. |
| 8,861,821 B2 | 10/2014 | Osumi |
| 8,894,201 B2 | 11/2014 | Pugh et al. |
| 8,940,552 B2 | 1/2015 | Pugh et al. |
| 8,950,862 B2 | 2/2015 | Pugh et al. |
| 8,974,055 B2 | 3/2015 | Pugh et al. |
| 8,975,121 B2 | 3/2015 | Pugh et al. |
| 8,979,978 B2 | 3/2015 | Miller et al. |
| 8,986,932 B2 | 3/2015 | Turner et al. |
| 8,993,234 B2 | 3/2015 | Turner et al. |
| 8,993,327 B2 | 3/2015 | McKnight et al. |
| 9,014,639 B2 | 4/2015 | Pugh et al. |
| 9,017,937 B1 | 4/2015 | Turner et al. |
| 9,023,220 B2 | 5/2015 | Graphenea |
| 9,028,663 B2 | 5/2015 | Stetson et al. |
| 9,035,282 B2 | 5/2015 | Dimitrakopoulos et al. |
| 9,045,847 B2 | 6/2015 | Batchvarova et al. |
| 9,050,452 B2 | 6/2015 | Sun et al. |
| 9,052,533 B2 | 6/2015 | Pugh et al. |
| 9,056,282 B2 | 6/2015 | Miller et al. |
| 9,062,180 B2 | 6/2015 | Scales et al. |
| 9,067,811 B1 | 6/2015 | Bennett et al. |
| 9,070,615 B2 | 6/2015 | Elian et al. |
| 9,075,009 B2 | 7/2015 | Kim et al. |
| 9,080,267 B2 | 7/2015 | Batchvarova et al. |
| 9,095,823 B2 | 8/2015 | Fleming |
| 9,096,050 B2 | 8/2015 | Bedell et al. |
| 9,096,437 B2 | 8/2015 | Tour et al. |
| 9,102,111 B2 | 8/2015 | Pugh et al. |
| 9,108,158 B2 | 8/2015 | Yu et al. |
| 9,110,310 B2 | 8/2015 | Pugh et al. |
| 9,125,715 B2 | 9/2015 | Pugh et al. |
| 9,134,546 B2 | 9/2015 | Pugh et al. |
| 9,170,646 B2 | 10/2015 | Toner et al. |
| 9,185,486 B2 | 11/2015 | Pugh |
| 9,193,587 B2 | 11/2015 | Bennett |
| 9,195,075 B2 | 11/2015 | Pugh et al. |
| 9,225,375 B2 | 12/2015 | Pugh et al. |
| 9,388,048 B1 | 7/2016 | Zhou et al. |
| 9,425,709 B2 | 8/2016 | Hayashi et al. |
| 9,437,370 B2 | 9/2016 | Chen et al. |
| 9,463,421 B2 | 10/2016 | Fleming |
| 9,505,192 B2 | 11/2016 | Stoltenberg et al. |
| 9,545,600 B2 | 1/2017 | Miller et al. |
| 9,567,224 B2 | 2/2017 | Bedworth |
| 9,572,918 B2 | 2/2017 | Bachmann et al. |
| 9,592,475 B2 | 3/2017 | Stoltenberg et al. |
| 9,610,546 B2 | 4/2017 | Sinton et al. |
| 9,708,640 B2 | 7/2017 | Wu et al. |
| 9,713,794 B2 | 7/2017 | Choi et al. |
| 9,742,001 B2 | 8/2017 | Zhamu et al. |
| 9,870,895 B2 | 1/2018 | Bedworth |
| 10,017,852 B2 | 7/2018 | Heise et al. |
| 2001/0036556 A1 | 11/2001 | Jen |
| 2001/0047157 A1 | 11/2001 | Burnett et al. |
| 2001/0055597 A1 | 12/2001 | Liu et al. |
| 2002/0079004 A1 | 6/2002 | Sato et al. |
| 2002/0079054 A1 | 6/2002 | Nakatani |
| 2002/0104435 A1 | 8/2002 | Baker et al. |
| 2002/0115957 A1 | 8/2002 | Sun et al. |
| 2002/0117659 A1 | 8/2002 | Lieber et al. |
| 2002/0183682 A1 | 12/2002 | Darvish et al. |
| 2002/0183686 A1 | 12/2002 | Darvish et al. |
| 2003/0052354 A1 | 3/2003 | Dennison |
| 2003/0134281 A1 | 7/2003 | Evans |
| 2003/0138777 A1 | 7/2003 | Evans |
| 2003/0146221 A1 | 8/2003 | Lauer et al. |
| 2003/0159985 A1 | 8/2003 | Siwy et al. |
| 2004/0018583 A1 | 1/2004 | Ho et al. |
| 2004/0035787 A1 | 2/2004 | Tanga et al. |
| 2004/0061253 A1 | 4/2004 | Kleinmeyer et al. |
| 2004/0063097 A1 | 4/2004 | Evans |
| 2004/0099324 A1 | 5/2004 | Fraser et al. |
| 2004/0111968 A1 | 6/2004 | Day et al. |
| 2004/0112865 A1 | 6/2004 | McCullough et al. |
| 2004/0121488 A1 | 6/2004 | Chang et al. |
| 2004/0140041 A1* | 7/2004 | Glick ............... B29C 73/025 156/94 |
| 2004/0142463 A1 | 7/2004 | Walker et al. |
| 2004/0185730 A1 | 9/2004 | Lambino et al. |
| 2004/0193043 A1 | 9/2004 | Duchon et al. |
| 2004/0199243 A1 | 10/2004 | Yodfat |
| 2004/0208796 A1 | 10/2004 | Chiga |
| 2004/0217036 A1 | 11/2004 | Ginsberg et al. |
| 2004/0241214 A1 | 12/2004 | Kirkwood et al. |
| 2004/0251136 A1 | 12/2004 | Lean et al. |
| 2005/0004508 A1 | 1/2005 | Sun et al. |
| 2005/0004509 A1 | 1/2005 | Sun et al. |
| 2005/0004550 A1 | 1/2005 | Sun et al. |
| 2005/0010161 A1 | 1/2005 | Sun et al. |
| 2005/0010192 A1 | 1/2005 | Sun et al. |
| 2005/0015042 A1 | 1/2005 | Sun et al. |
| 2005/0053563 A1 | 3/2005 | Manissier et al. |
| 2005/0112078 A1 | 5/2005 | Boddupalli et al. |
| 2005/0126966 A1 | 6/2005 | Tanida et al. |
| 2005/0129633 A1 | 6/2005 | Lin |
| 2005/0148996 A1 | 7/2005 | Sun et al. |
| 2005/0170089 A1 | 8/2005 | Lashmore et al. |
| 2005/0189673 A1 | 9/2005 | Klug et al. |
| 2005/0226834 A1 | 10/2005 | Lambino et al. |
| 2005/0238730 A1 | 10/2005 | Le Fur et al. |
| 2006/0005381 A1 | 1/2006 | Nishi et al. |
| 2006/0036332 A1 | 2/2006 | Jennings |
| 2006/0073370 A1 | 4/2006 | Krusic et al. |
| 2006/0093885 A1 | 5/2006 | Krusic et al. |
| 2006/0121279 A1 | 6/2006 | Petrik |
| 2006/0151382 A1 | 7/2006 | Petrik |
| 2006/0166347 A1 | 7/2006 | Faulstich et al. |
| 2006/0180604 A1 | 8/2006 | Ginsberg et al. |
| 2006/0222701 A1 | 10/2006 | Kulkarni et al. |
| 2006/0253078 A1 | 11/2006 | Wu et al. |
| 2007/0004640 A1 | 1/2007 | Lin et al. |
| 2007/0032054 A1 | 2/2007 | Ramaswamy et al. |
| 2007/0056894 A1 | 3/2007 | Connors, Jr. |
| 2007/0060862 A1 | 3/2007 | Sun et al. |
| 2007/0062856 A1 | 3/2007 | Pahl et al. |
| 2007/0099813 A1 | 5/2007 | Luizzi et al. |
| 2007/0131646 A1 | 6/2007 | Donnelly et al. |
| 2007/0284279 A1 | 12/2007 | Doskoczynski et al. |
| 2008/0017564 A1 | 1/2008 | Hammond |
| 2008/0035484 A1 | 2/2008 | Wu et al. |
| 2008/0035541 A1 | 2/2008 | Franzreb et al. |
| 2008/0045877 A1 | 2/2008 | Levin et al. |
| 2008/0061477 A1 | 3/2008 | Capizzo |
| 2008/0063585 A1 | 3/2008 | Smalley et al. |
| 2008/0081323 A1 | 4/2008 | Keeley et al. |
| 2008/0081362 A1 | 4/2008 | Keeley et al. |
| 2008/0149561 A1 | 6/2008 | Chu et al. |
| 2008/0156648 A1 | 7/2008 | Dudziak et al. |
| 2008/0170982 A1 | 7/2008 | Zhang et al. |
| 2008/0185293 A1 | 8/2008 | Klose et al. |
| 2008/0188836 A1 | 8/2008 | Weber et al. |
| 2008/0190508 A1 | 8/2008 | Booth et al. |

(56) References Cited

U.S. PATENT DOCUMENTS

| | | |
|---|---|---|
| 2008/0241085 A1 | 10/2008 | Lin et al. |
| 2008/0268016 A1 | 10/2008 | Fang et al. |
| 2008/0290020 A1 | 11/2008 | Marand et al. |
| 2008/0290111 A1 | 11/2008 | Ginsberg et al. |
| 2009/0023572 A1 | 1/2009 | Backes et al. |
| 2009/0032475 A1 | 2/2009 | Ferrer et al. |
| 2009/0039019 A1 | 2/2009 | Raman |
| 2009/0048685 A1 | 2/2009 | Frigstad et al. |
| 2009/0075371 A1 | 3/2009 | Keeley et al. |
| 2009/0078640 A1 | 3/2009 | Chu et al. |
| 2009/0087395 A1 | 4/2009 | Lin et al. |
| 2009/0117335 A1 | 5/2009 | Iyoda et al. |
| 2009/0148495 A1 | 6/2009 | Hammer et al. |
| 2009/0176159 A1 | 7/2009 | Zhamu et al. |
| 2009/0222072 A1 | 9/2009 | Robinson et al. |
| 2009/0236295 A1 | 9/2009 | Braun et al. |
| 2009/0241242 A1 | 10/2009 | Beatty et al. |
| 2009/0283475 A1 | 11/2009 | Hylton et al. |
| 2009/0291270 A1 | 11/2009 | Zettl et al. |
| 2009/0294300 A1 | 12/2009 | Kanzius et al. |
| 2009/0306364 A1 | 12/2009 | Beer et al. |
| 2010/0000754 A1 | 1/2010 | Mann et al. |
| 2010/0016778 A1 | 1/2010 | Chattopadhyay |
| 2010/0021708 A1 | 1/2010 | Kong et al. |
| 2010/0024722 A1 | 2/2010 | Ochs et al. |
| 2010/0024838 A1 | 2/2010 | Ochs et al. |
| 2010/0025330 A1 | 2/2010 | Ratto et al. |
| 2010/0055464 A1 | 3/2010 | Sung |
| 2010/0059378 A1 | 3/2010 | Elson et al. |
| 2010/0072643 A1 | 3/2010 | Pugh et al. |
| 2010/0076553 A1 | 3/2010 | Pugh et al. |
| 2010/0105834 A1 | 4/2010 | Tour et al. |
| 2010/0110372 A1 | 5/2010 | Pugh et al. |
| 2010/0124564 A1 | 5/2010 | Martinson et al. |
| 2010/0127312 A1 | 5/2010 | Grebel et al. |
| 2010/0161014 A1 | 6/2010 | Lynch et al. |
| 2010/0167551 A1 | 7/2010 | Dedontney |
| 2010/0196439 A1 | 8/2010 | Beck et al. |
| 2010/0209330 A1 | 8/2010 | Golzhauser et al. |
| 2010/0209515 A1 | 8/2010 | Chantalat et al. |
| 2010/0213079 A1 | 8/2010 | Willis |
| 2010/0224555 A1 | 9/2010 | Hoek et al. |
| 2010/0228204 A1 | 9/2010 | Beatty et al. |
| 2010/0233781 A1 | 9/2010 | Bangera et al. |
| 2010/0249273 A1 | 9/2010 | Scales et al. |
| 2010/0258111 A1 | 10/2010 | Shah et al. |
| 2010/0323177 A1 | 12/2010 | Ruoff et al. |
| 2010/0327847 A1 | 12/2010 | Leiber et al. |
| 2011/0014217 A1 | 1/2011 | Fahmy et al. |
| 2011/0037033 A1 | 2/2011 | Green et al. |
| 2011/0041519 A1 | 2/2011 | McAlister |
| 2011/0041687 A1 | 2/2011 | Diaz et al. |
| 2011/0045523 A1 | 2/2011 | Strano et al. |
| 2011/0054418 A1 | 3/2011 | Pugh et al. |
| 2011/0054576 A1 | 3/2011 | Robinson et al. |
| 2011/0056892 A1 | 3/2011 | Lancaster |
| 2011/0073563 A1 | 3/2011 | Chang et al. |
| 2011/0092054 A1 | 4/2011 | Seo et al. |
| 2011/0092949 A1 | 4/2011 | Wang |
| 2011/0100921 A1 | 5/2011 | Heinrich |
| 2011/0112484 A1 | 5/2011 | Carter et al. |
| 2011/0118655 A1 | 5/2011 | Fassih et al. |
| 2011/0120970 A1 | 5/2011 | Joo et al. |
| 2011/0124253 A1 | 5/2011 | Shah et al. |
| 2011/0132834 A1 | 6/2011 | Tomioka et al. |
| 2011/0139707 A1 | 6/2011 | Siwy et al. |
| 2011/0152795 A1 | 6/2011 | Aledo et al. |
| 2011/0189440 A1 | 8/2011 | Appleby et al. |
| 2011/0201201 A1 | 8/2011 | Arnold et al. |
| 2011/0202201 A1 | 8/2011 | Matsubara |
| 2011/0253630 A1 | 10/2011 | Bakajin et al. |
| 2011/0258791 A1 | 10/2011 | Batchvarova et al. |
| 2011/0258796 A1 | 10/2011 | Batchvarova et al. |
| 2011/0262645 A1 | 10/2011 | Batchvarova et al. |
| 2011/0263912 A1 | 10/2011 | Miller et al. |
| 2011/0269920 A1 | 11/2011 | Min et al. |
| 2012/0000845 A1 | 1/2012 | Park et al. |
| 2012/0031833 A1 | 2/2012 | Ho et al. |
| 2012/0048804 A1 | 3/2012 | Stetson et al. |
| 2012/0115243 A1 | 5/2012 | Pitkanen et al. |
| 2012/0116228 A1 | 5/2012 | Okubo |
| 2012/0145548 A1 | 6/2012 | Sivan et al. |
| 2012/0148633 A1 | 6/2012 | Sun et al. |
| 2012/0162600 A1 | 6/2012 | Pugh et al. |
| 2012/0183738 A1 | 7/2012 | Zettl et al. |
| 2012/0186850 A1 | 7/2012 | Sugiyama et al. |
| 2012/0211367 A1 | 8/2012 | Vecitis |
| 2012/0218508 A1 | 8/2012 | Pugh et al. |
| 2012/0219203 A1 | 8/2012 | Adachi |
| 2012/0220053 A1 | 8/2012 | Lee et al. |
| 2012/0234453 A1 | 9/2012 | Pugh et al. |
| 2012/0234679 A1 | 9/2012 | Garaj et al. |
| 2012/0235277 A1 | 9/2012 | Pugh et al. |
| 2012/0236254 A1 | 9/2012 | Pugh et al. |
| 2012/0236524 A1 | 9/2012 | Pugh et al. |
| 2012/0241371 A1 | 9/2012 | Revanur et al. |
| 2012/0242953 A1 | 9/2012 | Pugh et al. |
| 2012/0255899 A1 | 10/2012 | Choi et al. |
| 2012/0267337 A1 | 10/2012 | Striemer et al. |
| 2012/0292245 A1 | 11/2012 | Saito |
| 2012/0298396 A1 | 11/2012 | Hong et al. |
| 2012/0301707 A1 | 11/2012 | Kinloch et al. |
| 2013/0015136 A1 | 1/2013 | Bennett |
| 2013/0034760 A1 | 2/2013 | Otts et al. |
| 2013/0045523 A1 | 2/2013 | Leach et al. |
| 2013/0056367 A1 | 3/2013 | Martinez et al. |
| 2013/0071941 A1 | 3/2013 | Miller |
| 2013/0096292 A1 | 4/2013 | Brahmasandra et al. |
| 2013/0100436 A1 | 4/2013 | Jackson et al. |
| 2013/0105417 A1 | 5/2013 | Stetson et al. |
| 2013/0108839 A1 | 5/2013 | Arnold et al. |
| 2013/0116541 A1 | 5/2013 | Gracias et al. |
| 2013/0131214 A1 | 5/2013 | Scales et al. |
| 2013/0135578 A1 | 5/2013 | Pugh et al. |
| 2013/0146221 A1 | 6/2013 | Kolmakov et al. |
| 2013/0146480 A1 | 6/2013 | Garaj et al. |
| 2013/0152386 A1 | 6/2013 | Pandojirao-S et al. |
| 2013/0174968 A1 | 7/2013 | Vlassiouk et al. |
| 2013/0174978 A1 | 7/2013 | Pugh et al. |
| 2013/0176030 A1 | 7/2013 | Simon |
| 2013/0190476 A1 | 7/2013 | Lancaster et al. |
| 2013/0192460 A1 | 8/2013 | Miller et al. |
| 2013/0192461 A1 | 8/2013 | Miller et al. |
| 2013/0194540 A1 | 8/2013 | Pugh et al. |
| 2013/0213568 A1 | 8/2013 | Pugh et al. |
| 2013/0215377 A1 | 8/2013 | Pugh et al. |
| 2013/0215378 A1 | 8/2013 | Pugh et al. |
| 2013/0215380 A1 | 8/2013 | Pugh et al. |
| 2013/0216581 A1 | 8/2013 | Fahmy et al. |
| 2013/0240355 A1 | 9/2013 | Ho et al. |
| 2013/0240437 A1 | 9/2013 | Rodrigues et al. |
| 2013/0248097 A1 | 9/2013 | Ploss, Jr. |
| 2013/0248367 A1 | 9/2013 | Stetson et al. |
| 2013/0249147 A1 | 9/2013 | Bedworth |
| 2013/0256118 A1 | 10/2013 | Meller et al. |
| 2013/0256139 A1 | 10/2013 | Peng |
| 2013/0256154 A1 | 10/2013 | Peng |
| 2013/0256210 A1 | 10/2013 | Fleming |
| 2013/0256211 A1 | 10/2013 | Fleming |
| 2013/0261568 A1 | 10/2013 | Martinson et al. |
| 2013/0269819 A1 | 10/2013 | Ruby et al. |
| 2013/0270188 A1 | 10/2013 | Karnik et al. |
| 2013/0273288 A1 | 10/2013 | Luo et al. |
| 2013/0277305 A1 | 10/2013 | Stetson et al. |
| 2013/0277573 A1 | 10/2013 | Miller et al. |
| 2013/0284665 A1 | 10/2013 | Lee et al. |
| 2013/0295150 A1 | 11/2013 | Chantalat et al. |
| 2013/0309776 A1 | 11/2013 | Drndic et al. |
| 2013/0317131 A1 | 11/2013 | Scales et al. |
| 2013/0317132 A1 | 11/2013 | Scales et al. |
| 2013/0317133 A1 | 11/2013 | Scales et al. |
| 2013/0323295 A1 | 12/2013 | Scales et al. |
| 2013/0335092 A1 | 12/2013 | Wu |
| 2013/0338611 A1 | 12/2013 | Pugh et al. |

(56) References Cited

U.S. PATENT DOCUMENTS

| | | |
|---|---|---|
| 2013/0338744 A1 | 12/2013 | Frewin et al. |
| 2014/0002788 A1 | 1/2014 | Otts et al. |
| 2014/0005514 A1 | 1/2014 | Pugh et al. |
| 2014/0015160 A1 | 1/2014 | Kung et al. |
| 2014/0017322 A1 | 1/2014 | Dai et al. |
| 2014/0030482 A1* | 1/2014 | Miller ............... C01B 31/0484 428/139 |
| 2014/0048411 A1 | 2/2014 | Choi et al. |
| 2014/0066958 A1 | 3/2014 | Priewe |
| 2014/0079936 A1 | 3/2014 | Russo et al. |
| 2014/0093728 A1 | 4/2014 | Shah et al. |
| 2014/0128891 A1 | 5/2014 | Astani-Matthies et al. |
| 2014/0141521 A1 | 5/2014 | Peng et al. |
| 2014/0151288 A1 | 6/2014 | Miller et al. |
| 2014/0151631 A1 | 6/2014 | Duesberg et al. |
| 2014/0154464 A1 | 6/2014 | Miller et al. |
| 2014/0170195 A1 | 6/2014 | Fassih et al. |
| 2014/0171541 A1 | 6/2014 | Scales et al. |
| 2014/0174927 A1 | 6/2014 | Bashir et al. |
| 2014/0190004 A1 | 7/2014 | Riall et al. |
| 2014/0190550 A1 | 7/2014 | Loh et al. |
| 2014/0190676 A1 | 7/2014 | Zhamu et al. |
| 2014/0190833 A1 | 7/2014 | Lieber et al. |
| 2014/0192313 A1 | 7/2014 | Riall et al. |
| 2014/0192314 A1 | 7/2014 | Riall et al. |
| 2014/0199777 A2 | 7/2014 | Ruiz et al. |
| 2014/0209539 A1 | 7/2014 | El Badawi et al. |
| 2014/0212596 A1 | 7/2014 | Jahangiri-Famenini |
| 2014/0230653 A1 | 8/2014 | Yu et al. |
| 2014/0230733 A1 | 8/2014 | Miller |
| 2014/0231351 A1 | 8/2014 | Wickramasinghe et al. |
| 2014/0248621 A1 | 9/2014 | Collins |
| 2014/0253131 A1 | 9/2014 | Liu et al. |
| 2014/0257348 A1 | 9/2014 | Priewe et al. |
| 2014/0257515 A1 | 9/2014 | So et al. |
| 2014/0257517 A1 | 9/2014 | Deichmann et al. |
| 2014/0259657 A1 | 9/2014 | Riall et al. |
| 2014/0261999 A1 | 9/2014 | Stetson et al. |
| 2014/0263035 A1 | 9/2014 | Stoltenberg et al. |
| 2014/0263178 A1 | 9/2014 | Sinton et al. |
| 2014/0264977 A1 | 9/2014 | Pugh et al. |
| 2014/0268015 A1 | 9/2014 | Riall et al. |
| 2014/0268020 A1 | 9/2014 | Pugh et al. |
| 2014/0268021 A1 | 9/2014 | Pugh et al. |
| 2014/0268026 A1 | 9/2014 | Pugh et al. |
| 2014/0272286 A1 | 9/2014 | Stoltenberg et al. |
| 2014/0272522 A1 | 9/2014 | Pugh et al. |
| 2014/0273315 A1 | 9/2014 | Pugh et al. |
| 2014/0273316 A1 | 9/2014 | Pugh et al. |
| 2014/0276481 A1 | 9/2014 | Pugh et al. |
| 2014/0276999 A1 | 9/2014 | Harms et al. |
| 2014/0306361 A1 | 10/2014 | Pugh et al. |
| 2014/0308681 A1 | 10/2014 | Strano et al. |
| 2014/0311967 A1 | 10/2014 | Grossman et al. |
| 2014/0315213 A1 | 10/2014 | Nagrath et al. |
| 2014/0318373 A1 | 10/2014 | Wood et al. |
| 2014/0322518 A1 | 10/2014 | Addleman et al. |
| 2014/0333892 A1 | 11/2014 | Pugh et al. |
| 2014/0335661 A1 | 11/2014 | Pugh et al. |
| 2014/0343580 A1 | 11/2014 | Priewe |
| 2014/0346081 A1 | 11/2014 | Sowden et al. |
| 2014/0346631 A1 | 11/2014 | Karim et al. |
| 2014/0349892 A1 | 11/2014 | Van Der Zaag et al. |
| 2014/0350372 A1 | 11/2014 | Pugh et al. |
| 2014/0377651 A1 | 12/2014 | Kwon et al. |
| 2014/0377738 A1 | 12/2014 | Bachmann et al. |
| 2015/0015843 A1 | 1/2015 | Pugh et al. |
| 2015/0017918 A1 | 1/2015 | Pugh et al. |
| 2015/0053627 A1 | 2/2015 | Silin et al. |
| 2015/0057762 A1 | 2/2015 | Harms et al. |
| 2015/0061990 A1 | 3/2015 | Toner et al. |
| 2015/0062533 A1 | 3/2015 | Toner et al. |
| 2015/0063605 A1 | 3/2015 | Pugh |
| 2015/0066063 A1 | 3/2015 | Priewe |
| 2015/0075667 A1 | 3/2015 | McHugh et al. |
| 2015/0077658 A1 | 3/2015 | Pugh et al. |
| 2015/0077659 A1 | 3/2015 | Pugh et al. |
| 2015/0077660 A1 | 3/2015 | Pugh et al. |
| 2015/0077661 A1 | 3/2015 | Pugh et al. |
| 2015/0077662 A1 | 3/2015 | Pugh et al. |
| 2015/0077663 A1 | 3/2015 | Pugh et al. |
| 2015/0077699 A1 | 3/2015 | De Sio et al. |
| 2015/0077702 A9 | 3/2015 | Pugh et al. |
| 2015/0079683 A1 | 3/2015 | Yager et al. |
| 2015/0087249 A1 | 3/2015 | Pugh et al. |
| 2015/0096935 A1 | 4/2015 | Mitra et al. |
| 2015/0098910 A1 | 4/2015 | Mordas et al. |
| 2015/0101931 A1 | 4/2015 | Garaj et al. |
| 2015/0105686 A1 | 4/2015 | Vasan |
| 2015/0118318 A1 | 4/2015 | Fahmy et al. |
| 2015/0122727 A1 | 5/2015 | Karnik et al. |
| 2015/0137817 A1 | 5/2015 | Wilson et al. |
| 2015/0138454 A1 | 5/2015 | Pugh et al. |
| 2015/0142107 A1 | 5/2015 | Pugh et al. |
| 2015/0145155 A1 | 5/2015 | Pugh et al. |
| 2015/0146162 A1 | 5/2015 | Pugh et al. |
| 2015/0147474 A1 | 5/2015 | Batchvarova et al. |
| 2015/0170788 A1 | 6/2015 | Miller et al. |
| 2015/0174253 A1 | 6/2015 | Sun et al. |
| 2015/0174254 A1 | 6/2015 | Sun et al. |
| 2015/0182473 A1 | 7/2015 | Bosnyak et al. |
| 2015/0185180 A1 | 7/2015 | Ruhl et al. |
| 2015/0196579 A1 | 7/2015 | Ferrante et al. |
| 2015/0202351 A1 | 7/2015 | Kaplan et al. |
| 2015/0212339 A1 | 7/2015 | Pugh et al. |
| 2015/0217219 A1 | 8/2015 | Sinsabaugh et al. |
| 2015/0218210 A1 | 8/2015 | Stetson et al. |
| 2015/0221474 A1 | 8/2015 | Bedworth |
| 2015/0231557 A1 | 8/2015 | Miller et al. |
| 2015/0231577 A1 | 8/2015 | Nair et al. |
| 2015/0247178 A1 | 9/2015 | Mountcastle et al. |
| 2015/0258254 A1 | 9/2015 | Simon et al. |
| 2015/0258498 A1 | 9/2015 | Simon et al. |
| 2015/0258502 A1 | 9/2015 | Turowski |
| 2015/0258503 A1 | 9/2015 | Sinton et al. |
| 2015/0258506 A1 | 9/2015 | Mi et al. |
| 2015/0258525 A1 | 9/2015 | Westman et al. |
| 2015/0268150 A1 | 9/2015 | Newkirk et al. |
| 2015/0272834 A1 | 10/2015 | Sun et al. |
| 2015/0272896 A1 | 10/2015 | Sun et al. |
| 2015/0273401 A1 | 10/2015 | Miller et al. |
| 2015/0309337 A1 | 10/2015 | Flitsch et al. |
| 2015/0321147 A1 | 11/2015 | Fleming et al. |
| 2015/0321149 A1 | 11/2015 | McGinnis |
| 2015/0323811 A1 | 11/2015 | Flitsch et al. |
| 2015/0336202 A1 | 11/2015 | Bedworth et al. |
| 2015/0342900 A1 | 12/2015 | Putnins |
| 2015/0346382 A1 | 12/2015 | Bliven et al. |
| 2015/0351887 A1 | 12/2015 | Peters |
| 2015/0359742 A1 | 12/2015 | Fassih et al. |
| 2015/0376448 A1* | 12/2015 | Urs ............... C09D 175/04 524/280 |
| 2015/0378176 A1 | 12/2015 | Flitsch et al. |
| 2016/0009049 A1 | 1/2016 | Stoltenberg et al. |
| 2016/0038885 A1 | 2/2016 | Hogen-Esch et al. |
| 2016/0043384 A1 | 2/2016 | Zhamu et al. |
| 2016/0058932 A1 | 3/2016 | Stetson et al. |
| 2016/0059190 A1 | 3/2016 | Yoo et al. |
| 2016/0067390 A1 | 3/2016 | Simon et al. |
| 2016/0074814 A1 | 3/2016 | Park et al. |
| 2016/0074815 A1 | 3/2016 | Sinton et al. |
| 2016/0084008 A1 | 3/2016 | Faircloth et al. |
| 2016/0084981 A1 | 3/2016 | Kayano et al. |
| 2016/0116237 A1* | 4/2016 | Alsadah ............... F28G 3/04 134/8 |
| 2016/0256805 A1 | 9/2016 | Grein et al. |
| 2016/0272499 A1 | 9/2016 | Graphenea |
| 2016/0282326 A1 | 9/2016 | Waduge et al. |
| 2016/0284811 A1 | 9/2016 | Yu et al. |
| 2016/0339160 A1 | 11/2016 | Bedworth et al. |
| 2017/0000937 A1 | 1/2017 | Gottschalk |
| 2017/0032962 A1 | 2/2017 | Graphenea |
| 2017/0035943 A1 | 2/2017 | Simon et al. |
| 2017/0036916 A1 | 2/2017 | Bedworth et al. |

(56) References Cited

U.S. PATENT DOCUMENTS

| | | |
|---|---|---|
| 2017/0037356 A1 | 2/2017 | Simon et al. |
| 2017/0057812 A1 | 3/2017 | Graphenea |
| 2017/0065939 A1 | 3/2017 | Kim et al. |
| 2017/0144107 A1 | 5/2017 | Garaj et al. |
| 2017/0202885 A1 | 7/2017 | Agulnick |
| 2017/0216923 A1 | 8/2017 | Babenko et al. |
| 2017/0217777 A1* | 8/2017 | Hong .............. C01B 31/0484 |
| 2017/0239623 A1 | 8/2017 | Stoltenberg et al. |
| 2017/0296706 A1 | 10/2017 | Simon et al. |
| 2017/0296972 A1 | 10/2017 | Sinton et al. |
| 2017/0296976 A1 | 10/2017 | Liu et al. |
| 2017/0296979 A1 | 10/2017 | Swett et al. |
| 2018/0147542 A1 | 5/2018 | Jhon et al. |
| 2018/0207591 A1 | 7/2018 | Yu et al. |

FOREIGN PATENT DOCUMENTS

| | | |
|---|---|---|
| CN | 1128501 A | 8/1996 |
| CN | 101108194 A | 1/2008 |
| CN | 101243544 | 8/2008 |
| CN | 101428198 A | 5/2009 |
| CN | 101489653 A | 7/2009 |
| CN | 101996853 A | 3/2011 |
| CN | 102242062 A | 11/2011 |
| CN | 102344132 | 2/2012 |
| CN | 102423272 | 4/2012 |
| CN | 102592720 A | 7/2012 |
| CN | 101996853 B | 8/2012 |
| CN | 102637584 A | 8/2012 |
| CN | 103153441 | 6/2013 |
| CN | 103182249 A | 7/2013 |
| CN | 203235358 | 10/2013 |
| CN | 103480281 | 1/2014 |
| CN | 103585891 | 2/2014 |
| CN | 103603706 A | 2/2014 |
| DE | 19536560 | 3/1997 |
| DE | 10 2005 049 388 A | 4/2007 |
| EP | 0 364 628 A1 | 4/1990 |
| EP | 1 034 251 | 1/2004 |
| EP | 1 777 250 A1 | 4/2007 |
| EP | 1 872 812 | 1/2008 |
| EP | 2 060 286 | 5/2009 |
| EP | 2 107 120 A1 | 10/2009 |
| EP | 2 230 511 A1 | 9/2010 |
| EP | 1 603 609 | 5/2011 |
| EP | 2 354 272 | 8/2011 |
| EP | 2 450 096 | 5/2012 |
| EP | 2 489 520 | 8/2012 |
| EP | 2 511 002 | 10/2012 |
| EP | 2 586 473 | 5/2013 |
| EP | 2 679 540 | 1/2014 |
| EP | 2 937 313 | 10/2015 |
| EP | 3 070 053 | 9/2016 |
| EP | 3 084 398 | 10/2016 |
| EP | 1 538 2430.5 | 3/2017 |
| EP | 3 135 631 | 3/2017 |
| JP | 59-102111 | 7/1984 |
| JP | 10-510471 | 5/1995 |
| JP | 7504120 | 5/1995 |
| JP | 2001-232158 | 8/2001 |
| JP | 2002-126510 | 5/2002 |
| JP | 2004-179014 | 6/2004 |
| JP | 2005-126966 | 5/2005 |
| JP | 2006-188393 | 7/2006 |
| JP | 2009-291777 | 12/2009 |
| JP | 2011-168448 A | 9/2011 |
| JP | 2011-241479 | 12/2011 |
| JP | 2012-500708 | 1/2012 |
| JP | 2004-202480 | 7/2014 |
| JP | 2015-503405 | 2/2015 |
| JP | 2016-175828 | 10/2016 |
| KR | 1020110084110 | 7/2011 |
| KR | 10-2012-0022164 A | 3/2012 |
| KR | 102012002216 A | 3/2012 |
| KR | 1020120022164 A | 3/2012 |
| KR | 1020140002570 | 1/2014 |
| WO | WO-93/33901 | 3/1993 |
| WO | WO-93/12859 | 8/1993 |
| WO | WO-95/00231 | 1/1995 |
| WO | WO-97/12664 A1 | 4/1997 |
| WO | WO-98/30501 A2 | 7/1998 |
| WO | WO-00/70012 | 11/2000 |
| WO | WO-02/055539 A1 | 7/2002 |
| WO | WO-2013/115762 | 8/2003 |
| WO | WO-2004/009840 A1 | 1/2004 |
| WO | WO-2004/082733 | 9/2004 |
| WO | WO-2005/047857 A2 | 5/2005 |
| WO | WO-2007/103411 A2 | 9/2007 |
| WO | WO-2007/140252 A1 | 12/2007 |
| WO | WO-2008/008533 | 1/2008 |
| WO | WO-2009/129984 A1 | 10/2009 |
| WO | WO-2010/006080 | 1/2010 |
| WO | WO-2010/115904 A1 | 10/2010 |
| WO | WO-2011/019686 A1 | 2/2011 |
| WO | WO-2011/046706 A1 | 4/2011 |
| WO | WO-2011/001674 | 6/2011 |
| WO | WO-2011/063458 A1 | 6/2011 |
| WO | WO-2011/075158 | 6/2011 |
| WO | WO-2011/094204 A2 | 8/2011 |
| WO | WO-2011/100458 A2 | 8/2011 |
| WO | WO-2011/138689 A2 | 11/2011 |
| WO | WO-2012/006657 A1 | 1/2012 |
| WO | WO-2012/021801 A2 | 2/2012 |
| WO | WO-2012/027148 A1 | 3/2012 |
| WO | WO-2012/028695 | 3/2012 |
| WO | WO-2012/030368 A1 | 3/2012 |
| WO | WO-2012/125770 | 9/2012 |
| WO | WO-2012/138671 A2 | 10/2012 |
| WO | WO-2012/142852 A1 | 10/2012 |
| WO | WO-2013/016445 A1 | 1/2013 |
| WO | WO-2013/048063 A1 | 4/2013 |
| WO | WO-2013/138137 A1 | 9/2013 |
| WO | WO-2013/138698 A1 | 9/2013 |
| WO | WO-2013/151799 | 10/2013 |
| WO | WO-2013/152179 A1 | 10/2013 |
| WO | WO-2014/084856 | 6/2014 |
| WO | WO-2014/084861 A1 | 6/2014 |
| WO | WO-2014/168629 A1 | 10/2014 |
| WO | WO-2015/030698 A1 | 3/2015 |
| WO | WO-2015/110277 | 7/2015 |
| WO | WO-2015/138736 A1 | 9/2015 |
| WO | WO-2015/138752 A1 | 9/2015 |
| WO | WO-2015/1138771 A1 | 9/2015 |
| WO | WO-2015/197217 | 12/2015 |
| WO | WO-2016/102003 | 6/2016 |

OTHER PUBLICATIONS

EP Office Action for European Application No. 15743307.9 dated Aug. 8, 2017. (17 pages).
European Search Report dated Aug. 28, 2017 from related EP application 15743750.0. (7 pages).
International Search Report and Written Opinion dated Aug. 14, 2017 from related PCT application PCT/US2017/031537. (12 pages).
Jiang, L. et al., Design of advanced porous grapheme materials: from grapheme nanomesh to 3D architectures. Nanoscale, Oct. 16, 2013, vol. 6, pp. 1922-1945.
JP Office Action in Japanese Application No. 2015-503405 dated Jun. 28, 2017. (English translation) (6 pages).
JP Office Action in Japanese Application No. 2015-549508 dated Jun. 27, 2017 (English translation).
Li, R.H. "Materials for immunoisolated cell transplantation". Adv. Drug Deliv. Rev. 33, 87-109 (1998).
Schweitzer, Handbook of Separation Techniques for Chemical Engineers, 1979, McGraw-Hill Book Company, pp. 2-5 to 2-8.
Search Report and Written Opinion dated Aug. 14, 2017 for Singapore Application No. 11201606287V. (10 pages).
Search Report and Written Opinion dated Aug. 22, 2017 for Singapore Application No. 11201607584P. (7 pages).
Sears et al., "Recent Developments in Carbon Nanotube Membranes for Water Purification and Gas Separation" Materials, vol. 3 (Jan. 4, 2010), pp. 127-149.

(56) References Cited

OTHER PUBLICATIONS

U.S. Notice of Allowance in U.S. Appl. No. 14/193,007 dated Sep. 6, 2017. (9 pages).
U.S. Notice of Allowance in U.S. Appl. No. 14/656,580 dated Sep. 5, 2017. (8 pages).
U.S. Office Action for U.S. Appl. No. 14/609,325 dated Aug. 25, 2017. (7 pages).
U.S. Office Action for U.S. Appl. No. 15/099,193 dated Jul. 19, 2017. (13 pages).
U.S. Office Action for U.S. Appl. No. 15/289,944 dated Jul. 13, 2017. (18 pages).
U.S. Office Action for U.S. Appl. No. 15/332,982 dated Aug. 18, 2017. (9 pages).
EPO Extended Search Report for European Application No. 171684883.5 dated Jul. 25, 2017 (8 pages).
EPO Supplementary Search Report for European Application No. 15762019.6 dated Aug. 9, 2017 (16 pages).
U.S. Notice of Allowance in U.S. Appl. No. 14/610,770 dated Sep. 26, 2017. (12 pages).
U.S. Notice of Allowance in U.S. Appl. No. 15/332,982 dated Sep. 21, 2017. (5 pages).
U.S. Office Action in U.S. Appl. No. 15/099,099 dated Oct. 5, 2017 (11 pages).
U.S. Office Action in U.S. Appl. No. 15/099,447 dated Oct. 3, 2017 (21 pages).
Weisen, et al., "Fabrication of nanopores in a graphene sheet with heavy ions: A molecular dynamics study", Journal of Applied Physics 114, 234304 (2013), pp. 234304-1 to 234304-6.
Dong et al., "Growth of large-sized graphene thin-films by liquid precursor-based chemical vapor deposition under atmospheric pressure," Carbon 49(11): 3672-3678 (May 2011).
Hong et al., "Graphene multilayers as gates for multi-week sequential release of proteins from surfaces," NIH-PA Author Manuscript PMC (Jun. 1, 2014), also published in ACS Nano, Jan. 24, 2012; 6(1): 81-88 (first published online Dec. 29, 2011).
Hu et al., "Enabling graphene oxide nanosheets as water separation membranes," Environmental Science & Technology, 47(8): 3715-3723 (Mar. 14, 2013).
International Search Report and Written Opinion of the International Searching Authority dated Jul. 22, 2016, from related international patent application PCT/US2016/027607.
International Search Report and Written Opinion of the International Searching Authority dated Jul. 22, 2016, from related international patent application PCT/US2016/027616.
International Search Report and Written Opinion of the International Searching Authority dated Jul. 22, 2016, from related PCT application PCT/US2016/027596.
International Search Report and Written Opinion of the International Searching Authority dated Jul. 22, 2016, from related PCT application PCT/US2016/027603.
International Search Report and Written Opinion of the International Searching Authority dated Jul. 22, 2016, from related PCT application PCT/US2016/027610.
International Search Report and Written Opinion of the International Searching Authority dated Jul. 22, 2016, from related PCT application PCT/US2016/027612.
International Search Report and Written Opinion of the International Searching Authority dated Jun. 22, 2016, from related PCT application PCT/US2016/027637.
Kurapati et al., "Graphene oxide based multilayer capsules with unique permeability properties: facile encapsulation of multiple drugs," Chemical Communication 48: 6013-6015 (Apr. 25, 2012).
Li et al., "3D graphene oxide-polymer hydrogel: near-infrared light-triggered active scaffold for reversible cell capture and on-demand release," Advanced Materials 25: 6737-6743 (Oct. 7, 2013).
Marquardt et al., "Hybrid materials of platinum nanoparticles and thiol-functionalized graphene derivatives," Carbon 66: 285-294 (Jan. 2014; first published online Sep. 12, 2013).
Nam et al., "Monodispersed PtCo nanoparticles on hexadecyltrimethylammonium bromide treated graphene as an effective oxygen reduction reaction catalyst for proton exchange membrane fuel cells," Carbon 50: 3739-3747 (Aug. 2012; first published online Apr. 5, 2012).
Nandamuri et al., "Chemical vapor deposition of graphene films," Nanotechnology 21(14): 1-4 (Mar. 10, 2010).
Nayini et al., "Synthesis and characterization of functionalized carbon nanotubes with different wetting behaviors and their influence on the wetting properties of carbon nanotubes/polymethylmethacrylate coatings," Progress in Organic Coatings 77(6): 1007-1014 (Mar. 2014).
Sun et al., "Growth of graphene from solid carbon sources," Nature 468(7323): 549-552 (Nov. 25, 2010; including corrigendum in Nature 471(7336): 124 (Mar. 2011).
Tang et al., "Highly wrinkled cross-linked graphene oxide membranes for biological and charge-storage applications," Small 8(3): 423-431 (Feb. 6, 2012; first published online Dec. 13, 2011).
Adiga et al., "Nanoporous Materials for Biomedical Devices," JOM 60: 26-32 (Mar. 25, 2008).
AMI Applied Membranes Inc. (undated). FilmTec Nanofiltration Membrane Elements. Retrieved Jun. 1, 2016, from http://www.appliedmembranes.com/filmtec-nanofiltration-membrane-elements.html.
Apel, "Track etching technique in membrane technology," Radiation Measurements 34(1-6): 559-566 (Jun. 2001).
Bae et al., "Roll-to-roll production of 30-inch graphene films for transparent electrodes," Nature Nanotechnology 5: 574-578 (Jun. 20, 2010).
Bai et al., "Graphene nanomesh," Nature Nanotechnology 5: 190-194 (Feb. 14, 2010).
Baker. (2004). Track-etch Membranes. In Membrane Technology and Applications (2nd ed., pp. 92-94). West Sussex, England: John Wiley & Sons.
Butler et al. "Progress, Challenges, and Opportunities in Two-Dimensional Materials Beyond Graphene", Materials Review 7(4): 2898-2926 (Mar. 6, 2013).
Chhowalla et al., "The chemistry of two-dimensional layered transition metal dichalcogenide nanosheets," Nature Chemistry 5: 263-275 (Mar. 20, 2013).
Childres et al., "Effect of oxygen plasma etching on graphene studied using Raman spectroscopy and electronic transport measurements," New Journal of Physics 13 (Feb. 10, 2011).
Clochard. (undated). Radiografted track-etched polymer membranes for research and application [Scholarly project]. In Laboratoire Des Solides Irradiés. Retrieved Jun. 2, 2016, from http://iramis.cea.fr/radiolyse/5juin2015/Clochard.pdf.
Cohen-Tanugi et al, "Water Desalination across Nanoporous Graphene," ACS Nano Letters 12(7): 3602-3608 (Jun. 5, 2012).
Cohen-Tanugi, "Nanoporous graphene as a water desalination membrane," Thesis: Ph.D., Massachusetts Institute of Technology, Department of Materials Science and Engineering (Jun. 2015).
Colton, "Implantable biohybrid artificial organs," Cell Transplantation 4(4): 415-436 (Jul.-Aug. 1995).
Desai et al., "Nanoporous microsystems for islet cell replacement," Advanced Drug Delivery Reviews 56: 1661-1673 (Jul. 23, 2004).
Fischbein et al., "Electron beam nanosculpting of suspended graphene sheets," Applied Physics Letters 93(113107): 1-3, (Sep. 16, 2008).
Fissell et al., "High-Performance Silicon Nanopore Hemofiltration Membranes," NIH-PA Author Manuscript, PMC, (Jan. 5, 2010), also published in J. Memb. Sci. 326(1): 58-63 (Jan. 5, 2009).
Gimi et al., "A Nanoporous, Transparent Microcontainer for Encapsulated Islet Therapy," J. Diabetes Sci. Tech. 3(2): 1-7 (Mar. 2009).
Jiang et al., "Porous Graphene as the Ultimate Membrane for Gas Separation," Nano Letters 9(12): 4019-4024 (Sep. 23, 2009).
Joshi et al., "Precise and ultrafast molecular sieving through graphene oxide membranes", Science 343(6172): 752-754 (Feb. 14, 2014).
Kanani et al., "Permeability—Selectivity Analysis for Ultrafiltration: Effect of Pore Geometry," NIH-PA Author Manuscript, PMC, (Mar. 1, 2011), also published in J. Memb. Sci. 349(1-2): 405 (Mar. 1, 2010).
Karan et al., "Ultrafast Viscous Permeation of Organic Solvents Through Diamond-Like Carbon Nanosheets," Science 335: 444-447 (Jan. 27, 2012).

(56) References Cited

OTHER PUBLICATIONS

Kim et al., "Fabrication and Characterization of Large Area, Semiconducting Nanoperforated Graphene Materials," Nano Letters 10(4): 1125-1131 (Mar. 1, 2010).
Kim et al., "The structural and electrical evolution of graphene by oxygen plasma-induced disorder," Nanotechnology IOP 20(375703): 1-8 (Aug. 26, 2009).
Koski and Cui, "The New Skinny in Two-Dimensional Nanomaterials", ACS Nano 7(5): 3739-3743 (May 16, 2013).
Liu et al., "Atomically Thin Molybdenum Disulfide Nanopores with High Sensitivity for DNA Translocation," ACS Nano 8(3): 2504-2511 (Feb. 18, 2014).
Liu et al., "Graphene Oxidation: Thickness-Dependent Etching and Strong Chemical Doping," Nano Letters 8(7): 1965-1970 (Jun. 19, 2008).
Mishra et al., "Functionalized Graphene Sheets for Arsenic Removal and Desalination of Sea Water," Desalination 282: 39-45 (Nov. 1, 2011).
Morse, "Scalable Synthesis of Semiconducting Nanopatterned Graphene Materials," InterNano Resources for Nanomanufacturing (undated). Retrieved Jun. 2, 2016 from: http://www.internano.org/node/345.
Nair et al., "Unimpeded Permeation of Water Through Helium-Leak-tight Graphene-Based Membranes," Science 335: 442-444 (Jan. 27, 2012).
O'Hern et al. "Selective Molecular Transport through Intrinsic Defects in a Single Layer of CVD Graphene," ACS Nano, 6(11): 10130-10138 (Oct. 2, 2012).
O'Hern et al., "Selective Ionic Transport through Tunable Subnanometer Pores in Single-Layer Graphene Membranes," Nano Letters 14(3): 1234-1241 (Feb. 3, 2014).
Paul, "Creating New Types of Carbon-Based Membranes," Science 335: 413-414 (Jan. 27, 2012).
Schweicher et al., "Membranes to achieve immunoprotection of transplanted islets," NIH-PA Author Manuscript, PMC, (Nov. 13, 2014), also published in Frontiers in Bioscience (Landmark Ed) 19: 49-76 (Jan. 1, 2014).
Sint et al., "Selective Ion Passage through Functionalized Graphene Nanopores," JACS 130: 16448-16449 (Nov. 14, 2008).
Suk et al., "Water Transport Through Ultrathin Graphene," Journal of Physical Chemistry Letters 1(10): 1590-1594 (Apr. 30, 2010).
Tan et al., "Beta-cell regeneration and differentiation: how close are we to the 'holy grail'?" J. Mol. Encodrinol. 53(3): R119-R129 (Dec. 1, 2014).
Vlassiouk et al., "Versatile ultrathin nanoporous silicon nitride membranes," Proc. Natl. Acad. Sci. USA 106(50): 21039-21044 (Dec. 15, 2009).
Wadvalla, "Boosting agriculture through seawater," Nature Middle East (Jul. 2, 2012). Retrieved Jun. 1, 2016 from: natureasia.com/en/nmiddleeast/article/10.1038/nmiddleeast.2012.92?WT.mc_id=FBK_NatureMEast].
Wikipedia, "Ion track." Jun. 1, 2016. Retrieved Jun. 1, 2016 from: en.wikipedia.org/wiki/ion_track.
Xu et al., "Graphene-like Two-Dimensional Materials", Chemical Reviews 113: 3766-3798 (Jan. 3, 2013).
Zan et al., "Graphene Reknits Its Holes," Nano Lett. 12(8): 3936-3940 (Jul. 5, 2012).
Zhao et al. "Two-Dimensional Material Membranes: An Emerging Platform for Controllable Mass Transport Applications," Small 10(22): 4521-4542 (Sep. 10, 2014).
Office Action for Indian Appl. Ser. 1566/DELNP/2013 dated Feb. 2, 2018 (7 pages).
Office Action for Japanese Appl. Ser. No. 2016-521448 dated Mar. 16, 2018 (5 pages).
Skrzypek et al., "Pancreatic islet macroencapsulation using microwell porous membranes", Scientific Reports, 7: 9186 | DOI:10.1038/s41598-017-09647-7, Aug. 23, 2017 (12 pages).
U.S. Notice of Allowance for U.S. Appl. No. 15/099,464 dated Feb. 28, 2018 (5 pages).
U.S. Office Action for U.S. Appl. No. 15/099,276 dated Mar. 22, 2018 (13 pages).
U.S. Office Action for U.S. Appl. No. 15/453,441 dated Mar. 22, 2018 (7 pages).
Chen et al., "Hierarchically porous graphene-based hybrid electrodes with excellent electrochemical performance", Journal of Materials Chemistry A: Materials for Energy and Sustainability, vol. 1, No. 33, Jan. 1, 2013, pp. 9409-9413.
Chinese Office Action in Application No. 201580006829.5 dated Jan. 23, 2018 (with English translation) (13 pages).
European Extended Search Report in Application No. 15786691.4 dated Dec. 1, 2017 (10 pages).
European Extended Search Report in Application No. 15789852.9 dated Dec. 6, 2017 (8 pages).
Japanese Office Action in Application No. 2017-042023 dated Jan. 9, 2018 (with English translation) (9 pages).
Singapore Search Report and Written Opinion in Application No. 11201701654U dated Dec. 6, 2017 (6 pages).
Taiwanese Office Action in Application No. 102146079 dated Dec. 12, 2017 (with English translation) (4 pages).
U.S. Notice of Allowance in U.S. Appl. No. 14/843,944 dated Feb. 9, 2018 (9 pages).
U.S. Office Action for U.S. Appl. No. 15/099,482 dated Feb. 23, 2018 (9 pages).
U.S. Office Action in U.S. Appl. No. 14/609,325 dated Jan. 16, 2018 (11 pages).
U.S. Office Action in U.S. Appl. No. 14/656,190 dated Jan. 10, 2018 (14 pages).
U.S. Office Action in U.S. Appl. No. 14/856,471 dated Jan. 11, 2018 (36 pages).
U.S. Office Action in U.S. Appl. No. 15/099,099 dated Feb. 15, 2018 (13 pages).
U.S. Office Action in U.S. Appl. No. 15/099,588 dated Feb. 1, 2018 (6 pages).
Wang et al., "Preparation of high-surface-area carbon nanoparticle/graphene composites", Carbon, Elsevier, Oxford, GB, vol. 50, No. 10, Apr. 8, 2012, pp. 3845-3853.
Notice of Allowance for U.S. Appl. No. 14/819,273 dated Oct. 28, 2016.
U.S. Office Action for U.S. Appl. No. 14/193,007 dated Oct. 21, 2016.
U.S. Office Action for U.S. Appl. No. 14/193,007 dated Dec. 21, 2015.
U.S. Office Action for U.S. Appl. No. 14/193,007 dated Jul. 1, 2016.
International Search Report dated Dec. 4, 2015, in related international application PCT/US2015/048205.
International Search Report dated Jun. 10, 2015, from related international application PCT/US15/20201.
U.S. Notice of Allowance in U.S. Appl. No. 14/610,770 dated Jan. 23, 2017.
U.S. Notice of Allowance in U.S. Appl. No. 14/856,198 dated Feb. 10, 2017.
U.S. Notice of Allowance in U.S. Appl. No. 14/856,198 dated Mar. 1, 2017.
U.S. Office Action in U.S. Appl. No. 14/609,325 dated Feb. 16, 2017.
U.S. Office Action in U.S. Appl. No. 14/193,007 dated Mar. 23, 2017.
U.S. Office Action in U.S. Appl. No. 14/656,580 dated Feb. 9, 2017.
U.S. Office Action in U.S. Appl. No. 14/843,944 dated Jan. 6, 2017.
U.S. Office Action in U.S. Appl. No. 15/099,464 dated Mar. 10, 2017.
Barreiro et al. "Understanding the catalyst-free transformation of amorphous carbon into graphene by current-induced annealing," Scientific Reports, 3 (Article 1115): 1-6 (Jan. 2013).
Botari et al., "Graphene healing mechanisms: A theoretical investigation," Carbon, 99: 302-309 (Apr. 2016) (published online Dec. 2015).
Chen et al., "Defect Scattering in Graphene," Physical Review Letters, 102: 236805-1-236805-4 (Jun. 2009).
Chen et al., "Self-healing of defected graphene," Applied Physics Letters, 102(10): 103107-1-103107-5 (Mar. 2013).
Cheng et al., "Ion Transport in Complex Layered Graphene-Based Membranes with Tuneable Interlayer Spacing," Science Advances, 2(2): e1501272 (9 pages) (Feb. 2016).

(56) References Cited

OTHER PUBLICATIONS

Crock et al., "Polymer Nanocomposites with Graphene-Based Hierarchical Fillers as Materials for Multifunctional Water Treatment Membranes," Water Research, 47(12): 3984-3996 (Aug. 2013) (published online Mar. 2013).
Han et al., "Ultrathin Graphene Nanofiltration Membrane for Water Purification," Advanced Functional Materials, 23(29): 3693-3700 (Aug. 2013).
International Search Report and Written Opinion in PCT/US2016/027583 dated Jan. 13, 2017.
Written Opinion in PCT/US2016/027590 dated Jan. 6, 2017.
International Search Report and Written Opinion in PCT/US2016/027594 dated Jan. 13, 2017.
International Search Report and Written Opinion in PCT/US2016/027628 dated Jan. 9, 2017.
International Search Report and Written Opinion in PCT/US2016/027631 dated Jan. 13, 2017.
International Search Report and Written Opinion in PCT/US2016/027632 dated Jan. 9, 2017.
Written Opinion in PCT/US2016/052010 dated Dec. 20, 2016.
International Search Report in PCT/US2016/027629 dated Dec. 8, 2016.
International Search Report in PCT/US2016/052007 dated Dec. 27, 2016.
Kjeldsen, T., "Yeast secretory expression of insulin precursors," Appl Microbiol Biotechnol, 54: 277-286 (May 2000).
Lin et al., "A Direct and Polymer-Free Method for Transferring Graphene Grown by Chemical Vapor Deposition to Any Substrate," ACSNANO, 8(2): 1784-1791 (Jan. 2014).
Liu et al. "Synthesis of high-quality monolayer and bilayer graphene on copper using chemical vapor deposition," Carbon, 49(13): 4122-4130 (Nov. 2011) (published online May 2011).
O'Hern et al., "Nanofiltration across defect-sealed nanoporous monolayer graphene," Nano Letters, 15(5): 3254-3260 (Apr. 2015).
U.S. Corrected Notice of Allowance in U.S. Appl. No. 13/480,569 dated May 26, 2015.
U.S. Notice of Allowance for U.S. Appl. No. 14/610,770 dated Apr. 25, 2016.
U.S. Notice of Allowance in U.S. Appl. No. 14/819,273 dated Dec. 14, 2016.
U.S. Notice of Allowance in U.S. Appl. No. 13/480,569 dated Feb. 27, 2015.
U.S. Office Action in U.S. Appl. No. 13/480,569 dated Jul. 30, 2014.
U.S. Office Action in U.S. Appl. No. 14/856,471 dated Dec. 1, 2016.
U.S. Restriction Requirement in U.S. Appl. No. 14/193,007 dated Jul. 17, 2015.
Wang et al., "Graphene Oxide Membranes with Tunable Permeability due to Embedded Carbon Dots," Chemical Communications, 50(86): 13089-13092 (Nov. 2014) (published online Sep. 2014).
Xu et al., "Graphene Oxide-TiO$_2$ Composite Filtration Membranes and their Potential Application for Water Purification," Carbon, 62: 465-471 (Oct. 2013) (published online Jun. 2013).
Zhao et al., "A glucose-responsive controlled release of insulin system based on enzyme multilayers-coated mesoporous silica particles," Chem. Commun., 47: 9459-9461 (Jun. 2011).
Australian Office Action in Application No. 2013235234 dated Dec. 19, 2017 (5 pages).
Japanese Office Action in Application No. 2017-002652 dated Nov. 24, 2017 (with English translation) (7 pages).
Chu, L., et al., "Porous graphene sandwich/poly(vinylidene fluoride) composites with high dielectric properties," Composites Science and Technology, 86, (2013), pp. 70-75.
European Extended Search Report in Application No. 15743307.9 dated Nov. 15, 2017 (14 pages).
European Extended Search Report in Application No. 15755350.4 dated Oct. 30, 2017 (9 pages).
European Extended Search Report in Application No. 15762019.6 dated Nov. 20, 2017 (12 pages).
European Extended Search Report in Application No. 15762213.5 dated Oct. 10, 2017 (8 pages).
Gu et al., "One-step synthesis of porous graphene-based hydrogels containing oil droplets for drug delivery", Royal Society of Chemistry (RSC), vol. 4, No. 7, Jan. 1, 2014, pp. 3211-3218.
Japanese Office Action in Application No. 2015-549508 dated Nov. 7, 2017 (with English translation) (2 pages).
Kim et al., "Selective Gas Transport Through Few-Layered Graphene and Graphene Oxide Membranes", Science, vol. 342, Oct. 4, 2013, pp. 91-95 (6 total pages).
Singapore Search Report and Written Opinion in Application No. 11201609272T dated Oct. 5, 2017 (11 pages).
U.S. Notice of Allowance in U.S. Appl. No. 15/099,464 dated Nov. 16, 2017 (5 pages).
U.S. Notice of Allowance in U.S. Appl. No. 15/332,982 dated Nov. 1, 2017 (9 pages).
U.S. Office Action in U.S. Appl. No. 14/707,808 dated Nov. 6, 2017 (27 pages).
U.S. Office Action in U.S. Appl. No. 15/099,193 dated Dec. 28, 2017 (25 pages).
U.S. Office Action in U.S. Appl. No. 15/099,304 dated Nov. 24, 2017 (23 pages).
Wang, M., et al., "Interleaved Porous Laminate Composed of Reduced Graphene Oxide Sheets and Carbon Black Spacers by In-Situ Electrophoretic Deposition," The Royal Society of Chemistry (2014), pp. 1-3.
Wimalasiri, Y., et al., "Carbon nanotube/graphene composite for enhanced capacitive deionization performance," Carbon 59 (2013), pp. 464-471.
U.S. Appl. No. 15/099,304, filed Apr. 14, 2016.
U.S. Appl. No. 15/099,295, filed Apr. 14, 2016.
U.S. Appl. No. 15/099,420, filed Apr. 14, 2016.
U.S. Appl. No. 15/099,289, filed Apr. 14, 2016.
U.S. Appl. No. 15/099,276, filed Apr. 14, 2016.
U.S. Appl. No. 15/099,447, filed Apr. 14, 2016.
U.S. Appl. No. 15/099,482, filed Apr. 14, 2016.
U.S. Appl. No. 15/099,269, filed Apr. 14, 2016.
U.S. Appl. No. 15/099,239, filed Apr. 14, 2016.
U.S. Appl. No. 15/099,099, filed Apr. 14, 2016.
U.S. Appl. No. 15/099,056, filed Apr. 14, 2016.
U.S. Appl. No. 15/099,464, filed Apr. 14, 2016.
U.S. Appl. No. 15/099,588, filed Apr. 14, 2016.
U.S. Appl. No. 15/099,193, filed Apr. 14, 2016.
Allen et al., "Craters on silicon surfaces created by gas cluster ion impacts," Journal of Applied Physics, 92(7): 3671-3678 (Oct. 2002).
Atmeh et al., "Albumin Aggregates: Hydrodynamic Shape and Physico-Chemical Properties," Jordan Journal of Chemistry, 2(2): 169-182 (2007).
Chen et al., "Mechanically Strong, Electrically Conductive, and Biocompatible Graphene Paper," Adv. Mater., 20(18): 3557-3561 (Sep. 2008) (available online Jul. 2008).
CN Office Action in Chinese Application No. 201380013988.9 dated Aug. 18, 2016 (English translation not readily available).
Fuertes, "Carbon composite membranes from Matrimid® and Kapton® polyimides for gas separation," Microporous and Mesoporous Materials, 33: 115-125 (1991).
Galashev, "Computer study of the removal of Cu from the graphene surface using Ar clusters," Computational Materials Science, 98: 123-128 (Feb. 2015) (available online Nov. 2014).
International Search Report and Written Opinion in PCT/US2015/013599 dated Jul. 20, 2015.
International Search Report and Written Opinion in PCT/US2015/013805 dated Apr. 30, 2015.
International Search Report and Written Opinion in PCT/US2015/018114 dated Jun. 3, 2015.
International Search Report and Written Opinion in PCT/US2015/020246 dated Jun. 10, 2015.
International Search Report and Written Opinion in PCT/US2015/020296 dated Jun. 17, 2015.
International Search Report and Written Opinion in PCT/US2015/028948 dated Jul. 16, 2015.
International Search Report and Written Opinion in PCT/US2015/029932 dated Oct. 6, 2015.

(56) References Cited

OTHER PUBLICATIONS

Inui et al., "Molecular dynamics simulations of nanopore processing in a graphene sheet by using gas cluster ion beam," Appl. Phys. A, 98: 787-794 (Mar. 2010) (available online Dec. 2009).
Koh et al., "Sensitive NMR Sensors Detect Antibodies to Influenza," NIH PA Author Manuscript PMC (Apr. 2009), also published in Angew. Chem. Int'l. Engl, 47(22): 4119-4121 (May 2008) (available online Apr. 2008).
Lehtinen et al., "Cutting and controlled modification of graphene with ion beams," Nanotechnology, 22: 175306 (8 pages) (Mar. 2011).
Matteucci et al., "Transport of gases and Vapors in Glass and Rubbery Polymers," in Materials Science of Membranes for Gas and Vapor Separation. (Yampolskii et al., eds. 2006) (available online Jun. 2006).
O'Hern et al., "Development of process to transfer large areas of LPCVD graphene from copper foil to a porous support substrate," 1-62 (M.S. Thesis, Massachusetts Institute of Technology, Thesis) (Sep. 2011).
Plant et al. "Size-dependent propagation of Au nanoclusters through few-layer graphene," Nanoscale, 6: 1258-1263 (2014) (available online Oct. 2013).
Popok. "Cluster Ion Implantation in Graphite and Diamond: Radiation Damage and Stopping of Cluster Constituents," Reviews on Advanced Materials Science, 38(1): 7-16 (2014).
Russo et al., "Atom-by-atom nucleation and growth of graphene nanopores," PNAS 109(16): 5953-5957 (Apr. 2012).
U.S. Notice of Allowance in U.S. Appl. No. 14/610,770 dated Aug. 12, 2016.
U.S. Office Action in U.S. Appl. No. 14/656,190 dated Aug. 29, 2016.
U.S. Office Action for U.S. Appl. No. 14/656,580 dated Jun. 2, 2016.
U.S. Office Action in U.S. Appl. No. 14/819,273 dated Jul. 6, 2016.
U.S. Office Action for U.S. Appl. No. 14/856,198 dated Jun. 3, 2016.
Yoon, "Simulations show how to turn graphene's defects into assets," ScienceDaily (Oct. 4, 2016), www.sciencedaily.com/releases/2016/10/161004120428.htm.
Zabihi et al., "Formation of nanopore in a suspended graphene sheet with argon cluster bombardment: A molecular dynamics simulation study," Nuclear Instruments and Methods in Physics Research B, 343: 48-51: (Jan. 2015) (available online Nov. 2014).
Zhang et al. Modern Thin-Film Technology 284-285 (Metallurgical Industry Press, 1st ed. 2009) (English translation not readily available).
Zhao et al. (2012), "Effect of SiO2 substrate on the irradiation-assisted manipulation of supported graphene: a molecular dynamics study," Nanotechnology 23(28): 285703 (Jul. 2012) (available online Jun. 2012).
Zhao et al. (May 2012), "Drilling Nanopores in Graphene with Clusters: A Molecular Dynamics Study," J. Phys. Chem. C, 116(21): 11776-11178 (2012) (available online May 2012).
AE Search and Examination Report for United Arab Emirates Application No. P186/13 dated Oct. 4, 2016.
Agenor et al., "Renal tubular dysfunction in human visceral leishmaniasis (Kala-azar)," Clinical Nephrology 71(5): 492-500 (May 2009) (available online Mar. 21, 2011).
Albert et al., "Ringer's lactate is compatible with the rapid infusion of AS-3 preserved packed red blood cells," Can. J. Anaesth. 56(5): 352-356 (May 2009) (available online Apr. 2, 2009).
Aluru et al. "Modeling electronics on the nanoscale." Handbook of nanoscience, engineering and technology Goddard W, Brenner D, Lyshevski S, Iafrate GJ (2002): 11-1.
Alvarenga, "Carbon nanotube materials for aerospace wiring" Rochester Institute of Technology, 2010.
AMI Applied Membranes Inc., "Filmtec Nanofiltration Membrane Elements", Retrieved from appliedmembranes.com/nanofiltration_elements.htm, accessed Apr. 28, 2015 (2 Pages).
Aso et al., "Comparison of serum high-molecular weight (HMW) adiponectin with total adiponectin concentrations in type 2 diabetic patients with coronary artery using a novel enzyme-linked immunosorbent assay to detect HMW adiponectin," Diabetes 55(7): 1954-1960 (Jul. 2006).
AU Examination Report for Australian Patent Application No. 2013235234, dated Jan. 13, 2017, 4 pages.
AU Examination Report for Australian Patent Application No. 2013363283, dated Jun. 20, 2017, 4 pages.
AU Notice of Acceptance for Australian Application No. 2011293742 dated Jan. 13, 2016.
Axelsson et al., "Acute hyperglycemia induces rapid, reversible increases in glomerular permeability in nondiabetic rats," AM. J. Physiol. Renal Physiol. 298(6): F1306-F1312 (Jun. 2010) (available online Mar. 17, 2010).
Bains et al., "Novel lectins from rhizomes of two Acorus species with mitogenic activity and inhibitory potential towards murine cancer cell lines," Int'l Immunopharmacol. 5(9): 1470-1478 (Aug. 2005) (available online May 12, 2005).
Baker, "Membrane Technology and Applications", Membrane Technology and Applications; Apr. 14, 2004; pp. 92-94.
Barreiro et al. "Transport properties of graphene in the high-current limit." Physical review letters 103.7 (2009): 076601.
Bazargani et al. "Low molecular weight heparin improves peritoneal ultrafiltration and blocks complement and coagulation," Peritoneal Dialysis Int'l 25(4): 394-404 (Jul. 2005-Aug. 2005).
Bazargani, "Acute inflammation in peritoneal dialysis: experimental studies in rats. Characterization of regulatory mechanisms," Swedish Dental J. Supp. 171: 1-57, i (2005).
Beppu et al., "Antidiabetic effects of dietary administration of Aloe arborescens Miller components on multiple low-dose streptozotocin-induced diabetes in mice: investigation on hypoglycemic action and systemic absorption dynamics of aloe components," J. Ethnopharmacol. 103(3): 468-77 (Feb. 20, 2006) (available online Jan. 6, 2006).
Bieri et al. "Two-dimensional Polymer Formation on Surfaces: Insight into the Roles of Precursor Mobility and Reactivity" JACS, 2010, vol. 132, pp. 16669-16676.
Bruin et al., "Maturation and function of human embryonic stem cell-derived pancreatic progenitors in macroencapsulation devices following transplant into mice", Diabetologia (2013), vol. 56: 1987-1998 (Jun. 16, 2013).
Chu Ju, et al. "Modern Biotechnology" East China University of Technology Press, (Sep. 2007), vol. 1; pp. 306-307, ISBN 978-7-5628-2116-8.
Clochard, "Track-Etched Polymer Membranes," Laboratory of Irradiated Solids, Ecole Polytechnique, retrieved from http://www.lsi.polytechnique.fr/home/research/physics-and-chemistry-of-nano-objects/trac . . . , Accessed Jul. 30, 2015 (2 pages).
CN Notification of Grant for Chinese Application No. 201180049184.5 dated Jun. 6, 2016.
CN Office Action for Chinese Application No. 201380014845.X dated Jul. 8, 2016.
CN Office Action for Chinese Application No. 201380014845.X dated Sep. 2, 2015.
CN Office Action for Chinese Application No. 201380019165.5 dated Aug. 25, 2015.
CN Office Action for Chinese Application No. 201380073141.X dated Jun. 8, 2016.
CN Office Action for Chinese Application No. 201380073141.X dated Mar. 21, 2017.
CN Office Action for Chinese Application No. 201480015372.X dated Aug. 2, 2016.
CN Office Action for Chinese Application No. 20118004918.5 dated Jun. 15, 2015.
CN Office Action for Chinese Application No. 201180049184.5 dated Jul. 30, 2014.
CN Office Action for Chinese Application No. 201180049184.5 dated Mar. 4, 2016.
CN Office Action for Chinese Application No. 201380014845.X dated Dec. 23, 2016.
CN Office Action for Chinese Application No. 201380017644.5 dated Feb. 7, 2017.

(56) References Cited

OTHER PUBLICATIONS

CN Office Action for Chinese Application No. 201380017644.5 dated May 26, 2016.
CN Office Action for Chinese Application No. 201380017644.5 dated Sep. 29, 2015.
CN Office Action in Chinese Application No. 201380013988.9 dated Oct. 27, 2015.
Daniel et al. "Implantable Diagnostic Device for Cancer Monitoring." Biosens Bioelectricon. 24(11): 3252-3257 (Jul. 15, 2009).
Database WPI, Week 201238, Thomson Scientific, London, GB; AN 2012-D49442.
De Lannoy et al., "Aquatic Biofouling Prevention by Electrically Charged Nanocomposite Polymer Thin Film Membranes", 2013 American Water Work Association membrane Technology Conference; Environmental science & technology 47.6 (2013): 2760-2768.
Deng et al., "Renal protection in chronic kidney disease: hypoxia-inducible factor activation vs. angiotensin II blockade," Am. J. Physiol. Renal Physiol. 299(6): F1365-F1373 (Dec. 2010) (available online Sep. 29, 2010).
Edwards, "Large Sheets of Graphene Film Produced for Transparent Electrodes (w/ Video)", (Jun. 21, 2010), PhysOrg.com, retrieved on May 15, 2017 from https://phys.org/news/2010-06-large-sheets-graphene-transparentelectrodes.html (2 pages).
EP Office Action for European Application No. 13715529.7 dated Jun. 24, 2016.
Fayerman, "Canadian scientists use stem cells to reverse diabetes in mice", The Telegraph-Journal (New Brunswick), 1-2 (Jun. 29, 2012).
Fayerman, "Diabetes reversed in mice; University of B.C. scientists use embryonic stem cells to deal with Type 1 disease", The Vancouver Sun (British Columbia), 1-2 (Jun. 28, 2012).
Fejes et al. "A review of the properties and CVD synthesis of coiled carbon nanotubes." Materials 3.4 (2010): 2618-2642.
Franzen, C. "MIT Setting Up Industrial-Scale Graphene Printing Press" Sep. 23, 2011, retrieved from http://talkingpointsmemo.com/idealab/mit-setting-up-industrial-scale-graphene-printing-press (2 pages).
Freedman et al., "Genetic basis of nondiabetic end-stage renal disease," Semin. Nephrol. 30(2): 101-110 (Mar. 2010).
Garcia-Lopez et al., "Determination of high and low molecular weight molecules of icodextrin in plasma and dialysate, using gel filtration chromatography, in peritoneal dialysis patients," Peritoneal Dialysis Int'l 25(2): 181-191 (Mar. 2005-Apr. 2005).
Georgakilas et al., "Functionalization of Graphene: Covalent and Non-Covalent Approaches, Derivatives and Applications," Chem. Rev., (2012) 112(11), pp. 6156-6214.
Gnudi "Molecular mechanisms of proteinuria in diabetes," Biochem. Soc. Trans. 36(5): 946-949 (Oct. 2008).
Gotloib et al., "Peritoneal dialysis in refractory end-stage congestive heart failure: a challenge facing a no-win situation," Nephrol. Dialysis. Transplant. 20(Supp. 7): vii32-vii36 (Jul. 2005).
Harvey "Carbon as conductor: a pragmatic view." Proceedings of the 61st IWCS Conference, http://www.iwcs.org/archives/56333-iwcs-2012b-1.1584632. vol. 1. 2012.
Hashimoto et al. "Direct evidence for atomic defects in graphene layers." Nature 430.7002 (2004): 870-873.
He, et al. "The attachment of Fe3 O4 nanoparticles to graphene oxide by covalent bonding." Carbon 48.11 (2010): 3139-3144.
Hone et al. "Graphene has record-breaking strength" Physicsworld.com, Jul. 17, 2008.
Huang et al., "Gene expression profile in circulating mononuclear cells afterexposure to ultrafine carbon particles," Inhalation Toxicol. 22(10): 835-846 (Aug. 2010).
Humplik, et al. "Nanostructured materials for water desalination." Nanotechnology 22.29 (2011): 292001.
International Search Report and Written Opinion dated Jan. 5, 2012 for related International Application No. PCT/US11/47800.
International Search Report and Written Opinion dated Jul. 5, 2017 from related PCT application PCT/US2017/024147.
International Search Report and Written Opinion dated Mar. 12, 2014 for International Application No. PCT/US2013/074942.
International Search Report and Written Opinion for International Application No. PCT/US2011/047800 dated Jan. 5, 2012.
International Search Report and Written Opinion for PCT Application No. PCT/US2014/023027 dated Jun. 26, 2014.
International Search Report and Written Opinion in International Application No. PCT/US2013/030344 dated Jun. 19, 2013.
International Search Report and Written Opinion in International Application No. PCT/US2013/033035 dated Jun. 28, 2013.
International Search Report and Written Opinion in International Application No. PCT/US2013/033400, dated Jun. 28, 2013.
International Search Report and Written Opinion in International Application No. PCT/US2013/033403 dated Jun. 28, 2013.
International Search Report and Written Opinion in PCT/US2014/041766, dated Sep. 30, 2014.
International Search Report and Written Opinion dated Jun. 5, 2014 in International Application No. PCT/US2014/021677.
International Search Report and Written Opinion dated Jun. 6, 2014 in International Application No. PCT/US2014/023043.
International Search Report and Written Opinion dated Dec. 16, 2014, for International Application No. PCT/US2014/051011.
International Search Report and Written Opinion dated Jun. 19, 2015, in International Application No. PCT/US2015/020287.
Inui et al. "Molecular dynamics simulations of nanopore processing in a graphene sheet by using gas cluster ion beam." Applied Physics A: Materials Science & Processing 98.4 (2010): 787-794.
Israelachvili, "Intermolecular and Surface Forces," 3rd ed., Chap. 7.1, Sizes of Atoms, Molecules, and Ions, 2011, 1 page.
Jiao et al., "Castration differentially alters basal and leucine-stimulated tissue protein synthesis in skeletal muscle and adipose tissue," Am. J. Physiol. Endocrinol. Metab. 297(5): E1222-1232 (Nov. 2009) (available online Sep. 15, 2009).
JP Office Action in Japanese Application No. 2015-501729 dated Dec. 9, 2016 (English translation).
JP Office Action in Japanese Application No. 2015-501729 dated Jun. 20, 2017 (English translation).
JP Office Action in Japanese Application No. 2015-501867 dated Oct. 11, 2016 (English translation).
JP Office Action in Japanese Application No. 2015-503405 dated Nov. 14, 2016 (English translation).
JP Office Action in Japanese Application No. 2015-503406 dated Dec. 6, 2016(English translation).
Kang et al., "Effect of eplerenone, enalapril and their combination treatment on diabetic nephropathy in type II diabetic rats," Nephrol. Dialysis Transplant. 24(1): 73-84 (Jan. 2009).
Kang et al., "Efficient Transfer of Large-Area Graphene Films onto Rigid Substrates by Hot Pressing," American Chemical Society Nano, 6(6): 5360-5365(May 28, 2012).
Kar et al., "Effect of glycation of hemoglobin on its interaction with trifluoperazine," Protein J. 25(3): 202-211 (Apr. 2006) (available online Jun. 6, 2006).
Kawamoto et al., "Serum high molecular weight adiponectin is associated with mild renal dysfunction in Japanese adults," J. Atherosclerosis Thrombosis 17(11): 1141-1148 (Nov. 27, 2011).
Khun et al. "From Microporous Regular Frameworks to Mesoporous Materials with Ultrahigh Surface Area: Dynamic reorganization of Porous Polvmer Networks" JACS, 2008; vol. 130; pp. 13333-13337.
Krupka et al., "Measurements of the Sheet Resistance and Conductivity of Thin Epitaxial Graphene and SiC Films" Applied Physics Letters 96, 082101-I; Feb. 23, 2010.
Kumar et al., "Modulation of alpha-crystallin chaperone activity in diabetic rat lens by curcumin," Molecular Vision 11: 561-568 (Jul. 26, 2005).
Lathuiliere et al., "Encapsulated Cellular Implants for Recombinant Protein Delivery and Therapeutic Modulation of the Immune System," Journal of Applied Physics, Int. J. Mol. Sci., 16: 10578-10600 (May 8, 2015).
Lee, et al. "Measurement of the elastic properties and intrinsic strength of monolayer graphene." science 321.5887 (2008): 385-388.
Lucchese et al. "Quantifying ion-induced defects and Raman relaxation length in graphene." Carbon 48.5 (2010): 1592-1597.

(56) References Cited

OTHER PUBLICATIONS

Macleod et al. "Supramolecular Orderinng in Oligothiophene-Fullerene Monolayers" JACS, 2009, vol. 131, pp. 16844-16850.
Mattevi et al. "A review of chemical vapour deposition of graphene on copper." Journal of Materials Chemistry 21.10 (2011): 3324-3334.
Miao et al. "Chemical vapor deposition of grapheme" INTECH Open Access Publisher, 2011.
MIT/MTL Center for Graphene Devices and 2D Systems, retrieved from: http://www-mtl.mit.edu/wpmu/graphene/ [retrieved from Aug. 21, 2014 archive] (3 pages).
MIT/MTL Center for Graphene Devices and 2D Systems, retrieved from: http://www-mtl.mit.edu/wpmu/graphene/ [retrieved from Mar. 4, 2015 archive] (3 pages).
Nafea, et al. "Immunoisolating semi-permeable membranes for cell encapsulation: focus on hydrogels." J Control Release. 154(2): 110-122 (Sep. 5, 2011).
Nezlin, "Circulating non-immune IgG complexes in health and disease," Immunol. Lett. 122(2); 141-144 (Feb. 21, 2009) (available online Feb. 2, 2009).
Norata et al., "Plasma adiponectin levels in chronic kidney disease patients: relation with molecular inflammatory profile and metabolic status," Nutr. Metab. Cardiovasc. Dis. 20(1): 56-63 (Jan. 2010) (available online Apr. 9, 2009).
Ogawa et al., "Exosome-like vesicles in Gloydius blomhoffii blomhoffii venom," Toxicon 51(6): 984-993 (May 2008) (available online Feb. 19, 2008).
Ohgawara et al. "Assessment of pore size of semipermeable membrane for immunoisolation on xenoimplatntation of pancreatic B cells using a diffusion chamber." Transplant Proc. (6): 3319-3320. 1995.
Oki et al., "Combined acromegaly and subclinical Cushing disease related to high-molecular-weight adrenocorticotropic hormone," J. Neurosurg. 110(2): 369-73 (Feb. 2009).
Osorio et al., "Effect of treatment with losartan on salt sensitivity and SGLT2 expression in hypertensive diabetic rats," Diabetes Res. Clin. Pract. 86(3): e46-e49 (Dec. 2009) (available online Oct. 2, 2009).
Osorio et al., "Effect of phlorizin on SGLT2 expression in the kidney of diabetic rats," J. Nephrol. 23(5): 541-546 (Sep.-Oct. 2010).
Padidela et al., "Elevated basal and post-feed glucagon-like peptide 1 (GLP-1) concentrations in the neonatal period," Eur. J. Endocrinol. 160(1): 53-58 (Jan. 2009) (available online Oct. 24, 2008).
Pall Corporation, "Pall Water Processing Disc-Tube Filter Technology", Retrieved on Feb. 10, 2015, Retrieved from http://www.pall.com /pdfs/Fuels-and-Chemicals/Disc-Tube_Filter_Technology-DT100b.pdF (15 Pages).
Plant et al. "Size-dependent propagation of Au nanoclusters through few-layer grapheme," The Royal Society of Chemistry 2013, Nanoscale.
Pollard, "Growing Graphene via Chemical Vapor" Department of Physics, Pomona College; May 2, 2011.
Rafael et al. "Cell Transplantation and Immunoisolation: Studies on a macroencapsultaion device." From the Departments of Transplantation Pathology: Stockholm, Sweden (1999).
Rezania et al., "Enrichment of Human Embryonic Stem Cell-Derived NKX6.1-Expressing Pancreatic Progenitor Cells Accelerates the Maturation of Insulin-Secreting Cells In Vivo", Stem Cells Regenerative Medicine, vol. 31: 2432-2442 (Jul. 29, 2013).
Rezania et al., "Maturation of Human Embryonic Stem Cell-Derived Pancreatic Progenitors Into Functional Islets Capable of Treating Pre-existing Diabetes in Mice", Diabetes Journal, vol. 61: 2016-2029 (Aug. 1, 2012).
Ribeiro et al., "Binary Mutual Diffusion Coefficients of Aqueous Solutions of Sucrose, Lactose, Glucose, and Fructose in the Temperature Range from (298.15 to 328.15) K," J. Chem. Eng. Data 51(5): 1836-1840 (Sep. 2006) (available online Jul. 20, 2006).
Rippe et al., "Size and charge selectivity of the glomerular filter in early experimental diabetes in rats," Am. J. Physiol. Renal Physiol. 293(5): F1533-F1538 (Nov. 2007)(available online Aug. 15, 2007).
SA Final Rejection for Saudi Arabia Application No. 113340400 dated Jan. 28, 2016.
SA First Examination Report for Saudi Arabia Application No. 113340401 dated Apr. 28, 2015.
SA First Examination Report for Saudi Arabia Application No. 113340424 dated May 10, 2015.
SA First Examination Report for Saudi Arabia Application No. 113340426 dated May 12, 2015.
SA First Examination Report in Saudi Arabia Application No. 113340400 dated Apr. 13, 2015.
SA Second Examination Report for Saudi Arabia Application No. 113340400 dated Aug. 11, 2015.
Sanchez, et al. "Biological Interactions of Graphene-Family Nanomaterials—An Interdisciplinary Review." Chem Res Toxicol. 25(1): 15-34 (Jan. 13, 2012).
Sethna et al., "Serum adiponectin levels and ambulatory blood pressure monitoring in pediatric renal transplant recipients," Transplantation 88(8): 1030-1037 (Oct. 27, 2009).
Sullivan et al., "Microarray analysis reveals novel gene expression changes associated with erectile dysfunction in diabetic rats," Physiol. Genom. 23(2): 192-205 (Oct. 17, 2005) (available online Aug. 23, 2005).
Swett et al, "Imagining and Sculpting Graphene on the atomic scale" Oak Ridge National Laboratory's (ORNL) Center for Nanophase Materials Sciences (CNMS) Biannual Review. 1 page.
Swett et al, "Supersonic Nanoparticle Interaction with Suspended CVD Graphene", Microsc. Microanal. 22 (Suppl 3): 1670-1671 (Jul. 25, 2016).
Takata et al., "Hyperresistinemia is associated with coexistence of hypertension and type 2 diabetes," Hypertension 51. 2 (Feb. 2008): 534-9.
Tamborlane et al., "Continuous Glucose Monitoring and Intensive Treatment of Type 1 Diabetes" N Engl J Med 359;14: 1464-1476 (Oct. 2, 2008).
Tanugi et al., "Nanoporous Graphene Could Outperform Best Commercial Water Desalination Techniques," ; ACS 2012; Jun. 25, 2012; Weftec 2012; Sep. 29-Oct. 3.
Totani et al. "Gluten binds cytotoxic compounds generated in heated frying oil." Journal of oleo science 57.12 (2008): 683-690.
Tsukamoto et al. "Purification, characterization and biological activities of a garlic oliqosaccharide," Journal of UOEH 30.2 (Jun. 1, 2008): 147-57.
TW Office Action in Taiwanese Application No. 102146079 dated Apr. 14, 2017. 9 Pages.(English translation).
TW Search Report in Taiwanese Application No. 102146079 dated Apr. 14, 2017. 1 page.
UMEA Universitet "Graphene nanoscrolls are formed by decoration of magnetic nanoparticles." ScienceDaily. Aug. 15, 2013. https://www.sciencedaily.com/releases/2013/08/130815084402.htm (3 pages).
U.S. Notice of Allowance for U.S. Appl. No. 12/868,150 dated Sep. 25, 2012.
U.S. Notice of Allowance for U.S. Appl. No. 13/548,539 dated Aug. 18, 2015.
U.S. Notice of Allowance for U.S. Appl. No. 13/548,539 dated Jul. 23, 2015.
U.S. Notice of Allowance for U.S. Appl. No. 13/719,579 dated May 20 ,2016.
U.S. Notice of Allowance for U.S. Appl. No. 13/795,276 dated Oct. 7, 2016.
U.S. Notice of Allowance for U.S. Appl. No. 13/802,896 dated Apr. 1, 2015.
U.S. Notice of Allowance for U.S. Appl. No. 13/803,958 dated Aug. 29, 2016.
U.S. Notice of Allowance for U.S. Appl. No. 13/803,958 dated Jun. 2, 2016.
U.S. Notice of Allowance for U.S. Appl. No. 13/803,958 dated Sep. 12, 2016.
U.S. Notice of Allowance for U.S. Appl. No. 13/804,085 dated Jan. 15, 2015.
U.S. Notice of Allowance for U.S. Appl. No. 13/804,085 dated Mar. 12, 2015.
U.S. Notice of Allowance for U.S. Appl. No. 13/923,503 dated Oct. 14, 2016.

(56) References Cited

OTHER PUBLICATIONS

U.S. Notice of Allowance for U.S. Appl. No. 13/923,503 dated Oct. 5, 2016.
U.S. Notice of Allowance for U.S. Appl. No. 14/200,195 dated Jul. 5, 2016.
U.S. Notice of Allowance for U.S. Appl. No. 14/200,530 dated Aug. 1, 2016.
U.S. Notice of Allowance for U.S. Appl. No. 14/203,655 dated Dec. 9, 2016.
U.S. Notice of Allowance in U.S. Appl. No. 12/868,150 dated Sep. 25, 2012.
U.S. Notice of Allowance in U.S. Appl. No. 13/795,276 dated Jan. 19, 2017.
U.S. Notice of Allowance in U.S. Appl. No. 13/803,958 dated Aug. 29, 2016.
U.S. Notice of Allowance in U.S. Appl. No. 13/803,958 dated Sep. 12, 2016.
U.S. Notice of Allowance in U.S. Appl. No. 14/610,770 dated May 5, 2017.
U.S. Notice of Allowance in U.S. Appl. No. 14/656,580 dated May 8, 2017.
U.S. Notice of Allowance in U.S. Appl. No. 14/819,273 dated Jun. 9, 2017.
U.S. Notice of Allowance in U.S. Appl. No. 15/099,464 dated Jun. 16, 2017.
U.S. Office Action for U.S. Appl. No. 13/548,539 dated Feb. 6, 2015.
U.S. Office Action for U.S. Appl. No. 13/719,579 dated Jul. 8, 2015.
U.S. Office Action for U.S. Appl. No. 13/719,579 dated May 4, 2016.
U.S. Office Action for U.S. Appl. No. 13/795,276 dated Apr. 22, 2016.
U.S. Office Action for U.S. Appl. No. 13/795,276 dated Oct. 6, 2015.
U.S. Office Action for U.S. Appl. No. 13/802,896 dated Sep. 24, 2014.
U.S. Office Action for U.S. Appl. No. 13/803,958 dated Aug. 11, 2014.
U.S. Office Action for U.S. Appl. No. 13/803,958 dated May 28, 2015.
U.S. Office Action for U.S. Appl. No. 13/803,958 dated Nov. 18, 2015.
U.S. Office Action for U.S. Appl. No. 13/923,503 dated Mar. 22, 2016.
U.S. Office Action for U.S. Appl. No. 14/031,300 dated Jan. 20, 2016.
U.S. Office Action for U.S. Appl. No. 14/031,300 dated Jul. 7, 2015.
U.S. Office Action for U.S. Appl. No. 14/200,195 dated Mar. 21, 2016.
U.S. Office Action for U.S. Appl. No. 14/200,195 dated Nov. 4, 2015.
U.S. Office Action for U.S. Appl. No. 14/200,530 dated Feb. 29, 2016.
U.S. Office Action for U.S. Appl. No. 14/203,655 dated Aug. 10, 2016.
U.S. Office Action for U.S. Appl. No. 14/656,190 dated May 18, 2017.
U.S. Office Action for U.S. Appl. No. 14/656,657 dated Jul. 7, 2017.
U.S. Office Action for U.S. Appl. No. 14/686,452 dated Jun. 9, 2017.
U.S. Office Action for U.S. Appl. No. 14/843,944 dated Jun. 23, 2017.
U.S. Office Action for U.S. Appl. No. 14/856,471 dated May 31, 2017.
U.S. Office Action for U.S. Appl. No. 14/858,741 dated Dec. 1, 2016.
U.S. Office Action for U.S. Appl. No. 15/289,944 dated Feb. 9, 2017.
U.S. Office Action for U.S. Appl. No. 15/336,545 dated Dec. 19, 2016.
U.S. Office Action for U.S. Appl. No. 15/453,441 dated Jun. 5, 2017.
U.S. Office Action in U.S. Appl. No. 14/193,007 dated Apr. 24, 2017.
U.S. Office Action in U.S. Appl. No. 14/656,617 dated Apr. 4, 2017.
U.S. Office Action on U.S. Appl. No. 14/656,335 dated Apr. 25, 2017.
U.S. Office Action on U.S. Appl. No. 15/332,982 dated Jan. 30, 2017.
U.S. Supplemental Notice of Allowance for U.S. Appl. No. 13/795,276 dated Nov. 29, 2016.
Vallon,"Micropuncturing the nephron," Pflugers Archiv : European journal of physiology 458. 1 (May 2009): 189-201.
Van Der Zande et al. "Large-scale arrays of single-layer graphene resonators." Nano letters 10.12 (2010): 4869-4873.
Verdonck, P., "Plasma Etching", in Oficina de Microfabricao: Projeto e Construcao de CI's MOS, Swart, J.W., Ed., Campinas (Sao Paulo, Brazil): UNICAMP, 2006, ch. 10, p. 9.
Vlassiouk et al. "Large scale atmospheric pressure chemical vapor deposition of graphene." Carbon 54 (2013): 58-67.
Vriens et al. "Methodological considerations in quantification of oncological FDG PET studies." European journal of nuclear medicine and molecular imaging 37.7 (2010): 1408-1425.
Wang et al., "Direct Observation of a Long-Lived Single-Atom Catalyst Chiseling Atomic Structures in Graphene," Nano Lett., 2014, pp. A-F.
Wang et al., "Porous Nanocarbons: Molecular Filtration and Electronics, Advances in Graphene Science", Edited by Mahmood Aliofkhazraei, (2013) ISBN 978-953-51-1182-5, Publisher: InTech; Chapter 6, pp. 119-160.
Wang et al.,"What is the role of the second "structural" NADP+-binding site in human glucose 6-phosphate dehydrogenase? ,"Protein science a publication of the Protein Society 17. 8 (Aug. 2008): 1403-11.
Wei et al., "Synthesis of N-doped graphene by chemical vapor deposition and its electrical properties", Nano Lett. 2009 9 1752-58.
Xiaogan Liang et al., Formation of Bandgap and Subbands in Graphene Nanomeshes with Sub-10nm Ribbon Width Fabricated via Nanoimprint Lithography., Nano Letters, Jun. 11, 2010, pp. 2454-2460.
Xie et al., "Fractionation and characterization of biologically-active polysaccharides from Artemisia tripartite," Phytochemistry 69. 6 (Apr. 2008): 1359-71.
Xie, et al. "Controlled fabrication of high-quality carbon nanoscrolls from monolayer graphene." Nano letters 9.7 (2009): 2565-2570.
Yagil et al. "Nonproteinuric diabetes-associated nephropathy in the Cohen rat model of type 2 diabetes" Diabetes 54. 5 (May 2005): 1487-96.
Zan et al. "Interaction of Metals with Suspended Graphene Observed by Transmission Electron Microscopy", J. Phys. Chem. Lett., Mar. 8, 2012, 3, 953-958.
Zhang et al. "Effect of Chemical Oxidation on the Structure of Single-Walled Carbon Nanotubes", J. Phys. Chem., Feb. 12, 2003, B 107 3712-8.
Zhang et al. "Method for anisotropic etching of graphite or graphene" Institute of Physics, Chinese Academy of Sciences; Peop. Rep. China; Mar. 30, 2011.
Zhang et al. "Production of Graphene Sheets by Direct Dispersion with Aromatic Healing Agents", Small, May 6, 2010, vol. 6, No. 10, 1100-1107.
Zhang et al. "Isolation and activity of an alpha-amylase inhibitor from white kidney beans," Yao xue xue bao=Acta pharmaceutica Sinica 42. 12 (Dec. 2007): 1282-7.
Zhao, et al. "Efficient preparation of large-area graphene oxide sheets for transparent conductive films." ACS nano 4.9 (2010): 5245-5252.
Zhou, K., et al., "One-pot preparation of graphene/ Fe3O4 composites by a solvothermal reaction," New J. Chem., 2010, 34, 2950.
Zhu et al. "Carbon Nanotubes in Biomedicine and Biosensing", Carbon Nanotubes—Growth and Applications, InTech, (Aug. 9, 2011) Chapter 6: pp. 135-162. Available from: https://www.intechopen.com/books/carbon-nanotubes-growth-and-applications/carbon-nanotubes-in-biomedicine-and-biosensing.

(56) References Cited

OTHER PUBLICATIONS

Ziegelmeier et al. "Adipokines influencing metabolic and cardiovascular disease are differentially regulated in maintenance hemodialysis," Metabolism: clinical and experimental 57. 10 (Oct. 2008): 1414-21.
Zirk et al. "A refractometry-based glucose analysis of body fluids," Medical engineering & physics 29. 4 (May 2007): 449-58.
Zyga "Nanoporous Graphene Could Outperform Best Commercial Water Desalination Techniques," Phys.org., Jun. 22, 2012, Retrieved from http://www.phys.org/pdf259579929.pdf [Last Accessed Dec. 3, 2014] (3 pages).
U.S. Final Office Action for U.S. Appl. No. 14/609,325 dated Sep. 12, 2018 (8 pages).
U.S. Final Office Action for U.S. Appl. No. 15/099,289 dated Oct. 15, 2018 (14 pages).
U.S. Non-Final Office Action for U.S. Appl. No. 14/656,657 dated Oct. 10, 2018 (6 pages).
U.S. Non-Final Office Action for U.S. Appl. No. 14/707,808 dated Nov. 15, 2018 (34 pages).
U.S. Non-Final Office Action for U.S. Appl. No. 15/099,099 dated Sep. 27, 2018 (13 pages).
U.S. Non-Final Office Action for U.S. Appl. No. 15/099,269 dated Oct. 5, 2018 (11 pages).
U.S. Non-Final Office Action for U.S. Appl. No. 15/099,276 dated Nov. 1, 2018 (13 pages).
U.S. Notice of Allowance for U.S. Appl. No. 15/099,056 dated Nov. 16, 2018 (8 pages).
Bose et al.,"Microfabricated immune-isolating devices for transplanting therapeutic cells in vivo", Koch Institute of Integrative Cancer Research, Massachusetts Institute of Technology, Undated (1 page).
Indian Office Action for Appl. Ser. No. 7731/DELNP/2014 dated Jul. 26, 2018 (6 pages).
Japanese Office Action for Appl. Ser. No. 2017-002652 dated Jul. 3, 2018 (8 pages).
Linnert, "Welding Metallurgy—Carbon and Alloy Steels", vol. I—Fundamentals (4th Edition), Chapter 2—The Structure of Metals, GML Publications, American Welding Society (AWS), Year: 1994, pp. 17-74. Retrieved from app.knovel.com/hotlink/pdf/id:kt0095RCL3/welding-metallurgy-carbon/structure-metals.
U.S. Final Office Action for U.S. Appl. No. 14/707,808 dated Jun. 27, 2018 (28 pages).
U.S. Final Office Action for U.S. Appl. No. 15/099,482 dated Aug. 27, 2018 (10 pages).
U.S. Non-Final Office Action for U.S. Appl. No. 15/099,239 dated Jul. 12, 2018 (31 pages).
U.S. Non-Final Office Action for U.S. Appl. No. 15/099,304 dated Aug. 27, 2018 (22 pages).
U.S. Notice of Allowance for U.S. Appl. No. 15/099,420 dated Aug. 8, 2018 (8 pages).
Vatanpour et al., "Fabrication and characterization of novel antifouling nanofiltration membrane prepared from oxidized multiwalled carbon nanotube/polyethersulfone nanocomposite", Journal of Membrane Science, vol. 375, Elsevier, Apr. 6, 2011, pp. 284-294.
Zhang et al., "Synergetic effects of oxidized carbon nanotubes and graphene oxide on fouling control and anti-fouling mechanism of polyvinylidene fluoride ultrafiltration membranes", Journal of Membrane Science, vol. 448, Elsevier, Aug. 7, 2013, pp. 81-92.
European Extended Search Report in Application No. 15837617.8 dated Mar. 22, 2018 (9 pages).
Singapore Written Opinion for Appl. Ser. No. 11201607584P dated Jun. 8, 2018 (7 pages).
U.S. Notice of Allowance for U.S. Appl. No. 15/453,441 dated Jun. 12, 2018 (8 pages).
U.S. Office Action for U.S. Appl. No. 15/099,056 dated May 29, 2018 (33 pages).
U.S. Office Action for U.S. Appl. No. 15/099,289 dated Jun. 7, 2018 (16 pages).
U.S. Final Office Action for U.S. Appl. No. 14/686,452 dated Dec. 13, 2018 (6 pages).
U.S. Final Office Action for U.S. Appl. No. 15/099,099 dated Jan. 2, 2019 (13 pages).

* cited by examiner

SELECTIVE INTERFACIAL MITIGATION OF GRAPHENE DEFECTS

CROSS-REFERENCE TO RELATED PATENT APPLICATIONS

The present application is related to U.S. application Ser. No. 15/099,239, filed Apr. 14, 2016, titled "PERFORATED SHEETS OF GRAPHENE-BASED MATERIAL", now published as U.S. Patent Publication No. 2017/0036911, which is incorporated by reference herein in its entirety. The present application is related to U.S. application Ser. No. 15/099,269, filed Apr. 14, 2016, titled "PERFORATABLE SHEETS OF GRAPHENE-BASED MATERIAL", now published as U.S. Patent Publication No. 2017/0040082, which is incorporated by reference herein in its entirety. The present application is related to U.S. application Ser. No. 15/099,099, filed Apr. 14, 2016, titled "NANOPARTICLE MODIFICATION AND PERFORATION OF GRAPHENE", now published as U.S. Patent Publication No. 2017/0036916, which is incorporated by reference herein in its entirety.

BACKGROUND

The present disclosure relates generally to the field of graphene based materials and other two-dimensional materials. More specifically, the present disclosure relates to method of repairing defects in graphene and two-dimensional materials.

SUMMARY OF THE INVENTION

Some embodiments relate to a method including disposing a first reactant on a first side of a two-dimensional material including defects, disposing a second reactant on a second side of the two-dimensional material such that the first reactant and second reactant undergo a polymerization reaction and form polymer regions filling the defects, and adhering the polymer regions to a support structure. The adhering the polymer regions to the support structure may include forming covalent bonds between the polymer regions and the support structure. The adhering the polymer regions to the support structure may include forming molecular entanglement between the polymer regions and the support structure. The method may further include adhering a polymer handling region formed along at least a portion of an edge of the two-dimensional material to the support structure. The two-dimensional material may include graphene. The support structure may be a porous support structure. The polymer regions may have a thickness in the range of 3 nm to 100 µm. The polymer regions may be biocompatible or bio-inert. The method may further include treating the support structure to enhance adhesion between the polymer regions and the support structure.

Some embodiments relate to a method including forming holes in a two-dimensional material including defects, disposing a first reactant on a first side of the two-dimensional material, disposing a second reactant on a second side of the two-dimensional material such that the first reactant and second reactant undergo a polymerization reaction and form polymer regions filling the defects and holes, and adhering the polymer regions to a support structure. The ratio of the area of the holes to the area of the two-dimensional material may be in the range of 5% to 50%. The polymer regions may have a thickness in the range of 3 nm to 100 µm. The holes may be randomly distributed across the two-dimensional material. The holes may be arranged in a periodic array.

Some embodiments relate to a method including forming pores in a two-dimensional material including defects, wherein the defects have a size greater than 15 nm, and the pores have a size that is less than the size of the defects, disposing a first reactant on a first side of the two-dimensional material, and disposing a second reactant on a second side of the two-dimensional material such that the first reactant and second reactant undergo a polymerization reaction and form polymer regions filling the defects. The pores are not filled by the polymer regions. At least one of the first reactant and the second reactant may include a dendrimer. The method may further include applying an electric potential to the two-dimensional material to attract the first reactant and the second reactant to the defects in the graphene material. The method may further include heating the first reactant and the second reactant to increase a rate of diffusion thereof and increase a rate of the polymerization reaction. The first reactant may be ionic, the second reactant may be ionic, and the first and second reactants may have opposite charges. The method may further include forming holes in the two-dimensional material with a size greater than the size of the pores, such that the holes are filled by polymer regions formed during the polymerization reaction.

Some embodiments relate to a method including disposing a first reactant on a first side of a two-dimensional material and extending beyond at least a portion of an edge of the two-dimensional material, disposing a second reactant on a second side of the two-dimensional material and extending beyond the at least a portion of the edge of the two-dimensional material. The first reactant and second reactant undergo a polymerization reaction and form a polymer handling region at least a portion of the edge of the two-dimensional material. The polymer handling region may extend along the entire circumference of the two-dimensional material. The polymer handling region may extend from the at least a portion of the edge of the two-dimensional material for a distance of at least about 1 mm. The polymer handling region may have a thickness in the range of 3 nm to 100 µm.

Some embodiments relate to a method including disposing a first reactant on a first side of the two-dimensional material containing defects, disposing a second reactant on a second side of the two-dimensional material such that the first reactant and second reactant undergo a polymerization reaction and form polymer regions filling the defects, and forming pores in the two-dimensional material by impacting the two-dimensional material with nanoparticles. The nanoparticles may have an energy of 2 keV to 500 keV per nanoparticle. The nanoparticles may have a size of 2 nm to 50 nm. The size of the pores may be from 1 nm to 100 nm. The fluence of the nanoparticles may be $1\times10^8$ to $1\times10^{12}$ nanoparticles/cm$^2$. The two-dimensional material may include graphene.

Some embodiments relate to a method including forming pores in a two-dimensional material including defects by impacting the two-dimensional material with nanoparticles, disposing a first reactant on a first side of the two-dimensional material, and disposing a second reactant on a second side of the two-dimensional material such that the first reactant and second reactant undergo a polymerization reaction and form polymer regions filling the defects. The pores are not filled by the polymer regions. The nanoparticles may have an energy of 2 keV to 500 keV per nanoparticle. The nanoparticles may have a size of 2 nm to 50 nm. The size of the pores may be from 1 nm to 100 nm. The fluence of the nanoparticles may be $1\times10^8$ to $1\times10^{12}$ nanoparticles/cm². The two-dimensional material may include graphene.

Some embodiments relate to a membrane assembly including a two-dimensional material including polymer regions that extend through defects in the two-dimensional material, and a support structure. The polymer regions are adhered to the support structure, and the polymer regions prevent fluid flow through the defects. The two-dimensional material may include graphene. The membrane assembly may be biocompatible or bio-inert. The polymer regions may have a thickness of 3 nm to 500 nm. The polymer regions may be adhered to the support structure through at least one of covalent bonds and molecular entanglement.

Some embodiments relate to a membrane including a two-dimensional material, and a polymer handling region extending along at least a portion of an edge of the two-dimensional material. The two-dimensional material may include graphene. The membrane may be biocompatible or bio-inert. The polymer handling region may form a continuous border along the entire circumference of the two-dimensional material. The polymer handling region may extend from the at least a portion of the edge of the two-dimensional material for a distance of at least about 1 mm.

DETAILED DESCRIPTION

Graphene based materials and other two-dimensional materials may have undesirable defects present therein. Defects, as utilized herein, are undesired openings formed in the graphene material. The presence of defects may render the graphene material unsuitable for filtration-type applications, as the defects may allow undesired molecules to pass through the material. In such applications, the presence of defects above a cutoff size or outside of a selected size range can be undesirable. On the other hand, defects below a critical size required for application-specific separation may be useful from a permeability perspective, as long as such defects do not negatively impact the integrity of the graphene. In some embodiments, defects may include holes, tears, slits, or any other shape or structure. Defects may be the result of manufacturing or handling the graphene material.

Figure 1:
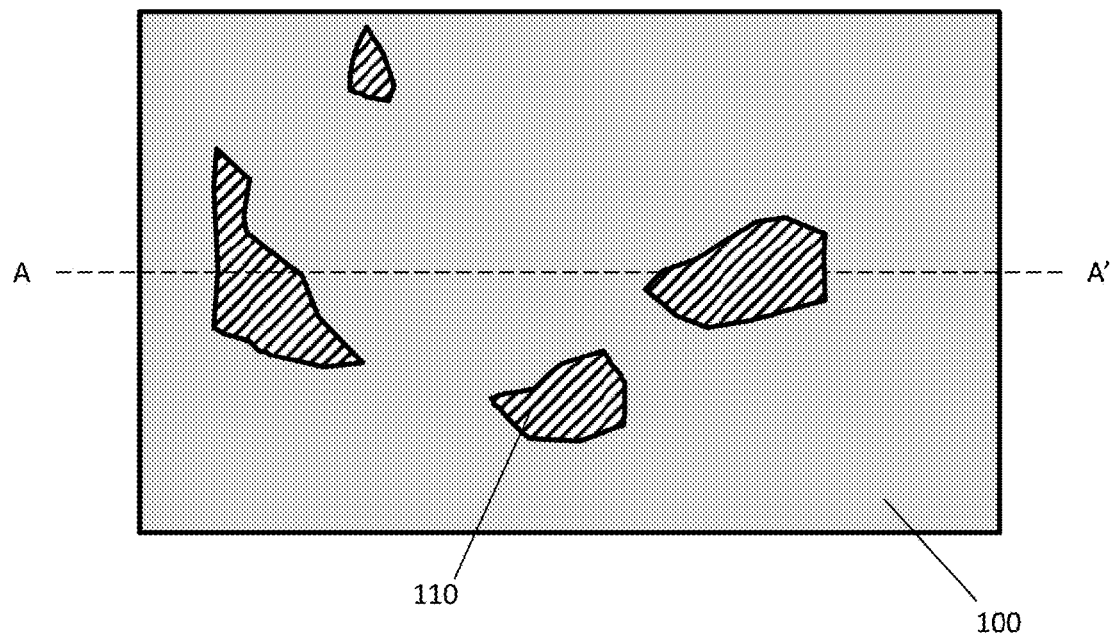
FIG. 1 is a top down representation of a graphene material including repaired defects.
Figure 2:
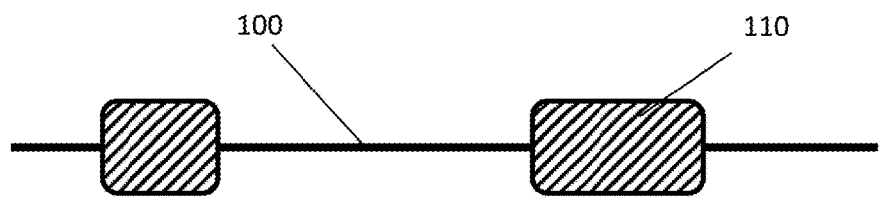
FIG. 2 is a cross-section of the graphene material of FIG. 1 along line A-A'.

A process for repairing or mitigating the presence of defects in the graphene materials increases the utility of the materials as filtration or permeable membranes. The repair process may selectively produce a polymer material within the defects of the graphene material, preventing flow through the defects. The repair process may produce a graphene material 100 with polymer regions 110 that have filled defects in the graphene material, as shown in FIGS. 1 and 2. The polymer regions 110 are thin and may be a single layer of polymer molecules. As shown in FIG. 2, while the polymer regions 110 are thin, they are thicker than the graphene material 100. For example, a single layer of graphene may have a thickness of about 3.5 angstroms, while a polymer region including a single layer of polymer molecules may have a thickness of a few nanometers or more, depending on the polymer.

Graphene represents a form of carbon in which the carbon atoms reside within a single atomically thin sheet or a few layered sheets (e.g., about 20 or less) of fused six-membered rings forming an extended sp²-hybridized carbon planar lattice. Graphene-based materials include, but are not limited to, single layer graphene, multilayer graphene or interconnected single or multilayer graphene domains and combinations thereof. As utilized herein, graphene material may refer to graphene or a graphene-based material. In some embodiments, graphene-based materials also include materials which have been formed by stacking single or multilayer graphene sheets. In some embodiments, multilayer graphene includes 2 to 20 layers, 2 to 10 layers or 2 to 5 layers. In some embodiments, layers of multilayered graphene are stacked, but are less ordered in the z direction (perpendicular to the basal plane) than a thin graphite crystal.

In some embodiments, a sheet of graphene-based material is a sheet of single or multilayer graphene or a sheet comprising a plurality of interconnected single or multilayer graphene domains. In some embodiments, the multilayer graphene domains have 2 to 5 layers or 2 to 10 layers. As used herein, a "domain" refers to a region of a material where atoms are uniformly ordered into a crystal lattice. A domain is uniform within its boundaries, but different from a neighboring region. For example, a single crystalline material has a single domain of ordered atoms. In some embodiments, at least some of the graphene domains are nanocrystals, having a domain size from 1 nm to 100 nm, such as 10 nm to 100 nm. In some embodiments, at least some of the graphene domains have a domain size greater than 100 nm to 1 micron, or from 200 nm to 800 nm, or from 300 nm to 500 nm. In some embodiments, a domain of multilayer graphene may overlap a neighboring domain. "Grain boundaries" formed by crystallographic defects at edges of each domain differentiate between neighboring crystal lattices. In some embodiments, a first crystal lattice may be rotated relative to a second crystal lattice, by a rotation about an axis perpendicular to the plane of a sheet, such that the two lattices differ in "crystal lattice orientation."

In some embodiments, the sheet of graphene-based material is a sheet of single or multilayer graphene or a combination thereof. In some other embodiments, the sheet of graphene-based material is a sheet comprising a plurality of interconnected single or multilayer graphene domains. The interconnected domains may be covalently bonded together to form the sheet. When the domains in a sheet differ in crystal lattice orientation, the sheet may be considered polycrystalline.

In some embodiments, the thickness of the sheet of graphene-based material is from 0.3 nm to 10 nm, such as from 0.34 nm to 10 nm, from 0.34 nm to 5 nm, or from 0.34 nm to 3 nm. In some embodiments, the thickness may include both single layer graphene and non-graphenic carbon.

In some embodiments, graphene is the dominant material in a graphene-based material. For example, a graphene-based material may comprise at least 20% graphene, such as at least 30% graphene, at least 40% graphene, at least 50% graphene, at least 60% graphene, at least 70% graphene, at least 80% graphene, at least 90% graphene, at least 95% graphene, or more. In some embodiments, a graphene-based material may comprise a graphene content range selected from 30% to 100%, such as from 30% to 95%, such as from 40% to 80%, from 50% to 70%, from 60% to 95%, or from 75% to 100%. In some embodiments, the amount of graphene in the graphene-based material is measured as an atomic percentage. The amount of graphene in the graphene-based material is measured as an atomic percentage utilizing known methods including transmission electron microscope examination or, alternatively, if TEM is ineffective, another similar measurement technique.

In some embodiments, a sheet of graphene-based material may further comprise non-graphenic carbon-based material located on at least one surface of the sheet of graphene-based material. In an embodiment, the sheet is defined by two base surfaces (e.g. top and bottom faces of the sheet) and side faces (e.g. the side faces of the sheet). In some embodiments, non-graphenic carbon-based material is located on one or both base surfaces of the sheet. In some embodiments, the sheet of graphene-based material includes a small amount of one or more other materials on the surface, such as, but not limited to, one or more dust particles or similar contaminants.

In some embodiments, the amount of non-graphenic carbon-based material is less than the amount of graphene. In some other embodiments, the amount of non-graphenic carbon material is three to five times the amount of graphene; this may be measured in terms of mass. In additional embodiments, the non-graphenic carbon material is characterized by a percentage by mass of said graphene-based material selected from the range of 0% to 80%. In some embodiments, the surface coverage of the sheet of non-graphenic carbon-based material is greater than zero and less than 80%, such as from 5% to 80%, from 10% to 80%, from 5% to 50%, or from 10% to 50%. This surface coverage may be measured with transmission electron microscopy. In some embodiments, the amount of graphene in the graphene-based material is from 60% to 95% or from 75% to 100%. The amount of graphene in the graphene-based material is measured as mass percentage utilizing known methods preferentially using transmission electron microscope examination or, alternatively, if TEM is ineffective, using other similar techniques.

In some embodiments, the non-graphenic carbon-based material does not possess long range order and may be classified as amorphous. The non-graphenic carbon-based material may further comprise elements other than carbon and/or hydrocarbons. In some embodiments, non-carbon elements which may be incorporated in the non-graphenic carbon include hydrogen, oxygen, silicon, copper, and iron. In further embodiments, the non-graphenic carbon-based material comprises hydrocarbons. In some embodiments, carbon is the dominant material in non-graphenic carbon-based material. For example, a non-graphenic carbon-based material may comprise at least 30% carbon, such as at least 40% carbon, at least 50% carbon, at least 60% carbon, at least 70% carbon, at least 80% carbon, at least 90% carbon, or at least 95% carbon. In some embodiments, a non-graphenic carbon-based material comprises a range of carbon selected from 30% to 95%, such as from 40% to 80%, or from 50% to 70%. The amount of carbon in the non-graphenic carbon-based material may be measured as an atomic percentage utilizing known methods preferentially using transmission electron microscope examination or, alternatively, if TEM is ineffective, using other similar techniques.

In some embodiments, the graphene material may be in the form of a macroscale sheet. As used herein, a macroscale sheet may be observable by the naked eye. In some embodiments, at least one lateral dimension of the macroscopic sheet may be greater than 1 mm, such as greater than 5 mm, greater than 1 cm, or greater than 3 cm. In some embodiments, the macroscopic sheet may be larger than a flake obtained by exfoliation. For example, the macroscopic sheet may have a lateral dimension greater than about 1 micrometer. In some embodiments, the lateral dimension of the macroscopic sheet may be less than 10 cm. In some embodiments, the macroscopic sheet may have a lateral dimension of from 10 nm to 10 cm, such as from 1 mm to 10 cm. As used herein, a lateral dimension is generally perpendicular to the thickness of the sheet.

As used herein, the term "two-dimensional material" may refer to any extended planar structure of atomic thickness, including both single- and multi-layer variants thereof.

Multi-layer two-dimensional materials may include up to about 20 stacked layers. In some embodiments, a two-dimensional material suitable for the present structures and methods can include any material having an extended planar molecular structure and an atomic level thickness. Particular examples of two-dimensional materials include graphene films, graphene-based material, transition metal dichalcogenides, metal oxides, metal hydroxides, graphene oxide, a-boron nitride, silicone, germanene, or other materials having a similar planar structure. Specific examples of transition metal dichalcogenides include molybdenum disulfide and niobium diselenide. Specific examples of metal oxides include vanadium pentoxide. Graphene or graphene-based films according to the embodiments herein can include single-layer or multi-layer films, or any combination thereof. Choice of a suitable two-dimensional material can be determined by a number of factors, including the chemical and physical environment into which the graphene, graphene-based material or other two-dimensional material is to be terminally deployed, ease of perforating the two-dimensional material, and the like. The processes and structures disclosed herein with respect to graphene materials are also applicable to two-dimensional materials.

Pores as described herein may be sized to provide desired selective permeability of a species (atom, molecule, protein, virus, cell, etc.) for a given application. Selective permeability relates to the propensity of a porous material or a perforated two-dimensional material to allow passage (or transport) of one or more species more readily or faster than other species. Selective permeability allows separation of species which exhibit different passage or transport rates. In two-dimensional materials selective permeability correlates to the dimension or size (e.g., diameter) of apertures and the relative effective size of the species. Selective permeability of the perforations in two-dimensional materials such as graphene-based materials can also depend on functionalization of perforations (if any) and the specific species that are to be separated. Separation of two or more species in a mixture includes a change in the ratio(s) (weight or molar ratio) of the two or more species in the mixture after passage of the mixture through a perforated two-dimensional material.

In some embodiments, a characteristic size of the pores may be from 0.3 nm to 500 nm, such as from 0.3 nm to 10 nm, from 1 nm to 10 nm, from 5 nm to 10 nm, from 5 nm to 20 nm, from 10 nm to 50 nm, from 50 nm to 100 nm, from 50 nm to 150 nm, from 100 nm to 200 nm, or from 100 nm to 500 nm. The characteristics size may refer to the average pore size. In some embodiments, from 70% to 99%, such as from 80% to 99%, from 85% to 99%, or from 90% to 99%, of the pores in a sheet or layer fall within a specified range, and the remaining pores fall outside the specified range.

The size distribution of the pores may be narrow, e.g., limited to 0.1 to 0.5 coefficient of variation. For circular pores, the characteristic dimension may be the diameter of the hole. For non-circular pores, the characteristic dimension may be the largest distance spanning the hole, the smallest distance spanning the hole, the average of the largest and smallest distance spanning the hole, or an equivalent diameter based on the in-plane area of the pore.

Quantitative image analysis of pore features may include measurement of the number, area, size and/or perimeter of pores. In some embodiments, the equivalent diameter of each pore is calculated from the equation $A=\pi d^2/4$, where d is the equivalent diameter of the pore and A is the area of the pore. When the pore area is plotted as a function of equivalent pore diameter, a pore size distribution may be obtained. The coefficient of variation of the pore size may be calculated herein as the ratio of the standard deviation of the pore size to the mean of the pore size.

In some embodiments, the ratio of the area of the pores to the area of the sheet is used to characterize the sheet. The area of the sheet may be taken as the planar area spanned by the sheet. In some embodiments, characterization may be based on the ratio of the area of the perforations to the sheet area excluding features such as surface debris. In some additional embodiments, characterization may be based on the ratio of the area of the pores to a suspended area of the sheet. In some embodiments, the pore area may comprises 0.1% or greater, such as 1% or greater, or 5% or greater of the sheet area. In some embodiments, the pore are may comprise less than 15% of the sheet area, such as less than 10% of the sheet area. In some embodiments, the pore area may comprise from 0.1% to 15% of the sheet area, such as from 1% to 15% of the sheet area, from 5% to 15% of the sheet area, or from 1% to 10% of the sheet area. In some embodiments, the pores may be located over greater than 10%, such as greater than 15% of the area, of a sheet of graphene-based material. In some embodiments, the pore density may be from 2 pores pre $nm^2$ to 1 pore per $\mu m^2$.

Figure 6:
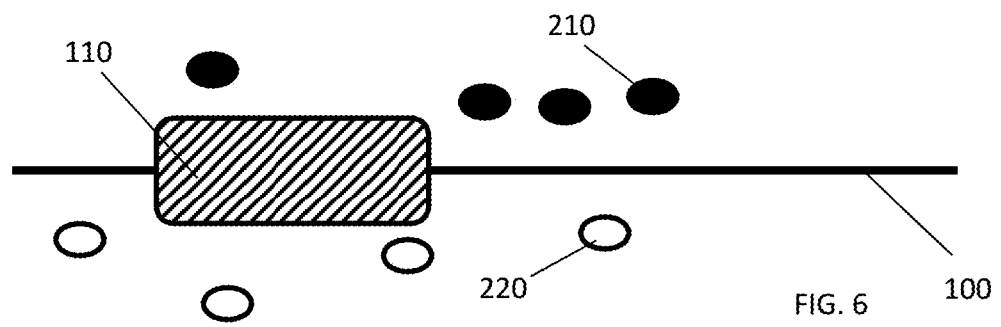
FIG. 6 is a representation of a repaired graphene material, according to one embodiment.
Figure 9:
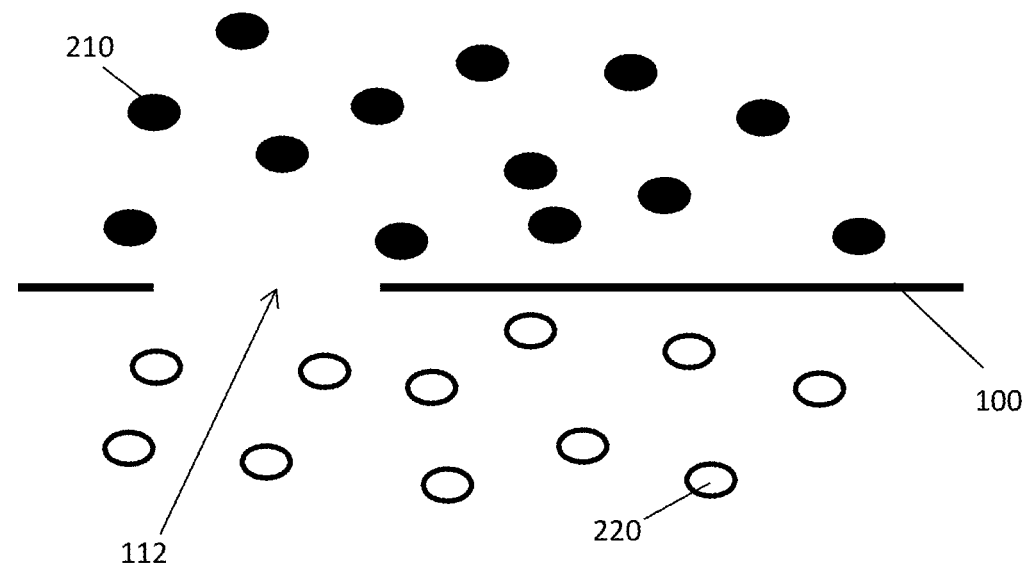
FIG. 9 is a representation of a graphene material including a defect when exposed to a first reactant and a second reactant to repair the defect through interfacial polymerization.
Figure 10:
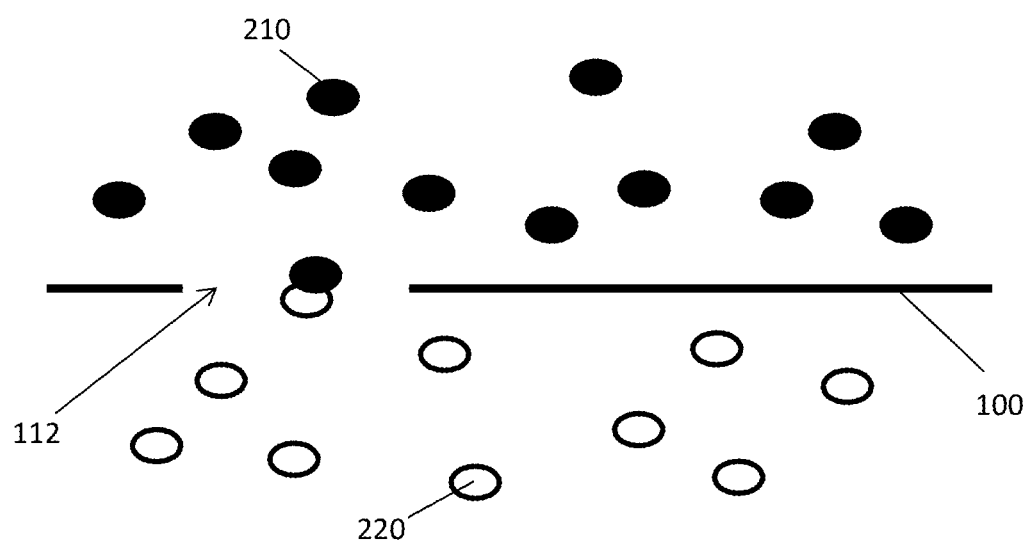
FIG. 10 is a representation of the graphene material of FIG. 9 after the reactants have contacted each other through the defect.

The defect repair process includes the application of a first reactant to a first side of the graphene material and a second reactant to a second side of the graphene material. As shown in FIG. 9, molecules of the first reactant material 210 are disposed on a first side of the graphene material 100 and molecules of the second reactant material 220 are disposed on a second side of the graphene material 100. A defect 112 in the graphene material 100 allows the first reactant 210 to contact the second reactant 220 as shown in FIG. 10. The first reactant 210 and the second reactant 220 may pass through any defect 112 with a size larger than the reactant molecules. The interaction between the first reactant 210 and the second reactant 220 produces a polymerization reaction and forms a polymer 110 in the defect. As shown in FIG. 6, the polymerization reaction may continue until the polymer 110 fills the defect and the first reactant 210 and second reactant 220 are no longer able to pass through the defect and interact. The thickness of the polymer region may depend on the type of polymer employed and the reaction conditions. In some embodiments the thickness of the polymer region may be greater than a few nanometers, such as greater than 3 nm, greater than 10 nm, greater than 25 nm, greater than 50 nm, greater than 100 nm, greater than 1 μm, greater than 10 μm, greater than 100 μm, or more. In some embodiments, the polymer regions may have a thickness in the range of 3 nm to 100 μm, such as from 10 nm to 50 μm, or from 10 nm to 500 nm.

The first reactant may be any reactant capable of producing a polymer when in contact with the second reactant. The first reactant may be provided in the form of a liquid solution or suspension. In some embodiments the first reactant may be a monomer or oligomer. The monomer or oligomer may include a diamine, such as hexamethylene diamine, or a polystyrene monomer. The first reactant may be biocompatible or bio-inert.

The second reactant may be any reactant capable of producing a polymer when in contact with the first reactant. The second reactant may be provided in the form of a liquid solution, liquid suspension, gas, or plasma. The second reactant may be a monomer, an oligomer, or a catalyst that initiates polymerization. In some embodiments the second reactant may be a dicarboxylic acid, such as hexanedioic acid. In some embodiments the second reactant may be a polymerization catalyst, such as azobisisobutyronitrile (AIBN). The second reactant may be provided in an aqueous solution or an oil based solution. The second reactant may be biocompatible or bio-inert.

In some embodiments, the reactants may be selected from monomers or oligomers that include any of the following functional groups: hydroxyl, ether, ketone, carboxyl, aldehyde, amine, or combinations thereof. The monomers or oligomers may be selected from any appropriate species that includes a functional group capable of reacting with a counterpart reactant to produce a polymer.

In some embodiments, the reactants may be selected to produce a step or condensation polymerization. A step or condensation polymerization reaction is self-limiting, as once the defects are filled such that the reactants can no longer pass through the defect the polymerization reaction will cease due to a lack of reactants. The self-limiting nature of the step or condensation polymerization reaction allows the defects in the graphene material to be fully repaired without concern that polymer formation will continue until pores and desired fluid flow channels are blocked.

In some embodiments, the reactants may be selected to produce an addition or chain polymerization reaction. To produce an addition or chain polymerization one of the reactants may be a monomer, oligomer, or polymer and the second reactant may be an initiator. The addition or chain polymerization reaction may continue until the reaction is quenched or the reactant supply is exhausted. In practice, the extent of the addition or chain polymerization may be controlled by quenching the reaction after a predetermined time that is selected to ensure that sufficient repair of the defects in the graphene material has occurred. In some embodiments, the quenching of the reaction may be achieved by introducing a quenching reagent, such as oxygen, to the reaction system. An addition or chain polymerization reaction may be useful in applications where it is desirable for the polymer to be formed in areas beyond the immediate defects of the graphene material. The ability to form more extensive polymer regions allows the interfacial polymerization process to produce polymer regions with additional functionality, such as providing adhesion enhancements, mechanical reinforcement, or chemical functionalization. An exemplary reactant pair for an addition or chain polymerization may be an AIBN aqueous solution and a vapor phase polystyrene.

The polymer formed during the repair process may be any appropriate polymer. In some embodiments, the polymers formed utilizing a step or condensation polymerization reaction may include polyamide, polyimide, polyester, polyurethane, polysiloxane, phenolic resin, epoxy, melamine, polyacetal, polycarbonate, and co-polymers thereof. The polymers formed utilizing an addition or chain polymerization reaction may include polyacrylonitrile, polystyrene, poly(methyl methacrylate), poly(vinyl acetate), or co-polymers thereof. In some embodiments, the polymer formed during the repair process may be a biocompatible or bio-inert polymer. In some embodiments, the polymer formed during the repair process may be semipermeable, such that some materials or molecules may diffuse through the polymer regions that fill the defects. In some embodiments, the polymer may be porous or non-porous.

In some embodiments the first reactant and the second reactant may have a size larger than a desired pore size of the graphene material. The use of reactants with such a size allows for the selective repair of only those defects that have a size greater than the desired pore size, as the reactants are unable to pass through the defects and pores with a size less than the desired pore size of the graphene material. The size of a defect, as utilized herein, may refer to the effective diameter of the defect. The effective diameter of a defect is the diameter of the largest spherical particle that will pass through the defect. The effective diameter may be measured by any appropriate method, such as imaging with a scanning electron microscope and then calculating the effective diameter of the defect. The size of a reactant, as utilized herein, may refer to the effective diameter of the reactant. In some embodiments, the effective diameter of the reactant may be the diameter of a sphere that is capable of passing through the same openings that the reactant can pass through. In some embodiments, the effective diameter of polymeric materials may refer to the diameter of gyration, with the diameter of gyration being twice the radius of gyration.

In some embodiments, a reactant with a large size may be a dendrimer. In some embodiments, the dendrimers may include a surface containing any of the functional groups described herein for the reactants. For example, the dendrimers may include hydroxyl, amine, sulfonic acid, carboxylic acid, or quaternary ammonium functional groups on the surface thereof. The large reactants may have a size of at least about 15 nm, such as at least about 20 nm, about 25 nm, about 30 nm, about 40 nm, about 50 nm, about 75 nm, about 100 nm, about 125 nm, or more. In some embodiments, a reactant with a large size may be a reactant with a diameter of gyration that is equivalent to the effective diameter of the smallest defect targeted for repair. Exemplary reactants of this type may include high molecular weight polymers with end groups including the functional groups described above for the reactants. In some embodiments, a large reactant may be an ionic polymer, where the first and second reactants are selected to have opposite charges.

Figure 3:
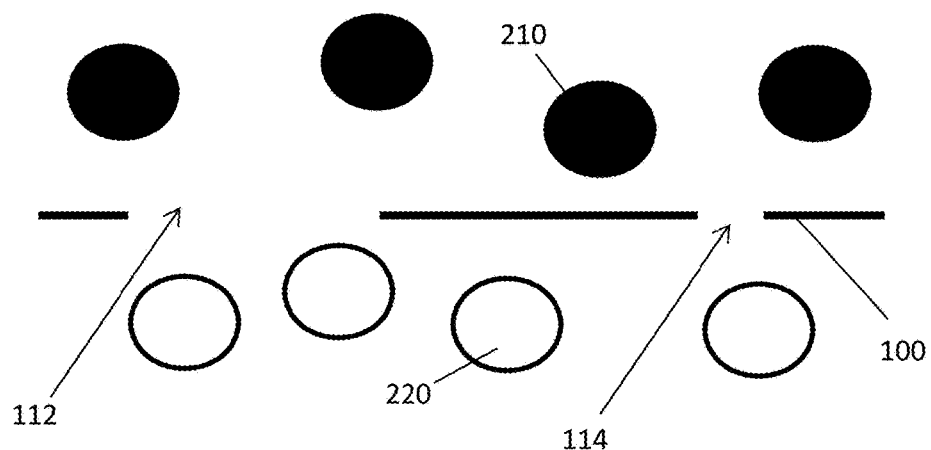
FIG. 3 is a representation of a graphene material including defects and pores when exposed to a first reactant and a second reactant to repair the defects through interfacial polymerization.
Figure 4:
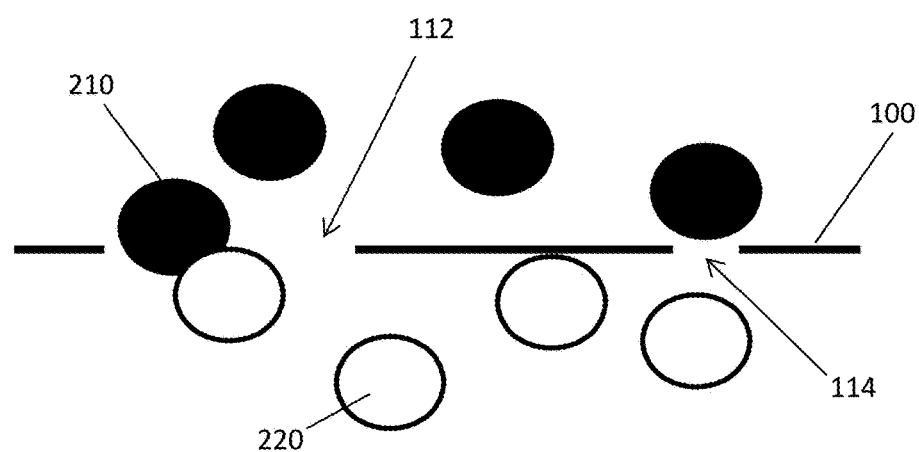
FIG. 4 is a representation of the graphene material of FIG. 3 after the reactants have contacted each other through the defect.
Figure 5:
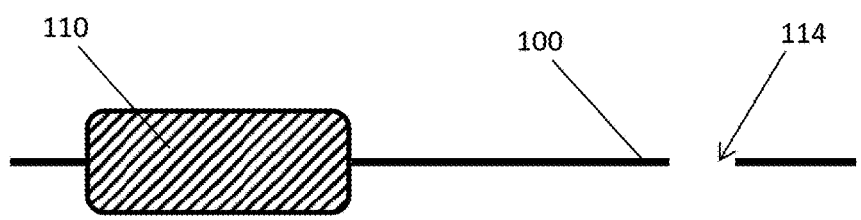
FIG. 5 is the graphene material of FIG. 4 after the polymerization of the reactants forming a polymer region filling the defect.

As shown in FIGS. 3 and 4, the graphene material 100 may include defects 112 and pores 114. The use of a first reactant material 210 and a second reactant material 220 with a size greater than the size of the pores 114 prevents the reactant molecules from passing through and polymerizing in the pores 114. The first reactant material 210 and the second reactant material 220 pass through and polymerize in the defects 112. In this manner, the interfacial polymerization repair process is capable of selectively repairing only those defects having a size that is greater than a desired pore size. As shown in FIG. 5, after the repair process the defects are filled by a polymer region 110, while the pores 114 are open and allow the passage of fluid there through.

In some embodiments the first reactant material and the second reactant material are provided in forms that allow the manner in which the reactants diffuse into each other to be controlled. The way in which the reactants interact influences the location of the polymer produced by the polymerization. In some embodiments the reactants are provided in a form that does not allow significant amounts of diffusion of either reactant in to the other, which produces a polymer region that has a midpoint that substantially aligns with the graphene material, as shown in FIG. 6. The reactants may be provided in solutions that are immiscible with each other, such that the interface between the solutions is maintained along the plane of the graphite material. The immiscible solutions may be any appropriate combination, such as an aqueous solution and an oil-based solution. In some embodiments the diffusion of the reactants in to the other reactant solution may be prevented by selecting reactants that are not soluble in the solvent forming the other solution. For example, a first reactant that is not soluble in oil may be provided in an aqueous solution and a second reactant that is not soluble in water may be provided in an oil solution, producing limited or no diffusion of the reactants to the counterpart solution. In some embodiments, the first reactant and second reactant may be selected such that one of the reactants is cationic and the second reactant is anionic.

Figure 7:
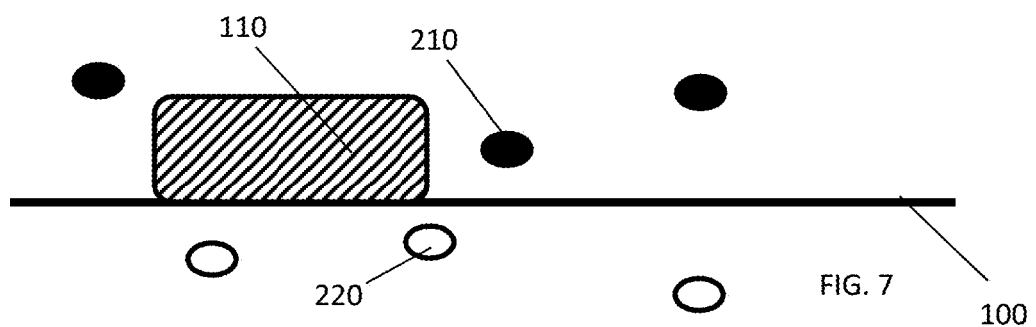
FIG. 7 is a representation of a repaired graphene material, according to one embodiment.

In some embodiments the reactants may be selected such that one of the reactants is capable of diffusing readily into the other reactant. As shown in FIG. 7, the first reactant material 210 may be selected such that the second reactant material 220 diffuses therein, producing a polymer 110 that is located substantially on the side of the graphene material 100 that the first reactant is disposed on. A similar effect may be produced when the first reactant is a liquid solution and the second reactant is a gas, such that the first reactant does not diffuse in to the gas of the second reactant.

Figure 8:
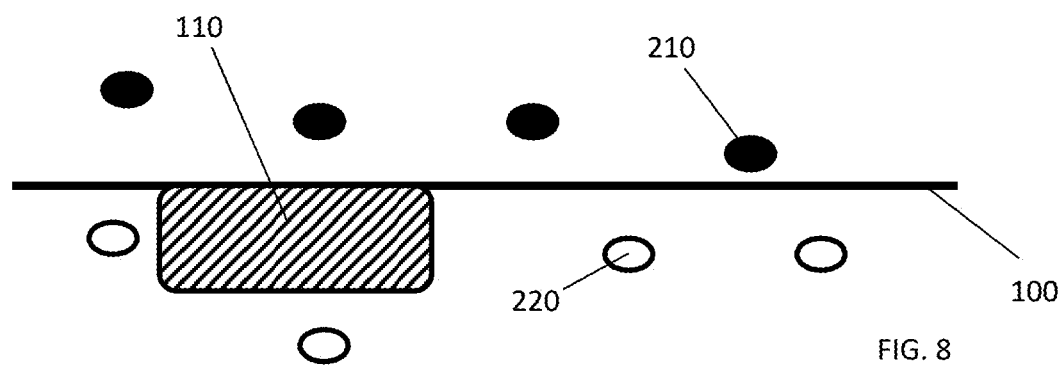
FIG. 8 is a representation of a repaired graphene material, according to one embodiment.

In some embodiments the second reactant material 220 may be selected such that the first reactant material 210 diffuses in the second reactant material 220. A reactant system of this type produces a polymer 110 that is located substantially on the side of the graphene material 100 on which the second reactant material 220 is disposed, as shown in FIG. 8.

In some embodiments, the interaction of the reactants through the defects in the graphene material may be the result of diffusion. In some embodiments, the reactants may be heated to increase the diffusion thereof and the likelihood that the reactants will interact. In some other embodiments, the reactants may be ionic, with the first and second reactants having opposite charges. The opposite charges of the ionic polymers produces an attraction between the reactants, ensuring that the reactants interact across the defects of the graphene material to produce a polymer. In some embodiments, electrophoresis may be employed to facilitate interaction between ionic and polar reactants. In some embodiments, the reactants may have a dipole, such that an electric or magnetic field may be applied to the reactants to drive motion of the reactants in the system and produce interaction between the reactants. In some embodiments, an electrical potential may be applied across the graphene material, attracting the reactants to the surface thereof and enhancing interaction between the reactants.

The polymer regions formed in the defects may be attached to the graphene material by any suitable interaction. In some embodiments, the polymer regions may be attached to the graphene material through mechanical interaction. One example of mechanical interaction occurs includes a polymer region formed such that the portion of the polymer region in plane with the graphene material is has a smaller dimension than the portions of the polymer region formed on either side of the graphene material. The larger ends of the polymer region mechanically interact with the graphene material to prevent the polymer region from being pulled out of the defect. In some embodiments, the graphene material and the polymer region may be attached by Van der Waals attraction.

In some embodiments, the graphene material may be functionalized to produce covalent or non-covalent interactions between the graphene material and the polymer regions. In some embodiments, the graphene material may be rendered hydrophobic or hydrophilic by treating the graphene material before forming the polymer regions, such that the interaction between the graphene material and the polymer region is strengthened. In some embodiments, the graphene material may be treated to form functional groups, such as hydroxyl, carbonyl, carboxylic, or amine groups. The functionalization may be achieved through any appropriate process, such as oxidation of the graphene material. In some embodiments, the graphene material may be oxidized by thermal treatment, ultraviolet oxidation, plasma treatment, sulfuric acid treatment, nitric acid treatment, or permanganate treatment. In some embodiments, the graphene material may be aminated by ammonia treatment. The oxidation may be limited to the area of the graphene material containing defects, as the chemical bonds of the graphene material are generally more reactive in the areas adjacent to defects than in the basal plane. The functional groups produced by the treatment of the graphene material may form covalent bonds with the polymer regions, such that the polymer regions are attached to the graphene material by the covalent bonds.

The reactants may be selected such that the produced polymer is capable of adhering to a support over which the graphene material may be disposed. In some embodiments, graphene materials do not covalently bond to support materials, thus by selecting a polymer material to repair defects in the graphene material that will adhere to a support structure the adhesion of the repaired graphene material to the support structure may be improved. The increased adhesion may be demonstrated by immersing the sample in a solvent that does not attack the polymer regions or the support structure and agitating the sample. In some embodiments, the increased adhesion may be demonstrated by applying a back pressure to the support structure side of the graphene material, and measuring the delamination/rupture pressure. The materials exhibiting improved adhesion have a higher delamination/rupture pressure than graphene materials that lack the polymer regions.

The support structure may be any appropriate structure that supports the graphene material without hindering the desired applications of the graphene material, such as filtration or selective permeability. The support structure may be a polymer material, such as a polycarbonate material. In the case that the support is a polycarbonate material, the polymer may be an epoxy. The support may be a porous material, such that the graphene material is supported while also allowing fluid to flow to and through the graphene material.

A porous material that may be useful as a support structure for the graphene material may include one or more selected from ceramics and thin film polymers. In some embodiments, ceramic porous materials may include silica, silicon, silicon nitride, and combinations thereof. In some embodiments, the porous material may include track-etched polymers, expanded polymers, patterned polymers, non-woven polymers, woven polymers, and combinations thereof.

The support structure may include a polymer selected from the group consisting of polysulfones, polyurethane, polymethylmethacrylate (PMMA), polyethylene glycol (PEG), polylactic-co-glycolic acid (PLGA), PLA, PGA, polyamides (such as nylon-6,6, supramid and nylamid), polyimides, polypropylene, polyethersulfones (PES), polyvinylidine fluoride (PVDF), cellulose acetate, polyethylene, polypropylene, polycarbonate, polytetrafluoroethylene (PTFE) (such as Teflon), polyvinylchloride (PVC), polyether ether ketone (PEEK), mixtures and block co-polymers of any of these, and combinations and/or mixtures thereof. In some embodiments, the polymers are biocompatible, bioinert and/or medical grade materials.

Figure 14:
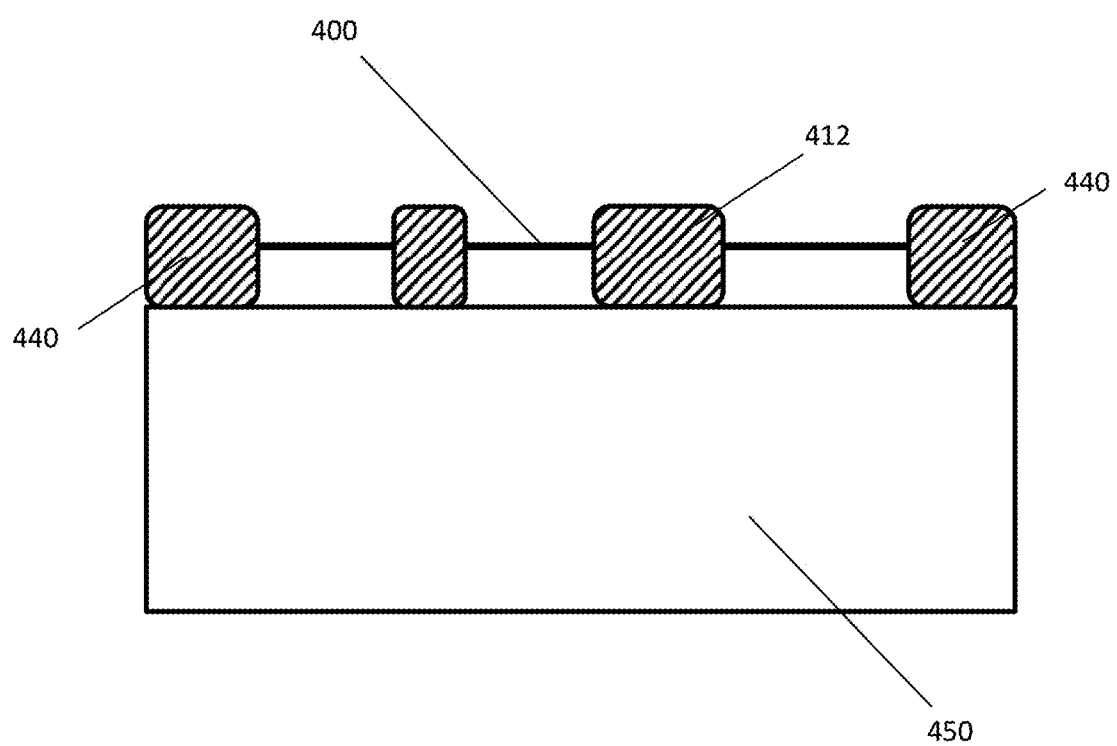
FIG. 14 is a representation of a cross-section of a graphene material that has undergone interfacial polymerization to repair defects and form a polymer handling region, where the graphene material is adhered to a support.

The repaired graphene material may be adhered to the support structure material by placing the repaired graphene material in contact with the support structure material. In some embodiments, the support structure may be treated to promote adhesion to the polymer regions of the repaired graphene material. The adhesion promoting treatment may include any appropriate process, such as subjecting the surface of the support structure to ultra violet oxidation. As shown in FIG. 14, the graphene material 400 may be separated from the support structure material 450 by a gap as a result of the thickness and location of the polymer regions 412 repairing the defects and polymer handling region 440. The size of the gap may be controlled by altering the location of the polymer regions formed during the repair process, as described above.

The increase in adhesion of the repaired graphene material to the support structure is a function of the proportion of polymer regions in the repaired graphene material. In some embodiments, a minimum amount of polymer regions, and thereby adhesion, may be ensured by forming holes in the graphene layer before the repair process. As utilized herein, holes refer to openings purposefully formed in the graphene material that will be plugged by the polymer material during the repair process. In some embodiments, the holes may fall within the defect classification, as they are undesired in the repaired membrane material. In some embodiments, the holes may have any appropriate size, such as any of the sizes of the pores described herein. In some embodiments, the holes may have a size that is greater than the desired pore size, such that the holes may be filled during the repair process and the pores may remain open.

Figure 11:
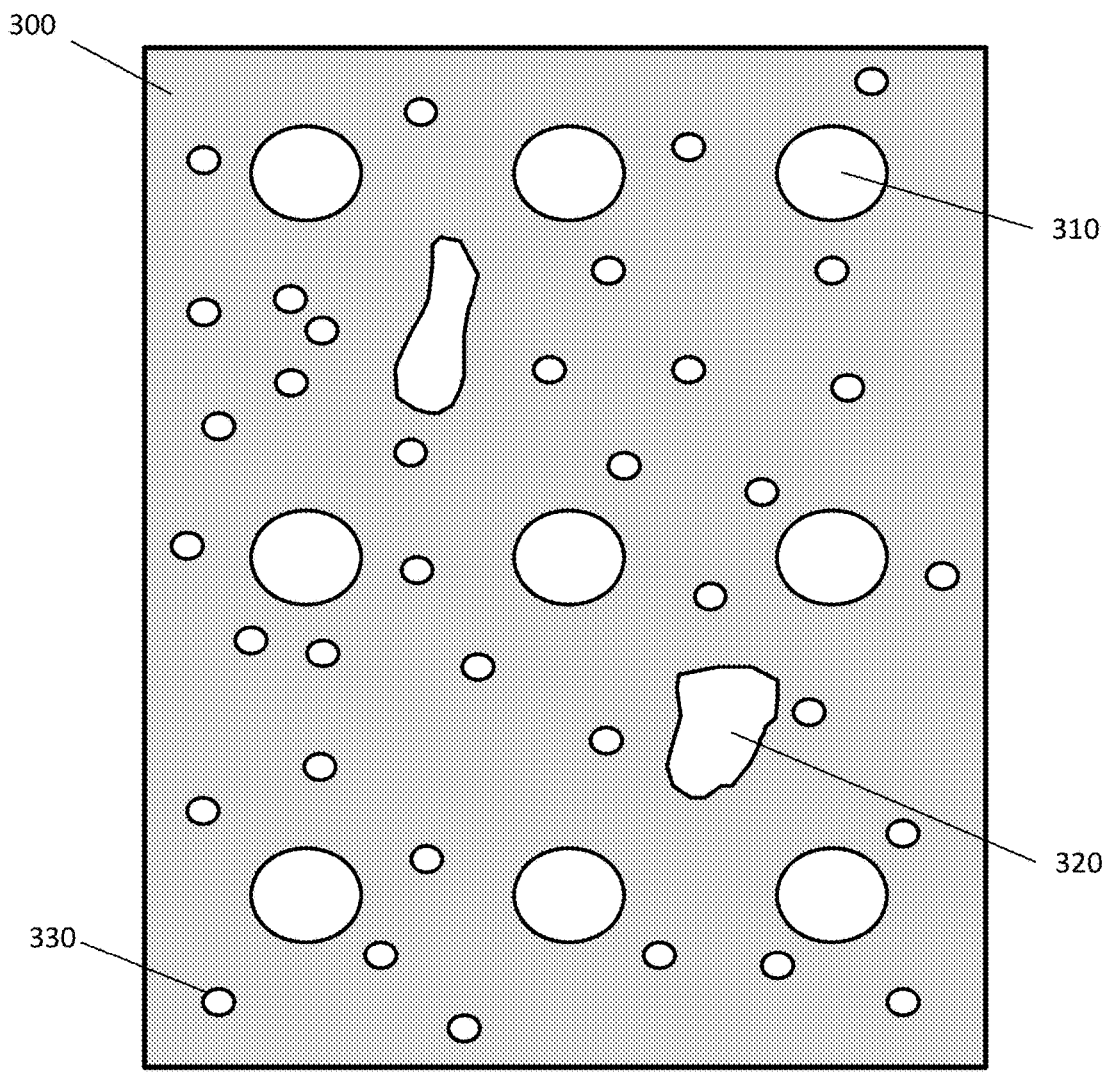
FIG. 11 is a top down representation of a graphene material including pores, holes, and defects.

The holes may be formed in the graphene material by any appropriate process, such as ion bombardment, chemical reaction, nanoparticle impacting or mechanical cutting. In some embodiments, the holes may be formed by any of the processes described herein for the formation of pores in the material. The holes may be arranged in a periodic array with a predetermined pattern and spacing across the surface of the graphene material. As shown in FIG. 11, the holes may be arranged in a plurality of rows, with a defined spacing between holes within each row, and a defined spacing between rows. The spacing of the holes in the rows may be the same in multiple rows, or different in each row. The spacing between the rows may be uniform, such that the spacing between each adjacent pair of rows is the same, or varied, such that the spacing between pairs of adjacent rows may be different. In some embodiments, the spacing of the holes in adjacent rows may be in phase, such that the holes in adjacent rows are aligned, as shown in FIG. 11. In some other embodiments, the spacing of the holes in the rows may be out of phase, such that the holes in adjacent rows are not aligned. In some embodiments, the holes may be arranged in a repeating pattern. In some embodiments, the holes may have a random distribution across the surface of the graphene material.

In some embodiments, the holes may be formed such that the holes account for at least about 5% of the area of the graphene material before repair, such as at least about 10%, about 15%, about 20%, about 25%, about 30%, about 40%, or more. In some embodiments, the holes may have an area of less than about 50% of the area of the graphene material before repair, such as less than about 45%, about 40%, about 35%, about 30%, about 25%, about 20%, or less. The minimum area of the holes of the graphene material may be selected such that the polymer regions of the repaired graphene material produce at least a desired degree of adhesion between the repaired graphene material and the support structure.

The adhesion between the repaired graphene material and the support structure produces a graphene membrane assembly. The adhesion between the polymer regions of the repaired graphene material and the support structure may include Van der Waals forces, chemical bonds, molecular entanglement, or combinations thereof. In some embodiments, the polymer of the polymer regions may include polar a group, such as a hydroxyl, carbonyl, amine, epoxide, or combinations thereof, that exhibits stronger Van der Waals attraction to the support structure than the graphene material. In some embodiments, the polymer of the polymer regions may include functional groups or side chains that readily react with the support structure to form chemical bonds. The chemical bonding between the polymer regions and the support structure may be initiated by any appropriate process, such as exposure to ultraviolet (UV) radiation, thermal treatment, or combinations thereof. In some embodiments, the polymer molecules of the polymer regions may be entangled with polymer molecules of the support structure. The molecular entanglement may be produced by thermal treatment of the graphene membrane assembly, such that the polymer of the polymer region and the support structure are softened without degrading. In such applications, the polymer of the polymer region and the polymer of the support structure may be selected to have similar thermal properties, such that both polymers are softened sufficiently at the treatment temperature to produce entanglement of the polymer molecules. The graphene membrane assembly exhibits improved performance and service life when compared to a graphene membrane without polymer adhesion regions disposed on support structures.

Figure 20:
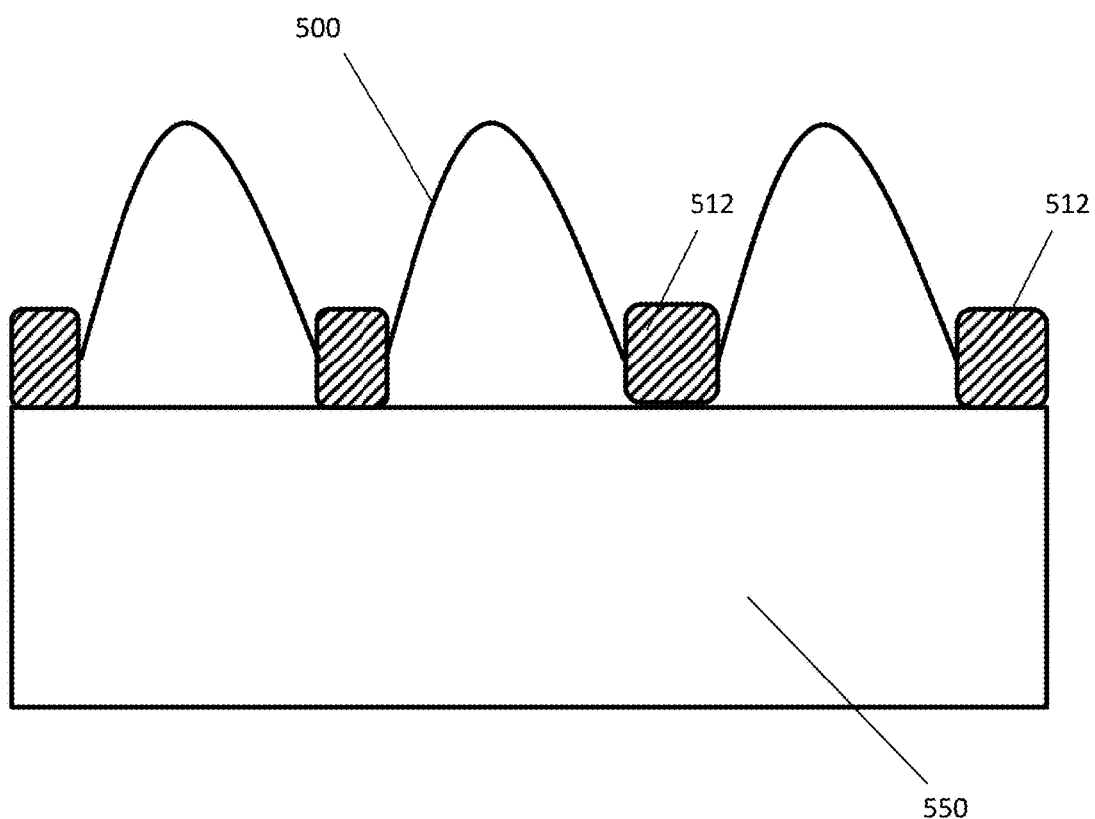
FIG. 20 is a representation of a cross-section of a graphene material that has undergone interfacial polymerization to repair defects and form a polymer handling region, where the graphene material is adhered to a support such that the distance between the polymer regions on the support is less than the length of the graphene between the polymer regions.

In some embodiments, the polymer regions may be adhered to a support structure in a manner that increases the surface area of the graphene material provided on the support structure. As shown in FIG. 20, polymer regions 512 of a repaired graphene material may be adhered to a support structure 550 such that the graphene material 500 forms folds, drapes, or bends that increase the available surface area of the graphene material. The increased surface area may be produced by adhering the polymer regions 512 to the support structure 550 such that the distance between the polymer regions on the support structure is less than the length of the graphene material between the polymer regions. The graphene material may then fold or bend to accommodate the shorter distance between the polymer regions, and produce an increased graphene surface area for a given support structure area. In some embodiments, the folds, drapes, or bends may be formed by performing the repair process in a solvent that induces swelling in the polymer, and then exchanging the solvent for another solvent that does not swell the polymer. The resulting shrinkage of the polymer regions may relax the graphene and create folds, drapes, or bends therein. In some embodiments, the polymer regions may be softened by heating to relieve stress in the polymer material, creating folds, drapes, or bends in the graphene material. In some embodiments, movements of the repaired graphene material that includes the polymer regions may produce the folds, drapes, or bends in the graphene material.

Figure 17:
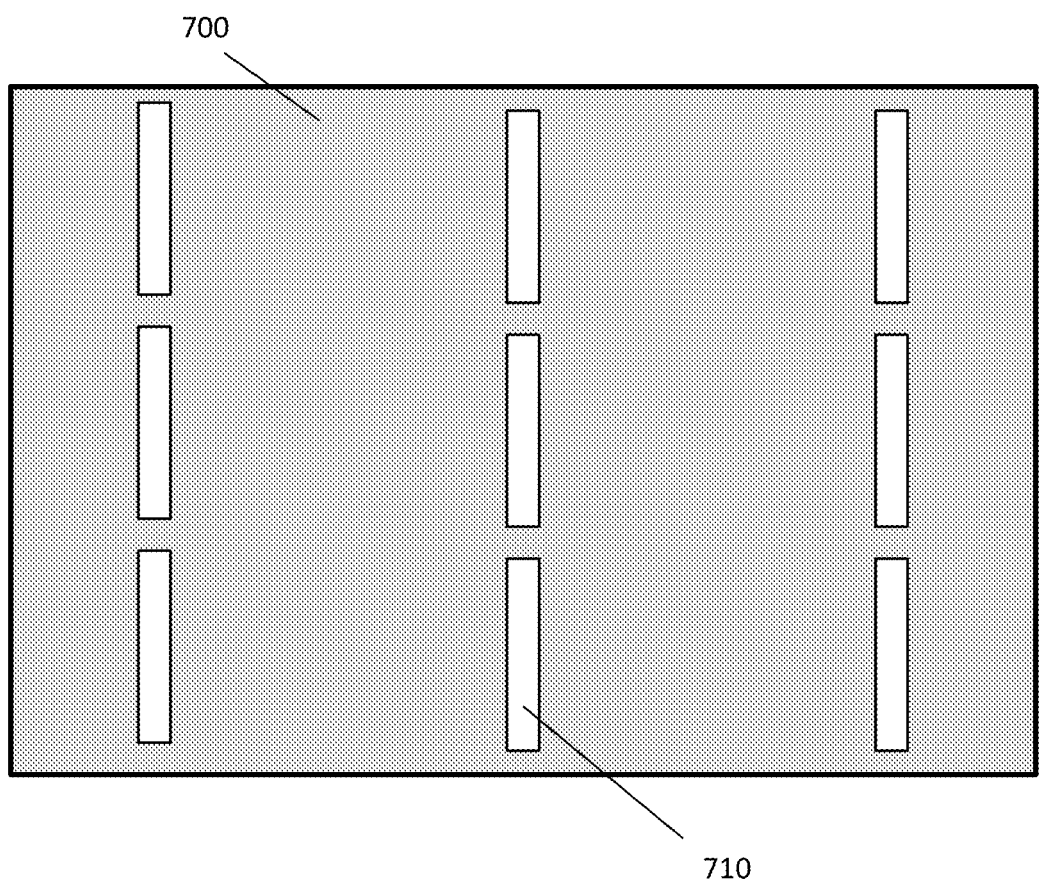
FIG. 17 is a top down representation of a graphene material that includes holes formed therein arranged such that an in-situ grown support structure may be produced.
Figure 18:
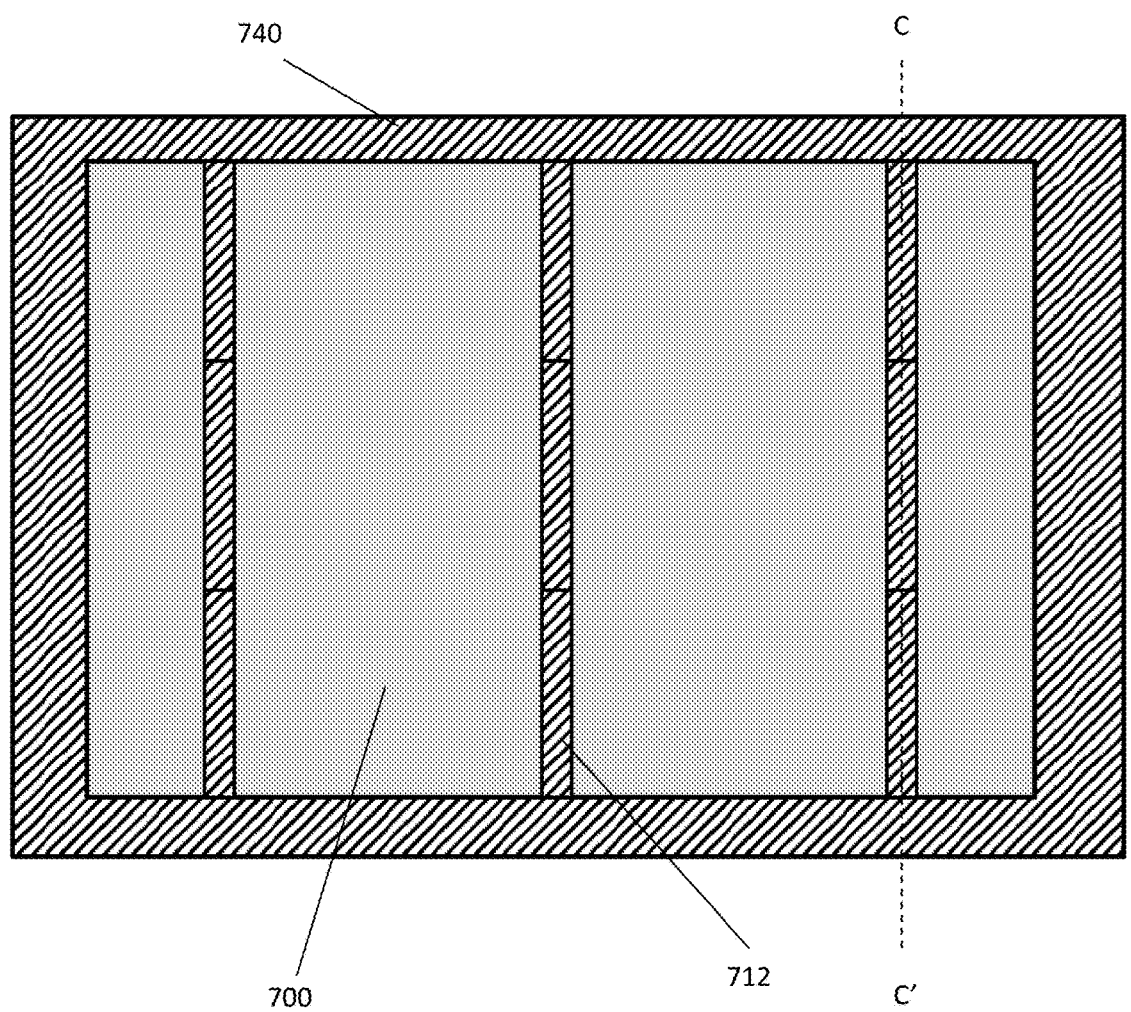
FIG. 18 is a top down representation of the graphene material of FIG. 17 after undergoing interfacial polymerization.
Figure 19:
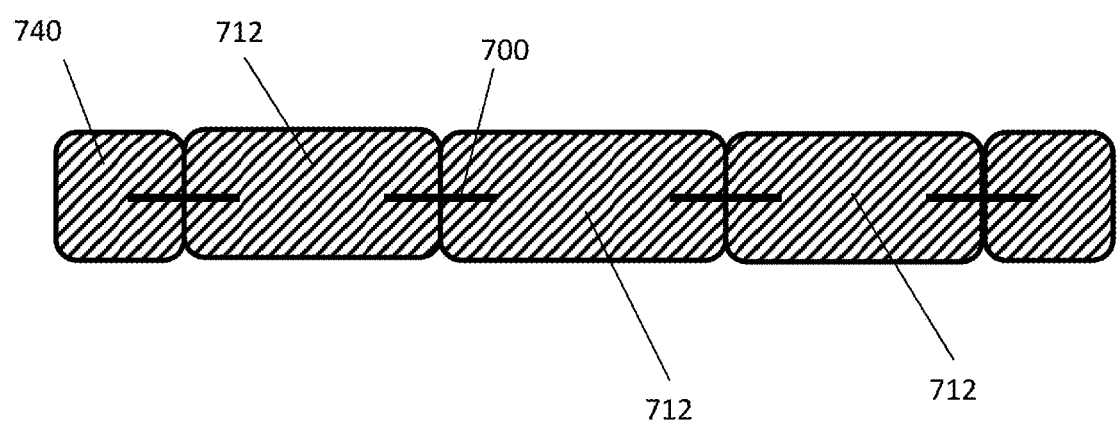
FIG. 19 is a representation of a cross-section of FIG. 18 along line C-C'.

In some embodiments, the support structure may be formed in situ during the repair process. To create the in situ support structure, holes may be formed in the graphene material in a pattern and spacing that will result in an interconnected polymer layer, while still maintaining an area of the graphene material sufficient to allow the desired performance of the graphene material. The holes may be produced utilizing any of the procedures described herein, and with any of the shapes and sizes described herein. The holes may be formed in any appropriate pattern, and with any appropriate size. In some embodiments, the holes may be formed in linear arrangements such that the distance between the holes is significantly smaller than the size of the holes. The holes may be arranged in lines, circles, squares, or any other appropriate pattern. As shown in FIG. 17, the holes 710 may be formed in the graphene material 700 in a series of lines, where the spacing between the holes within the lines is small in comparison to the size of the holes. The polymer may grow beyond the beyond the borders of the holes, such that the formed polymer regions associated with each hole fuse or merge together, producing a substantially continuous support structure. As shown in FIG. 18, the in situ formed polymer support structure may include a polymer handling region 740 fused with the polymer regions 712 formed in the holes. The extent to which the polymer regions extend beyond the borders of the holes is illustrated in FIG. 19, which shows that portions of the polymer regions filling the holes 712 and/or polymer handling regions 740 may extend over portions of the graphene material 700 to fuse and form a substantially continuous in situ support structure.

The in situ support structure may resemble a porous polymer layer, with the graphene material extending across the pores in the support structure. In some embodiments, the in situ support structure may be produced by disposing a porous layer over the graphene membrane prior to forming the in situ support structure, and removing the porous layer after the formation of the in situ support to form fluid flow channels in the in situ support. The porous layer may be a mesh, such as a polymer mesh. The removal of the porous layer may be achieved by any appropriate process, such as dissolving the porous layer. In some embodiments, the graphene material employed in the formation of the in situ support structure may be free of defects other than the holes produced for the purpose of forming the in situ support structure.

Figure 13:
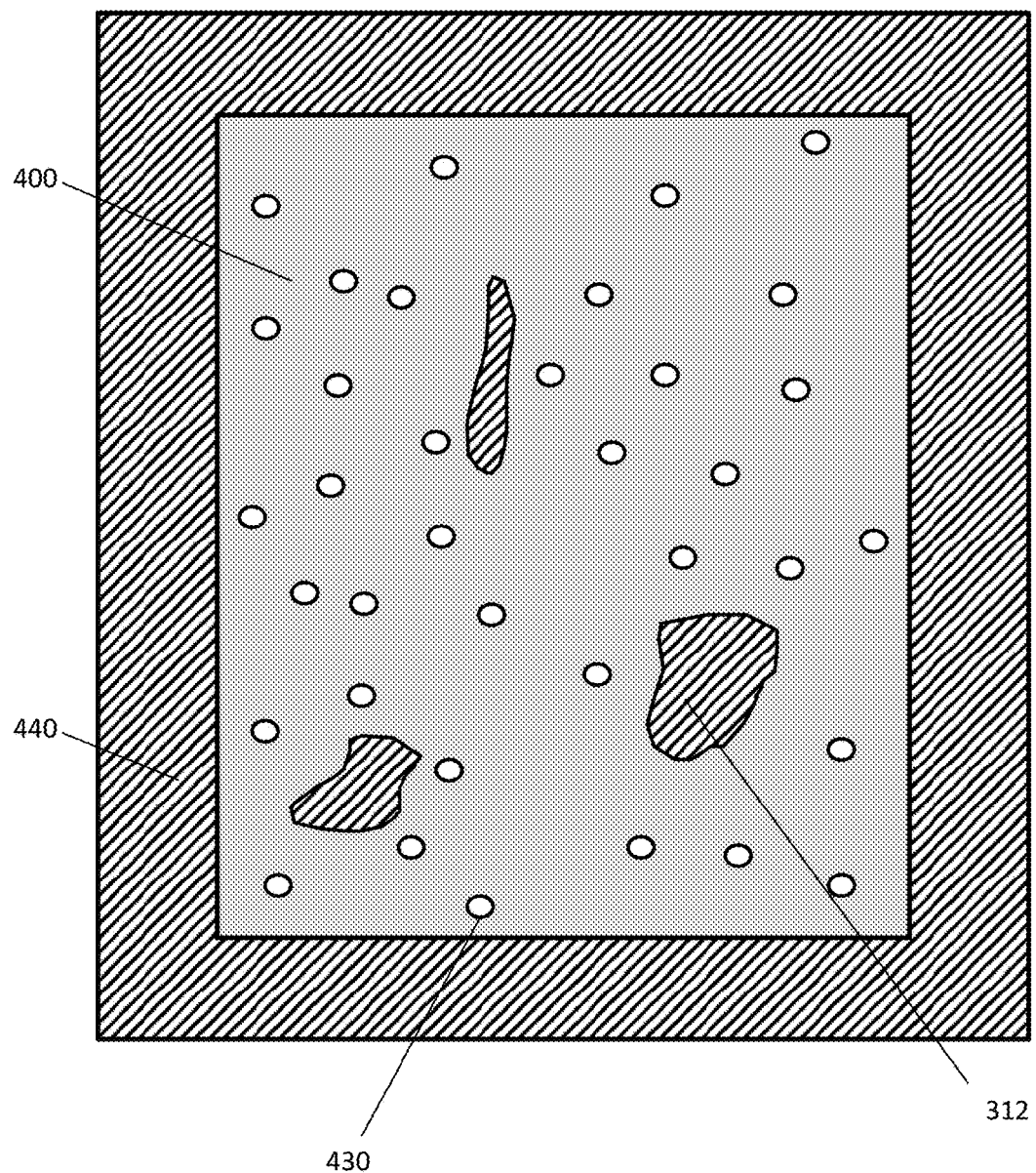
FIG. 13 is a top down representation of a graphene material that has undergone interfacial polymerization to repair defects and form a polymer handling region.

In some embodiments, the repair process may be extended to produce a polymer handling region attached to the graphene material. The polymer handling region 440 may form a frame around the graphene material 400 as shown in FIG. 13. The polymer handling region 440 may be formed in the same process and at the same time as the polymer regions 412 that repair defects in the graphene material 400. The polymer handling region may be produced by extending the first reactant and the second reactant beyond the edges of the graphene material, such that the first and second reactants form a polymer extending from the edge of the graphene material. The polymer handling region allows the repaired graphene material to be handled more easily, as the polymer handling region may be more damage resistant than the graphene material. Additionally, the polymer handling region allows the repaired graphene material to be manipulated without directly contacting the graphene material, reducing the opportunity for defects to form in the graphene material after the repair process. In some embodiments, the repair process may be utilized to form a polymer handling region on a graphene material that is free of defects.

The polymer handling region may have any appropriate size and geometry. As shown in FIG. 13, the polymer handling region 440 may be in the form of a substantially continuous border that extends along the circumference of the graphene material 400. The polymer handling region may extend for a distance of at least about 1 mm from the edge of the graphene material, such as at least about 2 mm, about 5 mm, about 1 cm, about 2 cm, about 5 cm, or more. The polymer handling region may have a thickness on the same scale as the polymer regions that plug defects in the graphene material described herein. In some embodiments, the polymer handling region has the same thickness as the polymer regions that plug defects in the graphene material.

In some embodiments, the polymer handling region may extend along at least a portion of an edge of the graphene region, such as along one or more edges of the graphene material.

Figure 15:
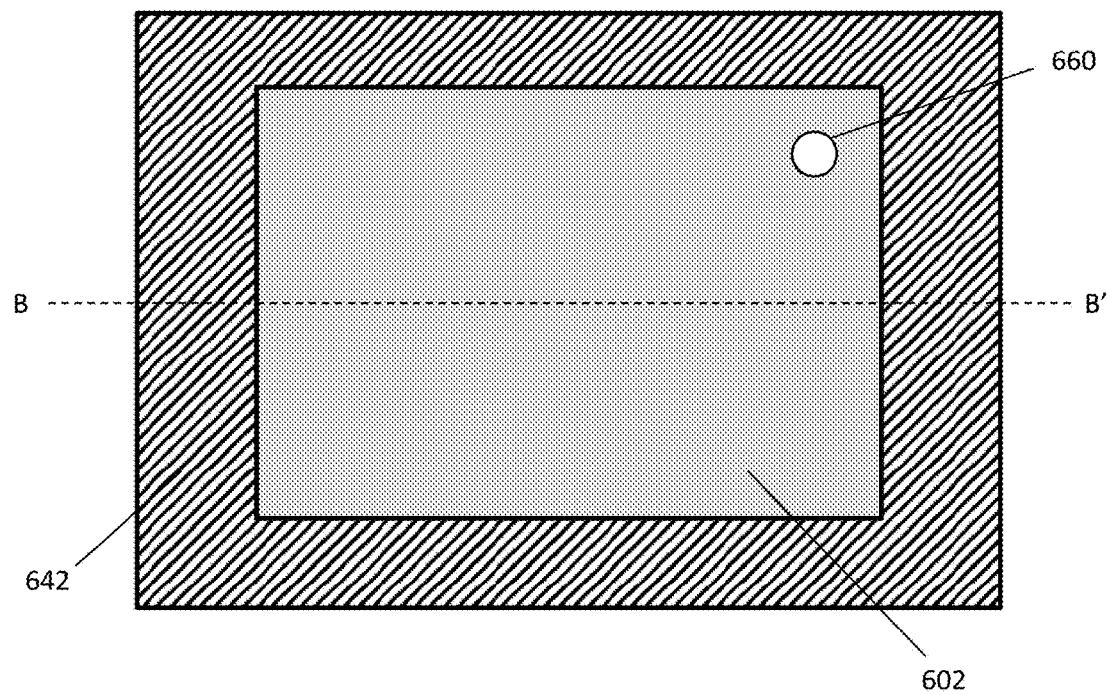
FIG. 15 is a top down representation of an enclosure including a graphene material and a polymer handling region.
Figure 16:
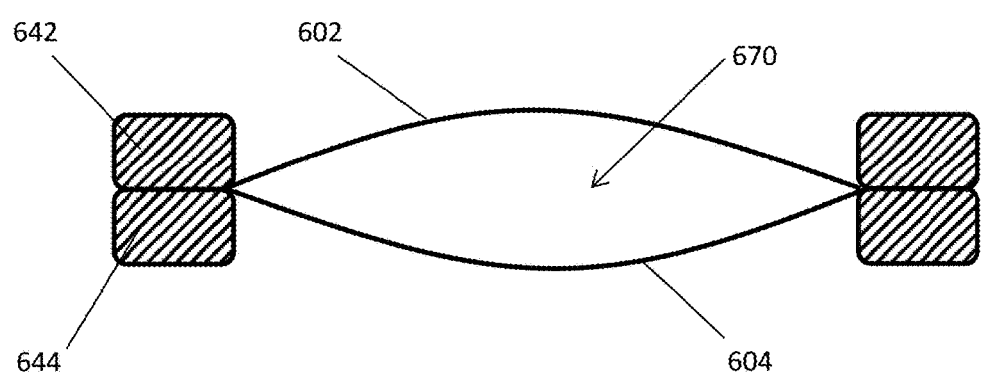
FIG. 16 is a cross-section of the enclosure of FIG. 15 along line B-B'.

In some embodiments, the polymer handling region 440 may also function as a sealing region that prevents fluid from flowing around the edges of the graphene material. The polymer handling region may be adhered and sealed to a support structure 450, as shown in FIG. 14. In some embodiments, the polymer handling region may be utilized to mount the graphene material in a device or test fixture. The polymer handling region 642 of a first repaired graphene material 602 may be sealed to the polymer handling region 644 of a second repaired graphene material 604 to form a graphene enclosure or envelope, as shown in FIGS. 15 and 16. The graphene enclosure or envelope forms an interior volume 670 that is defined by the first graphene material 602 and the second graphene material 604.

The polymer repair process may be conducted before or after forming pores in the graphene material. In cases where the pores are formed in the graphene material before the repair process, the repair process may employ reactants with a size selected to repair only defects greater in size than the desired pores, as described above. In this manner the desired pores are maintained in the repaired graphene material, while defects larger than the desired pore size are repaired with a polymer region. Performing the repair process after forming the pores allows for pore forming procedure that results in a less controlled pore size to be employed, as pores formed that are larger than the desired size will be repaired. Additionally, defects may be formed in the graphene material during the pore forming process and repairing the graphene material after the pore forming process prevent defects formed in the pore forming process from being present in the finished material. This produces a graphene material with more uniform pore sizes.

Figure 12:
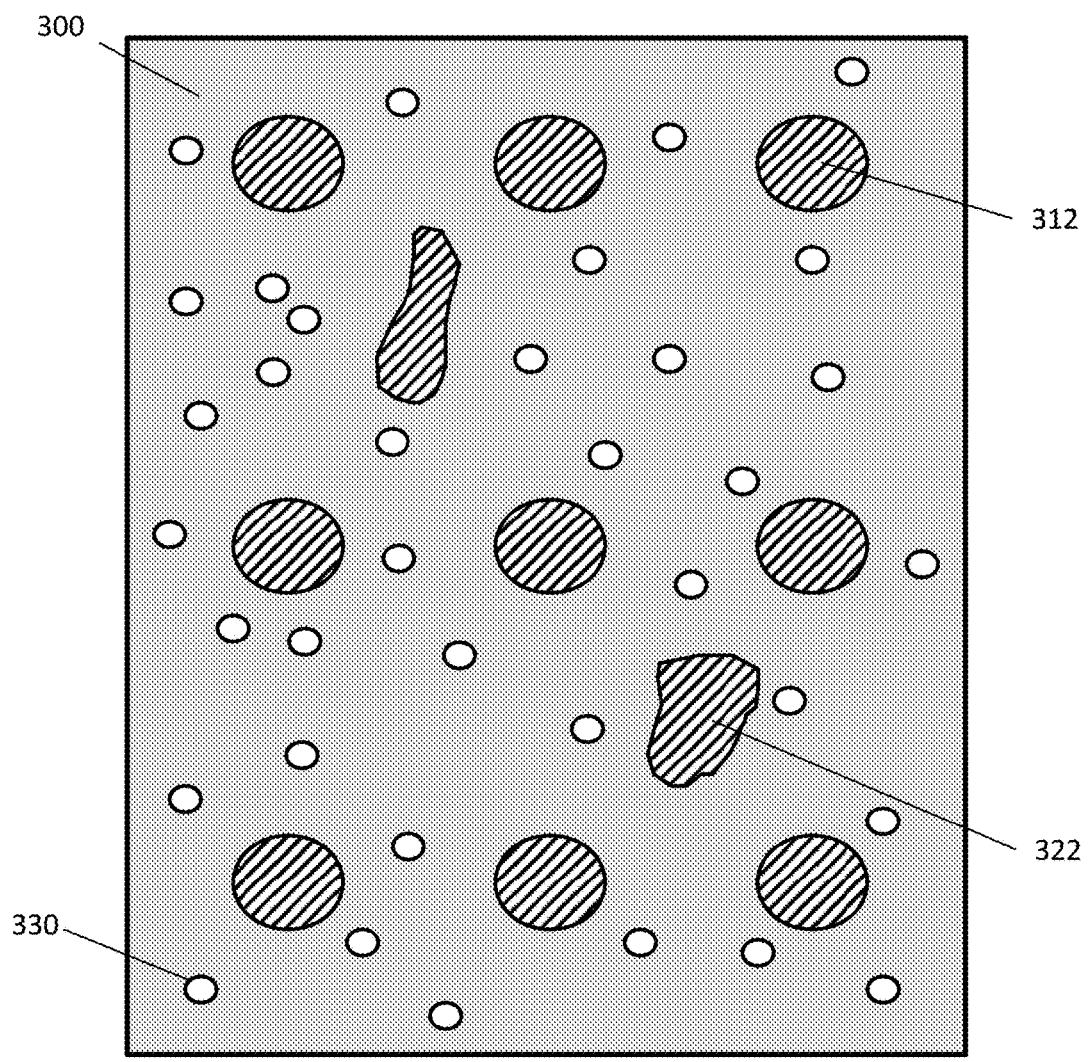
FIG. 12 is the graphene material of FIG. 11 after the holes and defects have been filled by interfacial polymerization.

In some embodiments, the process of producing a perforated graphene material may include forming pores in a graphene material, forming holes in the graphene material to increase adhesion of the graphene material to a substrate, and repairing the graphene material utilizing an interfacial polymerization process. After forming the pores and holes and before repairing the graphene material, the graphene material 300 includes pores 330, holes 310 and defects 320, as shown in FIG. 11. After repairing the graphene material, the graphene material 300 includes pores 330, polymer regions filling the defects 322, and polymer regions filling the holes 312, as shown in FIG. 12. The repaired graphene material may be free of defects and holes that are larger than the desired pore size. The forming of the holes in the graphene material is an optional step, and may not be performed where an increase in adhesion between the graphene material and a substrate is not desired. For example, a process without the formation of holes may produce a graphene material 400 that includes pores 430, a polymer region filling defects 412, and a polymer handling region 440.

In some embodiments the graphene material may be produced by repairing defects in the graphene material with interfacial polymerization and forming pores in the material by any appropriate process. In some embodiments, pores may be formed in the graphene material by ultraviolet oxidation, plasma treatment, ion irradiation, or nanoparticle bombardment. The pore formation may occur before or after the repair of the graphene material.

Ion-based perforation processes may include methods in which the graphene-based material is irradiated with a directional ion source. In some embodiments, the ion source is collimated. The ion source may be a broad field or flood ion source. A broad field or flood ion source can provide an ion flux which is significantly reduced compared to a focused ion beam. The ion source inducing perforation of the graphene or other two-dimensional material in embodiments of the present disclosure is considered to provide a broad ion field, also commonly referred to as an ion flood source. In some embodiments, the ion flood source does not include focusing lenses. In some embodiments, the ion source may be operated at less than atmospheric pressure, such as at $10^{-3}$ to $10^{-5}$ torr or $10^{-4}$ to $10^{-6}$ torr. The environment may also contain background amounts (e.g. on the order of $10^{-5}$ torr) of oxygen ($O_2$), nitrogen ($N_2$) or carbon dioxide ($CO_2$). The ion beam may be perpendicular to the surface of the layer(s) of the material (incidence angle of 0 degrees) or the incidence angle may be from 0 to 45 degrees, 0 to 20 degrees, 0 to 15 degrees or 0 to 10 degrees. In some embodiments, exposure to ions does not include exposure to a plasma.

Ultraviolet oxidation based perforation processes may include methods in which the graphene-based material is simultaneously exposed to ultraviolet (UV) light and an oxygen containing gas. Ozone may be generated by exposure of an oxygen containing gas such as oxygen or air to the UV light. Ozone may also be supplied by an ozone generator device. In some embodiments, the UV oxidation based perforation method further includes exposure of the graphene-based material to atomic oxygen. Suitable wavelengths of UV light may include, but are not limited to, wavelengths below 300 nm, such as from 150 nm to 300 nm. In some embodiments, the intensity of the UV light may be from 10 to 100 mW/cm$^2$ at 6 mm distance or 100 to 1000 mW/cm$^2$ at 6 mm distance. For example, suitable UV light may be emitted by mercury discharge lamps (e.g. a wavelength of about 185 nm to 254 nm). In some embodiments, UV oxidation is performed at room temperature or at a temperature greater than room temperature. In some embodiments, UV oxidation may be performed at atmospheric pressure (e.g. 1 atm) or under vacuum.

In some embodiments, the pores may be formed by nanoparticle bombardment. Nanoparticle bombardment may employ a nanoparticle beam or a cluster beam. In some embodiments, the beam is collimated or is not collimated. Furthermore, the beam need not be highly focused. In some embodiments, a plurality of the nanoparticles or clusters is singly charged. In additional embodiments, the nanoparticles comprise from 500 to 250,000 atoms, such as from 500 to 5,000 atoms.

A variety of metal particles are suitable for use in the methods of the present disclosure. For example, nanoparticles of Al, Ag, Au, Ti, Cu and nanoparticles comprising Al, Ag, Au, Ti, Cu are suitable. Metal NPs can be generated in a number of ways including magnetron sputtering and liquid metal ion sources (LMIS). Methods for generation of nanoparticles are further described in Cassidy, Cathal, et al. "Inoculation of silicon nanoparticles with silver atoms." Scientific reports 3 (2013), Haberland, Hellmut, et al. "Filling of micron-sized contact holes with copper by energetic cluster impact." Journal of Vacuum Science & Technology A 12.5 (1994): 2925-2930, Bromann, Karsten, et al. "Controlled deposition of size-selected silver nanoclusters." Science 274.5289 (1996): 956-958, Palmer, R. E., S. Pratontep, and H-G. Boyen. "Nanostructured surfaces from size-selected clusters." Nature Materials 2.7 (2003): 443-448, Shyjumon, I., et al. "Structural deformation, melting point and lattice parameter studies of size selected silver clusters." The European Physical Journal D-Atomic, Molecular, Optical and Plasma Physics 37.3 (2006): 409-415, Allen, L. P., et al. "Craters on silicon surfaces created by gas cluster ion impacts." Journal of applied physics 92.7 (2002): 3671-3678, Wucher, Andreas, Hua Tian, and Nicholas Winograd. "A Mixed Cluster Ion Beam to Enhance the Ionization Efficiency in Molecular Secondary Ion Mass Spectrometry." *Rapid communications in mass spectrometry: RCM* 28.4 (2014): 396-400. *PMC*. Web. 6 Aug. 2015 and Pratontep, S., et al. "Size-selected cluster beam source based on radio frequency magnetron plasma sputtering and gas condensation." Review of scientific instruments 76.4 (2005): 045103, each of which is hereby incorporated by reference for its description of nanoparticle generation techniques.

Gas cluster beams can be made when high pressure gas adiabatically expands in a vacuum and cools such that it condenses into clusters. Clusters can also be made ex situ such as C60 and then accelerated towards the graphene.

In some embodiments, the nanoparticles are specially selected to introduce moieties into the graphene. In some embodiments, the nanoparticles function as catalysts. The moieties may be introduced at elevated temperatures, optionally in the presence of a gas. In other embodiments, the nanoparticles introduce "chiseling" moieties, which are moieties that help reduce the amount of energy needed to remove an atom during irradiation.

In some embodiments, the size of the produced pores is controlled by controlling both the nanoparticle size and the nanoparticle energy. Without wishing to be bound by any particular belief, if all the nanoparticles have sufficient energy to perforate, then the resulting pores are believed to correlate with the nanoparticle sizes selected. However, the size of the pore is believed to be influenced by deformation of the nanoparticle during the perforation process. This deformation is believed to be influenced by both the energy and size of the nanoparticle and the stiffness of the graphene layer(s). A grazing angle of incidence of the nanoparticles can also produce deformation of the nanoparticles. In addition, if the nanoparticle energy is controlled, it is believed that nanoparticles can be deposited with a large mass and size distribution, but that a sharp cutoff can still be achieved.

Without wishing to be bound by any particular belief, the mechanism of perforation is believed to be a continuum bound by sputtering on one end (where enough energy is delivered to the graphene sheet to atomize the carbon in and around the NP impact site) and ripping or fracturing (where strain induced failure opens a torn hole but leaves the graphene carbons as part of the original sheet). Part of the graphene layer may fold over at the site of the rip or fracture. In an embodiment the cluster can be reactive so as to aid in the removal of carbon (e.g. an oxygen cluster or having trace amounts of a molecule known to etch carbon in a gas cluster beam i.e. a mixed gas cluster beam). Without wishing to be bound by any particular belief, the stiffness of a graphene layer is believed to be influenced by both the elastic modulus of graphene and the tautness of the graphene. Factors influencing the elastic modulus of a graphene layer are believed to include temperature, defects (either small defects or larger defects from NP irradiation), physisorption, chemisorption and doping. Tautness is believed to be influenced by coefficient of thermal expansion mismatches (e.g. between substrate and graphene layer) during deposition, strain in the graphene layer, wrinkling of the graphene layer. It is believed that strain in a graphene layer can be influenced by a number of factors including application of gas pressure to the backside (substrate side) of a graphene layer, straining of an elastic substrate prior to deposition of graphene, flexing of the substrate during deposition, and defecting the graphene layer in controlled regions to cause the layer to locally contract and increase the local strain.

In some embodiments, nanoparticle perforation can be further controlled by straining the graphene layers during perforation to induce fracture, thereby "ripping" or "tearing" one or more graphene layers. In some embodiments, the stress is directional and used to preferentially fracture in a specific orientation. For example, ripping of one or more graphene sheets can be used to create "slit" shaped apertures; such apertures can be substantially larger than the nanoparticle used to initiate the aperture. In additional embodiments, the stress is not oriented in a particular direction.

In some embodiments, the pores may be functionalized. In some embodiments, the pores are functionalized by exposure to gas during and/or following the perforation process. The exposure to gas may occur at temperatures above room temperature. In some embodiments, the pores can have more than one effective functionalization. For example, when the top and the bottom layers of a graphite stack are exposed to different functionalizing gases, more than one effective functionalization can be produced. In further embodiments, a thin layer of a functionalizing moiety is applied to the surface before NP perforation, during NP perforation and after NP perforation. As compatible with the NP process, the thin layer may be formed by applying a fluid to the surface. In embodiments, the gas pressure is $10^4$ Torr to atmospheric pressure. In embodiments, functionalizing moieties include, but are not limited to water, water vapor, PEG, oxygen, nitrogen, amines, and carboxylic acid.

The preferred gasses for before and during functionalization depend on the reaction of graphene and the gas within the high energy environment of the particle impact. This would be within about 100 nm of the edge of the particle impact. This fits into two general classes, and the gases would be added at a partial pressure of from $1\times10^{-6}$ Torr to $1\times10^{-3}$ Torr. The first class would be species that reacts with radicals, carbanions (negative charge centered on a carbon) and carbocations (positive charge centered on a carbon). Representative molecules include carbon dioxide, ethylene oxide and isoprene. The second class would be species that fragment to create species that react with graphene and defective graphene. Representative molecules would be polyethylene glycol, diacytylperoxide, azobisisobutyronitrile, and phenyl diazonium iodide.

In some embodiments, it is desirable and advantageous to perforate multiple graphene sheets at one time rather than perforating single graphene sheets individually, since multilayer graphene is more robust and less prone to the presence of intrinsic or defects that align through all the layers than is single-layer graphene. In addition, the process is stepwise efficient, since perforated single-layer graphene can optionally be produced by exfoliating the multi-layer graphene after the pore definition process is completed. The pore size is also tailorable in the processes described herein. Thus, the nanoparticle perforation processes described herein are desirable in terms of the number, size and size distribution of pores produced.

The multi-layer graphene subjected to nanoparticle perforation may contain between about 2 stacked graphene sheets and about 20 stacked graphene sheets. Too few graphene sheets may lead to difficulties in handling the graphene as well as an increased incidence of intrinsic or native graphene defects. Having more than about 20 stacked graphene sheets, in contrast, may make it difficult to perforate all of the graphene sheets. In some embodiments, the multilayer sheets may be made by individually growing sheets and making multiple transfers to the same substrate. In some embodiments, the multi-layer graphene perforated by the techniques described herein can have 2 graphene sheets, or 3 graphene sheets, or 4 graphene sheets, or 5 graphene sheets, or 6 graphene sheets, or 7 graphene sheets, or 8 graphene sheets, or 9 graphene sheets, or 10 graphene sheets, or 11 graphene sheets, or 12 graphene sheets, or 13 graphene sheets, or 14 graphene sheets, or 15 graphene sheets, or 16 graphene sheets, or 17 graphene sheets, or 18 graphene sheets, or 19 graphene sheets, or 20 graphene sheets.

The reactants may be applied to the graphene material by any appropriate process. In some embodiments the graphene material may be disposed between liquid solutions or suspensions containing the reactants, and the liquid solutions and suspensions may or may not be flowing past the surfaces of the graphene material. The liquid solutions or suspensions of reactants may be applied to the graphene material by rollers, brushes, spray nozzles, or doctor blades. In some embodiments, the reactants may be applied to the graphene material in droplet form, such as through the use of an inkjet apparatus. In some embodiments a liquid solution or suspension containing a reactant may be disposed on one side of the graphene material and the other side of the graphene material may be exposed to a gas phase reactant.

In some embodiments, the graphene material may be floated on the surface of a liquid suspension or solution containing one of the reactants. The graphene material may be free of a support structure when it is floated on the liquid. In some embodiments, the graphene material may be disposed on a support structure when floated on the liquid, the support structure may include support structures that function to maintain the position of the graphene material on the surface of the liquid and support structures that may be utilized to handle the graphene material after repair. In some embodiments, a mesh material may be employed as a support structure to maintain the graphene material on the surface of the liquid. In some embodiments, a porous polymer may be employed as a support structure that may also be used to handle or manipulate the graphene material after the repair process. In some other embodiments, a support structure including a sacrificial layer that is removed during or after the repair process may be employed.

In some embodiments, the reactants may be applied to an enclosure or envelope including the graphene material. As shown in FIG. 15, an enclosure or envelope including the graphene material may include a lumen 660 that allows access to the interior volume 670 of the enclosure. In a repair process of the graphene material included in the enclosure, the first reactant may be supplied to the interior volume of the enclosure, and the second reactant may be applied to the exterior of the enclosure. The manner of exposing the exterior of the enclosure to the second reactant may include any of the application processes described herein. After the completion of the repair process, the first reactant may be removed from the enclosure and a desired component may be loaded in to the interior space of the enclosure.

The repaired graphene material described herein may be employed in any appropriate process or device. In some embodiments the graphene material may be utilized in filtration devices, such as devices utilized in deionization, reverse osmosis, forward osmosis, contaminant removal, and wastewater treatment processes. The graphene material may also be employed in a biomedical device as a selectively permeable membrane. In some embodiments, the graphene material may be employed in a viral clearance or protein separation process.

The graphene materials described herein may be employed as membranes in water filtration, immune-isolation (i.e., protecting substances from an immune reaction), timed drug release (e.g., sustained or delayed release), hemodialysis, and hemofiltration. The graphene materials described herein may be employed in a method of water filtration, water desalination, water purification, immune-isolation, timed drug release, hemodialysis, or hemofiltration, where the method comprises exposing a membrane to an environmental stimulus.

In some embodiments, methods of filtering water may include passing water through a membrane including the graphene materials described herein. Some embodiments include desalinating or purifying water comprising passing water through a membrane including the graphene materials described herein. The water can be passed through the membrane by any known means, such as by diffusion or gravity filtration, or with applied pressure.

Some embodiments include methods of selectively separating or isolating substances in a biological environment, wherein a membrane including the graphene materials described herein separates or isolates biological substances based on characteristics of the substance, such as size. Such methods can be useful in the context of disease treatment, such as in the treatment of diabetes. In some embodiments, biological substances below a certain size threshold can migrate across the membrane. In some embodiments, even biological substances below the size threshold are excluded from migrating across the membrane due to functionalization of membrane pores and/or channels.

Unless defined otherwise, all technical and scientific terms used in this description have the same meaning as commonly understood by those skilled in the relevant art.

For convenience, the meaning of certain terms employed in the specification and appended claims are provided below. Other terms and phrases are defined throughout the specification.

The singular forms "a," "an," and "the" include plural reference unless the context clearly dictates otherwise.

As used herein, the term "about" will be understood by persons of ordinary skill in the art and will vary to some extent depending upon the context in which it is used. If there are uses of the term which are not clear to persons of ordinary skill in the art given the context in which it is used, "about" will mean up to plus or minus 10% of the particular term.

Given the disclosure of the present invention, one versed in the art would appreciate that there may be other embodiments and modifications within the scope and spirit of the invention. Accordingly, all modifications attainable by one versed in the art from the present invention within the scope and spirit of the present invention are to be included as further embodiments of the present invention.

What is claimed is:

1. A method comprising:
   disposing a first reactant on a first side of a two-dimensional material including defects;
   disposing a second reactant on a second side of the two-dimensional material such that the first reactant and second reactant undergo a polymerization reaction and form polymer regions filling the defects; and
   after the polymerization reaction forms the polymer regions, adhering the polymer regions to a support structure.

2. The method of claim 1, wherein adhering the polymer regions to the support structure comprises forming covalent bonds between the polymer regions and the support structure.

3. The method of claim 1, wherein the adhering the polymer regions to the support structure comprises forming molecular entanglement between the polymer regions and the support structure.

4. The method of claim 1, further comprising adhering a polymer handling region formed along at least a portion of an edge of the two-dimensional material to the support structure.

5. The method of claim 1, wherein the two-dimensional material comprises graphene.

6. The method of claim 1, wherein the support structure is a porous support structure.

7. The method of claim 1, wherein the polymer regions have a thickness in the range of 3 nm to 100 μm.

8. The method of claim 1, wherein the polymer regions are biocompatible or bio-inert.

9. The method of claim 1, further comprising treating the support structure to enhance adhesion between the polymer regions and the support structure.

10. The method of claim 1, wherein the polymer regions are adhered to the support structure such that a distance between adjacent polymer regions is less than a length of the two-dimensional material between the adjacent polymer regions.

11. The method of claim 1, wherein the polymer regions are adhered to the support structure such that folds are formed in the two-dimensional material.

12. A method comprising:
   forming holes in a two-dimensional material including defects;
   disposing a first reactant on a first side of the two-dimensional material;
   disposing a second reactant on a second side of the two-dimensional material such that the first reactant and second reactant undergo a polymerization reaction and form polymer regions filling the defects and holes; and
   adhering the polymer regions to a support structure.

13. The method of claim 12, wherein the ratio of the area of the holes to the area of the two-dimensional material is in the range of 5% to 50%.

14. The method of claim 12, wherein the polymer regions have a thickness in the range of 3 nm to 100 μm.

15. The method of claim 12, wherein the holes are randomly distributed across the two-dimensional material.

16. The method of claim 12, wherein the holes are arranged in a periodic array.

17. The method of claim 12, wherein the polymer regions are adhered to the support structure such that a distance between adjacent polymer regions is less than a length of the two-dimensional material between the adjacent polymer regions.

18. The method of claim 12, wherein the polymer regions are adhered to the support structure such that folds are formed in the two-dimensional material.

19. A method comprising:
   forming pores in a two-dimensional material including defects, wherein the defects have a size greater than 15 nm, and the pores have a size that is less than the size of the defects;
   disposing a first reactant on a first side of the two-dimensional material; and disposing a second reactant on a second side of the two-dimensional material such that the first reactant and second reactant undergo a polymerization reaction and form polymer regions filling the defects;
wherein the pores are not filled by the polymer regions.

20. The method of claim 19, wherein at least one of the first reactant and the second reactant comprises a dendrimer.

21. The method of claim 19, further comprising applying an electric potential to the two-dimensional material to attract the first reactant and the second reactant to the defects in the graphene material.

22. The method of claim 19, further comprising heating the first reactant and the second reactant to increase a rate of diffusion thereof and increase a rate of the polymerization reaction.

23. The method of claim 19, wherein the first reactant is ionic, the second reactant is ionic, and the first and second reactants have opposite charges.

24. The method of claim 19, further comprising forming holes in the two-dimensional material with a size greater than the size of the pores, such that the holes are filled by polymer regions formed during the polymerization reaction.

25. A method comprising:
disposing a first reactant on a first side of a two-dimensional material and extending beyond at least a portion of an edge of the two-dimensional material;
disposing a second reactant on a second side of the two-dimensional material and extending beyond the at least a portion of the edge of the two-dimensional material;
wherein the first reactant and second reactant undergo a polymerization reaction and form a polymer handling region at least a portion of the edge of the two-dimensional material.

26. The method of claim 25, wherein the polymer handling region extends along the entire circumference of the two-dimensional material.

27. The method of claim 25, wherein the polymer handling region extends from the at least a portion of the edge of the two-dimensional material for a distance of at least about 1 mm.

28. The method of claim 25, wherein the polymer handling region has a thickness in the range of 3 nm to 100 μm.

29. A method comprising:
disposing a first reactant on a first side of a two-dimensional material containing defects;
disposing a second reactant on a second side of the two-dimensional material such that the first reactant and second reactant undergo a polymerization reaction and form polymer regions filling the defects; and
forming pores in the two-dimensional material by impacting the two-dimensional material with nanoparticles.

30. The method of claim 29, wherein the nanoparticles have an energy of 2 keV to 500 keV per nanoparticle.

31. The method of claim 29, wherein the nanoparticles have a size of 2 nm to 50 nm.

32. The method of claim 29, wherein the size of the pores is from 1 nm to 100 nm.

33. The method of claim 29, wherein the fluence of the nanoparticles is $1\times10^8$ to $1\times10^{12}$ nanoparticles/cm$^2$.

34. The method of claim 29, wherein the two-dimensional material comprises graphene.

35. A method comprising:
forming pores in a two-dimensional material including defects by impacting the two-dimensional material with nanoparticles;
disposing a first reactant on a first side of the two-dimensional material; and
disposing a second reactant on a second side of the two-dimensional material such that the first reactant and second reactant undergo a polymerization reaction and form polymer regions filling the defects;
wherein the pores are not filled by the polymer regions.

36. The method of claim 35, wherein the nanoparticles have an energy of 2 keV to 500 keV per nanoparticle.

37. The method of claim 35, wherein the nanoparticles have a size of 2 nm to 50 nm.

38. The method of claim 35, wherein the size of the pores is from 1 nm to 100 nm.

39. The method of claim 35, wherein the fluence of the nanoparticles is $1\times10^8$ to $1\times10^{12}$ nanoparticles/cm$^2$.

40. The method of claim 35, wherein the two-dimensional material comprises graphene.

41. A membrane assembly, comprising:
a two-dimensional material including polymer regions that extend through defects in the two-dimensional material; and
a support structure,
wherein the two-dimensional material is adhered to the support structure via the polymer regions, and the polymer regions prevent fluid flow through the defects.

42. The membrane assembly of claim 41, wherein the two-dimensional material comprises graphene.

43. The membrane assembly of claim 41, wherein the membrane assembly is biocompatible or bio-inert.

44. The membrane assembly of claim 41, wherein the polymer regions have a thickness of 3 nm to 500 nm.

45. The membrane assembly of claim 41, wherein the polymer regions are adhered to the support structure through at least one of covalent bonds and molecular entanglement.

46. The membrane assembly of claim 41, wherein the polymer regions are adhered to the support structure such that a distance between adjacent polymer regions is less than a length of the two-dimensional material between the adjacent polymer regions.

47. The membrane assembly of claim 41, wherein the polymer regions are adhered to the support structure such that folds are formed in the two-dimensional material.

* * * * *